(12) United States Patent
Koyama et al.

(10) Patent No.: US 9,502,060 B2
(45) Date of Patent: Nov. 22, 2016

(54) SEMICONDUCTOR INTEGRATED CIRCUIT AND OPERATING METHOD FOR THE SAME

(71) Applicant: Renesas Electronics Corporation, Kawasaki-shi, Kanagawa (JP)

(72) Inventors: Hideho Koyama, Kanagawa (JP); Minoru Kurosawa, Kanagawa (JP); Kichiya Itagaki, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 64 days.

(21) Appl. No.: 14/645,314

(22) Filed: Mar. 11, 2015

(65) Prior Publication Data

US 2015/0262599 A1    Sep. 17, 2015

(30) Foreign Application Priority Data

Mar. 14, 2014   (JP) .................................. 2014-051395

(51) Int. Cl.
| | | |
|---|---|---|
| *G11B 5/54* | (2006.01) | |
| *H02P 6/18* | (2016.01) | |
| *G11B 21/12* | (2006.01) | |
| *G11B 5/55* | (2006.01) | |

(52) U.S. Cl.
CPC .............. *G11B 5/54* (2013.01); *G11B 5/5534* (2013.01); *G11B 21/12* (2013.01); *H02P 6/17* (2016.02); *H02P 6/182* (2013.01); *G11B 5/5573* (2013.01); *H02P 25/034* (2016.02)

(58) Field of Classification Search
None
See application file for complete search history.

(56) References Cited

U.S. PATENT DOCUMENTS

| | | | |
|---|---|---|---|
| 6,496,319 B1 | 12/2002 | Kusumoto et al. | |
| 6,661,598 B2* | 12/2003 | Kusumoto | G11B 5/54 360/75 |
| 6,690,536 B1* | 2/2004 | Ryan | G11B 5/5534 360/78.04 |
| 6,922,302 B2* | 7/2005 | Kusumoto | G11B 5/54 360/75 |
| 7,193,804 B1* | 3/2007 | Kheymehdooz | G11B 5/54 360/78.04 |
| 7,235,938 B2* | 6/2007 | Daio | G11B 5/5526 318/400.34 |
| 7,421,359 B2* | 9/2008 | Harmer | G11B 5/5534 318/628 |
| 7,561,366 B2* | 7/2009 | Wasa | G11B 21/12 360/75 |
| 7,660,067 B1* | 2/2010 | Ji | G11B 5/5565 360/75 |
| 7,800,857 B1* | 9/2010 | Calaway | G11B 5/596 360/75 |

FOREIGN PATENT DOCUMENTS

JP        2000-163901 A    6/2000

* cited by examiner

*Primary Examiner* — Wayne Young
*Assistant Examiner* — James L Habermehl
(74) *Attorney, Agent, or Firm* — Shapiro, Gabor and Rosenberger, PLLC

(57) ABSTRACT

The present invention realizes a calibration operation for detecting a motor speed, without employing digital correcting by an external CPU. The calibration operation calculates a comparison reference value corresponding to aback EMF detection signal of a back EMF detector circuit when a zero current flows through a motor and when an arm is fixed. Accordingly, the back EMF detection signal of the back EMF detector circuit is set as the first value and the second value responding to the non-zero current flowing through the motor, and the semiconductor integrated circuit calculates the comparison reference value from the first value and the second value. The difference between the comparison reference value and the comparison input value as the back EMF detection signal of the back EMF detector circuit is reduced by adjusting the gain of an internal amplifier of the back EMF detector circuit by an adjustment unit.

20 Claims, 19 Drawing Sheets

SEMICONDUCTOR INTEGRATED CIRCUIT AND OPERATING METHOD FOR THE SAME

CROSS-REFERENCE TO RELATED APPLICATIONS

The disclosure of Japanese Patent Application No. 2014-051395 Filed on Mar. 14, 2014 including the specification, drawings and abstract is incorporated herein by reference in its entirety.

BACKGROUND

The present invention relates to a semiconductor integrated circuit which can be mounted in a motor drive controller for driving a motor to move a magnetic head of a hard disk drive unit, and an operating method for the same. Particularly, the present invention relates to technology which is effective in performing a calibration operation for velocity detection of the motor, without using the digital correcting by an external CPU of the semiconductor integrated circuit.

In a hard disk drive unit (HDD), a magnetic disk is rotated at high velocity by a spindle motor, a magnetic head for read and write is floated at a close distance on a medium surface of the rotating magnetic disk, and the magnetic head is moved in the diameter direction of the magnetic disk by a voice coil motor, thereby the read and write of information of the magnetic disk are performed.

In the hard disk drive unit (HDD), a loading/unloading system is adopted in which, when the write and read of data is not performed, the magnetic head is retracted to a ramp mechanism provided outside the outer circumference of the magnetic disk and rests there. By a loading operation according to a command from a host, the magnetic head is moved to the disk medium surface from the retracted position of the ramp mechanism, and a read/write operation is performed. After the completion of the read/write operation, by an unloading operation according to a command from the host, the magnetic head is moved from a disk medium surface to the retracted position of the ramp mechanism, on the contrary.

On the other hand, with the increasing advancement of high recording density of a hard disk drive unit, the flying height of a magnetic head over the disk medium surface becomes small, and improvement in the accuracy of the velocity control at the time of loading of the magnetic head is required. The velocity at the time of loading of a magnetic head is moving velocity of the magnetic head from the retracted position of the ramp mechanism to a disk medium surface. The velocity at the time of loading of the magnetic head is conventionally controlled by detecting a back electromotive force generated in the voice coil motor at the time of the movement.

Patent Document 1 cited below describes that an inter-terminal voltage of a voice coil motor (VCM) and an inter-terminal voltage of a sensing resistor coupled in series with the voice coil motor are amplified by a two-stage negative feedback differential amplifier, thereby the back electromotive force of the voice coil motor is detected. Patent Document 1 also describes about a calibration operation which is performed in order to compensate an error involved in the detection value of the back electromotive force which arises from the change of the parasitic resistance of the VCM (VCM resistance) due to a temperature change. That is, when starting the loading control, in a zero state of the actual velocity of the VCM when the carriage is pressed against an outer circumference stopper, VCM velocity detection values detected from a VCM detection circuit are read when two steps of VCM current values are made to flow through the VCM, then, the relation between the VCM current value and the VCM velocity detection value is compensated by the software processing by a CPU. Furthermore, in performing the unload control, when a timer value has exceeded the prescribed time, the retracting operation is performed to retract the magnetic head to the inward direction of the magnetic disk, and the carriage is pressed against an inner circumference stopper. In the present state, two steps of the VCM current values are made to flow in a direction in which the driving force to the carriage acts toward the inner circumference, and the relation between the VCM current value and the VCM velocity detection value is compensated similarly by the software processing by the CPU.

(Patent Document 1) Published Japanese Unexamined Patent Application No. 2000-163901

SUMMARY

Prior to the present invention, the present inventors have been engaged in development of a semiconductor integrated circuit called a voice coil motor driver IC for driving a voice coil motor (VCM) which moves a magnetic head in a hard disk drive unit (HDD). Specifically, this driver IC is a semiconductor integrated circuit of high integration density called a COMBO driver which integrates a spindle motor driver for driving the spindle motor to rotate a magnetic disk at high velocity and a voice coil motor driver for driving a voice coil motor.

In the present semiconductor integrated circuit of high integration density called the COMBO driver, on the other hand, in order to detect a back electromotive force of a voice coil motor (VCM), it is necessary to compensate the relation between a VCM current value and a VCM velocity detection value at the time of starting the loading control of a magnetic head, as described in Patent Document 1.

FIG. 18 illustrates a configuration of a hard disk drive unit (HDD) in which a semiconductor integrated circuit 2 of high integration density called a COMBO driver is mounted.

As illustrated in FIG. 18, the hard disk drive unit (HDD) is comprised of a controller 1 configured with a system on a chip (SoC), a semiconductor integrated circuit 2 of the COMBO driver, and a magnetic disk unit 3.

The magnetic disk unit 3 is comprised of a magnetic disk unit 31, a spindle motor 32, a magnetic head 33, an arm (carriage) 34, a voice coil motor (hereinafter referred to as a VCM) 35, and a ramp mechanism 36. The magnetic disk unit 31 which performs the write and read of information is driven to rotate by the spindle motor 32 and the arm 34 on which a magnetic head 33 for the write and read of information is mounted is driven by the VCM 35. When the write and read of information are not performed, the magnetic head 33 is retracted to the ramp mechanism 36. The write and read of information are performed by moving the magnetic head 33 from the ramp mechanism 36 toward the inward direction of the magnetic disk unit 31 by a loading operation LOAD according to a command from a host device. After the completion of the write and read of information, the magnetic head 33 is moved the other way from the inward direction to the retracted position of the ramp mechanism 36 of the magnetic disk unit 31 by an unloading operation UNLOAD according to a command from the host device.

The semiconductor integrated circuit 2 of the COMBO driver is comprised of a logic circuit 21, a digital-to-analog converter 22, an analog-to-digital converter 23, a voice coil motor driver circuit (hereinafter referred to as a VCM driver circuit) 24, and a back electromotive force detector circuit (hereinafter referred to as a back EMF detector circuit) 25. Although not shown in FIG. 18, the semiconductor integrated circuit 2 of the COMBO driver contains the spindle motor driver circuit for driving the spindle motor 32 of the hard disk drive unit (HDD) illustrated in FIG. 18.

The controller 1 configured with a system on a chip (SoC) integrates a hitherto-used hard disk controller (HDC) and a hitherto-used read/write channel LSI into a one-chip semiconductor integrated circuit of high integration density. That is, the hard disk controller is comprised of a host interface, a clock generator, a servo circuit, a cache memory, an error correction circuit (ECC), and a disk interface. The read/write channel LSI is comprised of a signal processing circuit for performing code modulation of data to be written in the magnetic disk and for performing a PRML (Partial Response Maximum Likelihood) signal processing of a reproduction signal read from the magnetic disk, a magnetic head position information generating circuit, and others.

A digital voice coil motor current indicating value (hereinafter referred to as a digital VCM current indicating value) VCMCRNT generated by the controller 1 is converted into an analog output signal by the digital-to-analog converter 22 of the semiconductor integrated circuit 2 of the COMBO driver, and the analog output signal is supplied to an input terminal of the VCM driver circuit 24. Furthermore, a driving output signal of the VCM driver circuit 24 is applied to both ends of the VCM 35. Therefore, the VCM 35 for driving the arm 34 on which the magnetic head 33 is mounted is driven by the driving output signal of the VCM driver circuit 24.

A back electromotive force (hereinafter referred to as a back EMF) is generated in the VCM 35 corresponding to the moving velocity at the time of the magnetic head 33 moving from the ramp mechanism 36 to the inward direction of the magnetic disk unit 31 by a loading operation LOAD according to a command from the host device. The back EMF generated is then supplied from both ends of the VCM 35 to the difference input terminals of the back EMF detector circuit 25. An analog back EMF detection signal of the back EMF detector circuit 25 is converted into a digital back EMF detection signal by the analog-to-digital converter 23, and the digital back EMF detection signal VDET_D is supplied to the controller 1 via the logic circuit 21. The controller 1 performs feedback control of the digital VCM current indicating value VCMCRNT so that the digital back EMF detection signal VDET_D becomes constant. Therefore, it is possible to control the moving velocity of the magnetic head 33 to a constant velocity in the loading operation LOAD.

FIG. 19 illustrates a state where the semiconductor integrated circuit 2 of high integration density called the COMBO driver, examined by the present inventors prior to the present invention, is mounted in the hard disk drive unit (HDD) illustrated in FIG. 18. The semiconductor integrated circuit 2 illustrated in FIG. 19 also controls the digital back EMF detection signal VDET_D to a constant value, through the feedback control of the digital VCM current indicating value VCMCRNT by the controller 1 so that the moving velocity of the magnetic head 33 in the loading operation LOAD is controlled to a constant velocity.

As illustrated in FIG. 19, the semiconductor integrated circuit 2 of the COMBO driver is comprised of a logic circuit 21, a digital-to-analog converter 22, an analog-to-digital converter 23, a VCM driver circuit 24, and a back EMF detector circuit 25.

The logic circuit 21 is comprised of a serial interface 211 and an adjustment logic circuit 212.

The serial interface 211 is supplied with external control signals A1_OFF_ADJ, A1_GAIN_ADJ, A2_OFF_ADJ, and A2_GAIN, from the controller 1 configured with the system on a chip (SoC). The serial interface 211 supplies a digital VCM current indicating value VCMCRNT supplied from the controller 1 to the input terminal of the digital-to-analog converter 22. On the other hand, the serial interface 211 supplies a digital back EMF detection signal VDET_D generated by the analog-to-digital converter 23 to the controller 1.

The adjustment logic circuit 212 is comprised of four adjustment registers 2121, 2122, 2123, and 2124, an adjustment sequencer 2125, two back EMF detection signal registers 2126 and 2127, and a comparator 2128.

The digital VCM current indicating value VCMCRNT is supplied from the controller 1 to an input terminal of the digital-to-analog converter 22 via the serial interface 211. Accordingly, an analog voice coil motor current indicating value (hereinafter referred to as an analog VCM current indicating value) is supplied from an output terminal of the digital-to-analog converter 22 to an input terminal of the VCM driver circuit 24.

The VCM driver circuit 24 is comprised of a non-inverting amplifier 241 and an inverting amplifier 242, in order to generate a positive polarity voice coil motor drive voltage (hereinafter referred to as a positive polarity VCM drive voltage) Vvcmp and a negative polarity voice coil motor drive voltage (hereinafter referred to as a negative polarity VCM drive voltage) Vvcmn. An analog VCM current indicating value is supplied from an output terminal of the digital-to-analog converter 22 to an input terminal of the non-inverting amplifier 241 and an input terminal of the inverting amplifier 242. One end of a detection resistor Rs for detecting a voice coil motor current (hereinafter referred to as a VCM current) Ivcm which flows through the VCM 35 is coupled to an output terminal of the non-inverting amplifier 241. The other end of the detection resistor Rs is coupled to one end of the VCM 35, the other end of the VCM 35 is coupled to an output terminal of the inverting amplifier 242. Between one end and the other end of the VCM 35, a coil L, a parasitic resistance RL, and a back EMF Vbemf of the VCM 35 are coupled in series.

The back EMF detector circuit 25 is comprised of an inverting amplifier 251, a subtraction amplifier 252, and a low pass filter 253. The inverting amplifier 251 is comprised of a first resistor of a value of resistance R1, a second resistor of a value of resistance R2, and a first differential amplifier A1. The subtraction amplifier 252 is comprised of a third resistor of a value of resistance R3, a fourth resistor of a value of resistance R4, a fifth resistor of a value of resistance R3, a sixth resistor of a value of resistance R4, and a second differential amplifier A2. The lowpass filter 253 is comprised of a resistor R and a capacitor C. The low pass filter 253 has the function of removing a high-frequency voltage component generated across both ends of the coil L of the VCM 35. One end of the first resistor of the value of resistance R1 of the inverting amplifier 251 is coupled to one end of the detection resistor Rs for detecting the VCM current Ivcm, the other end of the first resistor of the value of resistance R1 is coupled to an inverting input terminal (−) of the first differential amplifier A1 and one end of the second resistor of the value of resistance R2, and the other end of the second resistor of the value of resistance R2 is coupled to an output terminal of the first differential amplifier A1. A common voltage Vcom at a connection node of the other end of the detection resistor Rs and one end of the VCM 35 is supplied to a noninverting input terminal (+) of the first differential amplifier A1. An output signal of the inverting amplifier 251 is supplied to one end of the third resistor of the value of resistance R3 of the subtraction amplifier 252, the other end of the third resistor of the value of resistance R3 is coupled to an inverting input terminal (−) of the second differential amplifier A2 and one end of the fourth resistor of the value of resistance R4, and the other end of the fourth resistor of the value of resistance R4 is coupled to an output terminal of the second differential amplifier A2. The other end of the VCM 35 is coupled to one end of the fifth resistor of the value of resistance R3, the other end of the fifth resistor of the value of resistance R3 is coupled to an noninverting input terminal (+) of the second differential amplifier A2 and one end of the sixth resistor of the value of resistance R4, and a reference voltage Vref is supplied to the other end of the sixth resistor of the value of resistance R4. An output signal of the subtraction amplifier 252 is supplied to one end of the resistor R of the low pass filter 253, the other end of the resistor R is coupled to one end of the capacitor C of the low pass filter 253, and the other end of the capacitor C is coupled to the ground potential. An analog back EMF detection signal Vdet_A is generated from an output terminal of the low pass filter 253 of the back EMF detector circuit 25. This analog back EMF detection signal Vdet_A is converted into a digital back EMF detection signal by the analog-to-digital converter 23, and the digital back EMF detection signal VDET_D is supplied to the controller 1 via the logic circuit 21.

Assuming that the electric current which flows through the coil L of the VCM 35 is Ivcm, the back EMF is Vbemf, and the reference voltage is Vref, the analog back EMF detection signal Vdet_A from the output terminal of the back EMF detector circuit 25 is given by Equation 1.

$$V\det\_A = -\frac{R_4}{R_3} \cdot \left\{ -V_{bemf} + \left(R_L - \frac{R_2}{R_1} \cdot R_S\right) \cdot I_{vcm} \right\} + V_{ref} \quad \text{(Equation 1)}$$
$$= \frac{R_4}{R_3} \cdot V_{bemf} - \frac{R_4}{R_3} \cdot \left(R_L - \frac{R_2}{R_1} \cdot R_S\right) \cdot (+I_{vcm}) + V_{ref}$$

Here, (+Ivcm) in the second term of the second line of the right-hand side of Equation 1 expresses that the VCM current Ivcm is a positive current value and that the magnetic head 33 moves from the ramp mechanism 36 toward the inward direction of the magnetic disk unit 31 at the time of a loading operation LOAD.

The adjustment logic circuit 212 of the logic circuit 21 is comprised of a first gain adjustment register 2121, a first offset control register 2122, a second gain adjustment register 2123, a second offset control register 2124, an adjustment sequencer 2125, a first detection register 2126, a second detection register 2127, and a comparator 2128.

The serial interface 211 of the logic circuit 21 is supplied, from the controller 1, with an inverting gain adjustment instruction signal A1_GAIN_ADJ, a first offset control instruction signal A1_OFF_ADJ, a subtraction gain value A2_GAIN, a second offset control instruction signal A2_OFF_ADJ, and a digital VCM current indicating value VCMCRNT.

During a calibration operation to be explained later, the inverting gain adjustment instruction signal A1_GAIN_ADJ is supplied from the controller 1 to the adjustment sequencer 2125 via the serial interface 211. As the result, responding to the output signal of the comparator 2128 during the calibration operation, the adjustment sequencer 2125 corrects the inverting gain value A1_GAIN of the first gain adjustment register 2121 to a proper value. The inverting gain value A1_GAIN stored in the first gain adjustment register 2121 sets up the value of resistance R1 of the first resistor of the inverting amplifier 251 of the back EMF detector circuit 25. Therefore, the amplification gain of the inverting amplifier 251 of the back EMF detector circuit 25 is set up by the first resistor of the value of resistance R1 adjusted by the inverting gain adjustment instruction signal A1_GAIN_ADJ stored in the first gain adjustment register 2121. During the preparation period prior to the calibration operation, the first offset control instruction signal A1_OFF_ADJ is supplied from the controller 1 to the adjustment sequencer 2125 via the serial interface 211. Therefore, responding to the output signal of the comparator 2128 during the preparation period, the adjustment sequencer 2125 adjusts the first offset value A1_OFF of the first offset control register 2122 to a proper value. As a result, the first offset value A1_OFF stored in the first offset control register 2122 compensates the first differential input offset of the first differential amplifier A1 in the inverting amplifier 251 of the back EMF detector circuit 25. Similarly, the second offset control instruction signal A2_OFF_ADJ is supplied from the controller 1 to the adjustment sequencer 2125 via the serial interface 211 during the preparation period. Therefore, responding to the output signal of the comparator 2128 during the preparation period, the adjustment sequencer 2125 adjusts the second offset value A2_OFF of the second offset control register 2124 to a proper value. As a result, the second offset value A2_OFF stored in the second offset control register 2124 compensates the second differential input offset of the second differential amplifier A2 in the subtraction amplifier 252 of the back EMF detector circuit 25. Furthermore, during the preparation period prior to the calibration operation, the subtraction gain value A2_GAIN is supplied from the controller 1 to the second gain setting register 2123 via the serial interface 211. As the result, the subtraction gain value A2_GAIN stored in the second gain setting register 2123 sets up the resistance ratio of the third resistor of the value of resistance R3 and the fourth resistor of the value of resistance R4 and the resistance ratio of the fifth resistor of the value of resistance R3 and the sixth resistor of the value of resistance R4, in the subtraction amplifier 252 of the back EMF detector circuit 25. That is, the subtraction amplification gain of the subtraction amplifier 252 of the back EMF detector circuit 25 is set up by the subtraction gain value A2_GAIN stored in the second gain setting register 2123.

The digital back EMF detection signal VDET_D generated from the analog-to-digital converter 23 is supplied to a signal input terminal of the first detection register 2126 and a signal input terminal of the second detection register 2127. The reference value latch control signal LAT_REF is supplied from the adjustment sequencer 2125 to a latch control terminal of the first detection register 2126, and the detection value latch control signal LAT_DET is supplied from the adjustment sequencer 2125 to a latch control terminal of the second detection register 2127. An output signal from a signal output terminal of the first detection register 2126 is supplied to one input terminal of the comparator 2128 as a comparison reference value VCMP_REF, an output signal from a signal output terminal of the second detection register 2127 is supplied to the other input terminal of the comparator 2128 as a comparison input value VCMP_IN, and a comparison output signal VCMP_OUT of the comparator 2128 is supplied to the adjustment sequencer 2125.

FIG. 20 is an explanatory drawing of the calibration operation for compensating an error involved in the detection value of the back EMF Vbemf of the VCM 35 for the loading operation LOAD in the semiconductor integrated circuit 2 illustrated in FIG. 19, which has been examined by the present inventors prior to the present invention. By the loading operation LOAD, the magnetic head 33 moves from the ramp mechanism 36 toward the inward direction of the magnetic disk unit 31.

In the calibration operation, even if the ratio of the value of resistance of the parasitic resistance RL of the VCM 35 and the value of resistance of the voice coil motor current sensing resistor (hereinafter referred to as the VCM current sensing resistor) Rs varies due to a temperature change, it is possible to maintain the gain compensation condition which satisfies the relation of (RL−R2·Rs/R1)≈0 in the second term of the second line of the right-hand side of Equation 1 described above, by varying the gain (=R2/R1) of the inverting amplifier 251 of the back EMF detector circuit 25. In this way, the gain compensation condition is maintained independently of a temperature change. Accordingly, the second term of the second line of the right-hand side of Equation 1 becomes zero substantially, and the analog back EMF detection signal Vdet_A of the back EMF detector circuit 25 does not depend on the current value of the VCM current Ivcm and depends only on the back EMF Vbemf and the reference voltage Vref. The gain (=R4/R3) of the subtraction amplifier 252 of the back EMF detector circuit 25 is kept substantially unchanged, against a temperature change. The reason is as follows. In the subtraction amplifier 252, the third resistor of the value of resistance R3, the fourth resistor of the value of resistance R4, the fifth resistor of the value of resistance R3, and the sixth resistor of the value of resistance R4 are formed at the same time under the same conditions of the manufacturing process of the semiconductor integrated circuit 2. Therefore, the resistance temperature dependence of these resistors becomes the same substantially. On the contrary, the parasitic resistance RL of the coil L of the VCM 35 and the VCM current sensing resistor Rs are made from different resistive materials. Therefore, the resistance temperature dependences of these two resistors are greatly different.

At the first step S1 of FIG. 20, the calibration operation is started when the inverting gain adjustment instruction signal A1_GAIN_ADJ supplied from the controller 1 changes from a low level Lo to a high level Hi.

At the second step S2, the first gain adjustment register 2121 is initialized by setting "0" to all the bits of the stored data of the first gain adjustment register 2121 in the adjustment logic circuit 212 of the logic circuit 21.

At the third step S3, in order to set to zero (≈0 mA) the current value of the VCM current Ivcm which flows through the VCM 35, the numeric value of the digital VCM current indicating value VCMCRNT to be generated from the controller 1 is set up. The present setup of the zero current value (≈0 mA) at the third step S3 is for generating the analog back EMF detection signal Vdet_A which is the same as that in the case where the gain compensation condition by the calibration operation satisfies the relation of (RL−R2·Rs/R1)≈0 in the second term of the second line of the right-hand side of Equation 1.

In the calibration operation performed prior to the loading operation LOAD which moves the magnetic head 33 from the ramp mechanism 36 toward the inward direction of the magnetic disk 31, the magnetic head 33 is retracted to the ramp mechanism 36. Therefore, the magnetic head 33 does not move even if the current value of the VCM current Ivcm is set as zero (≈0 mA). Accordingly, there is no generation of the back EMF Vbemf which might act as disturbance in the calibration operation, and the back EMF Vbemf is zero. Therefore, the analog back EMF detection signal Vdet_A obtained at the third step S3 becomes equal to Vref of the third term of the second line of the right-hand side of Equation 1.

At the fourth step S4, in response to the digital VCM current indicating value VCMCRNT of which the numeric value has been set at the third step S3, the flow waits for settling of the voltage level of the analog back EMF detection signal Vdet_A generated from the output terminal of the low pass filter 253 of the back EMF detector circuit 25.

At the fifth step S5, the analog back EMF detection signal Vdet_A settled at the fourth step S4 is converted into the digital back EMF detection signal VDET_D by the analog-to-digital converter 23, and the converted digital back EMF detection signal VDET_D is stored in the first detection register 2126 as the reference value for satisfying the gain compensation condition. As a result, the comparison reference value VCMP_REF as the output signal of the first detection register 2126 is supplied to one input terminal of the comparator 2128.

At the sixth step S6, the current value of the VCM current Ivcm is set as −Ivcm. The current value of the VCM current Ivcm is set as a minus value in this way, in order to make substantially zero the back EMF Vbemf of the first term of the second line of the right-hand side of Equation 1. That is, the magnetic head 33 tends to move from the inward direction to the outward direction of the magnetic disk unit 31 by setting the current value of the VCM current Ivcm as a minus value in the calibration operation performed prior to the loading operation LOAD. However, in the calibration operation prior to the loading operation LOAD, the arm 34 on which the magnetic head 33 is mounted is fixed to the ramp mechanism 36 or the outer circumference stopper, therefore, the magnetic head 33, the arm 34, and the VCM 35 cannot move or rotate, and the back EMF Vbemf becomes substantially zero.

Since the current value of the VCM current Ivcm is set as a minus value, Equation 1 is modified to Equation 2.

$$V\det\_A = -\frac{R_4}{R_3} \cdot \left\{ -V_{bemf} + \left(R_L - \frac{R_2}{R_1} \cdot R_S\right) \cdot I_{vcm} \right\} + V_{ref} \quad \text{(Equation 2)}$$

$$= \frac{R_4}{R_3} \cdot V_{bemf} - \frac{R_4}{R_3} \cdot \left(R_L - \frac{R_2}{R_1} \cdot R_S\right) \cdot (-I_{vcm}) + V_{ref}$$

At the seventh step S7, the flow waits for settling of the voltage level of the analog back EMF detection signal Vdet_A generated from the output terminal of the back EMF detector circuit 25 at the sixth step S6.

At the eighth step S8, in order to correct the gain (=R2/R1) of the inverting amplifier 251 of the back EMF detector circuit 25, a high level "1" is set to the Nth bit of the first gain adjustment register 2121 in the adjustment logic circuit 212 of the logic circuit 21. The Nth bit at the first-time eighth step S8 becomes the most significant bit (MSB), the Nth bit at the second-time eighth step S8 becomes the second higher-order bit, and the Nth bit at the last-time eighth step S8 becomes the least significant bit (LSB).

At the ninth step S9, in response to the digital VCM current indicating value VCMCRNT of which the numeric value has been set at the sixth step S6 and also to the gain of the inverting amplifier 251 which has been set at the eighth step S8, the flow waits for settling of the voltage level of the analog back EMF detection signal Vdet_A generated from the output terminal of the back EMF detector circuit 25.

At the 10th step S10, the analog back EMF detection signal Vdet_A settled at the ninth step S9 is converted into a digital back EMF detection signal VDET_D by the analog-to-digital converter 23, and the converted digital back EMF detection signal VDET_D is stored in the second detection register 2127 as a comparison input value corresponding to a temperature change. As a result, the comparison input value VCMP_IN as the output signal of the second detection register 2127 is supplied to the other input terminal of the comparator 2128.

At the 11th step S11, the comparator 2128 determines whether the comparison input value VCMP_IN stored in the second detection register 2127 in the 10th step S10 is equal to or smaller than the comparison reference value VCMP_REF stored in the first detection register 2126 at the fifth step S5. When the determination result by the comparator 2128 at the 11th step S11 is "YES", it is shown that the gain (=R2/R1) of the inverting amplifier 251 of the back EMF detector circuit 25 is greater than the ideal gain of the above-described gain compensation condition. Therefore, in this case, at the following 12th step S12, the Nth bit of the first gain adjustment register 2121 set up at the eighth step S8 is changed from a high level "1" to a low level "0."

When the determination result by the comparator 2128 at the 11th step S11 is "NO", it is shown that the gain (=R2/R1) of the inverting amplifier 251 of the back EMF detector circuit 25 is smaller than the ideal gain of the above-described gain compensation condition. Therefore, in this case, the flow shifts to the 13th step S13.

At the 13th step S13, in order to move the Nth adjusting bit position of the first gain adjustment register 2121 in the adjustment logic circuit 212 of the logic circuit 21 to the lower direction by 1 bit, the adjustment sequencer 2125, which responds to the comparison output signal VCMP_OUT of the comparator 2128, performs the operation of bit count N=N−1.

At the 14th step S14, in order to determine whether the Nth adjusting bit position of the first gain adjustment register 2121 shifted at the 13th step S13 is the least significant bit (LSB), the adjustment sequencer 2125 determines whether the bit count N is "0" or not. When the determination result at the 14th step S14 is "NO", the flow returns to the eighth step S8, and the Nth bit shifted to the lower direction by 1 bit in the first gain adjustment register 2121 is set as a high level "1."

When the determination result at the 14th step S14 is "YES", the flow shifts to the 15th step S15.

At the 15th step S15, the inverting gain adjustment instruction signal A1_GAIN_ADJ supplied from the controller 1 changes from a high level Hi to a low level Lo, and the calibration operation is terminated.

Prior to the loading operation LOAD after completing the present calibration operation, the gain (=R2/R1) of the inverting amplifier 251 of the back EMF detector circuit 25 is corrected to the ideal gain which satisfies the gain compensation condition of (RL−R2·Rs/R1)≈0 in the second term of the second line of the right-hand side of Equation 1.

FIG. 21 illustrates waveforms of signals of each part of the semiconductor integrated circuit 2 according to the operation flow of the calibration operation examined by the present inventors prior to the present invention, as illustrated in FIG. 20.

As illustrated in FIG. 21, at the timing of the first step S1, the calibration operation is started when the inverting gain adjustment instruction signal A1_GAIN_ADJ supplied from the controller 1 changes from a low level Lo to a high level Hi.

In the period from the first step S1 to the fifth step S5, the current value of the VCM current Ivcm which flows through the VCM 35 is set as approximately zero (≈0 mA), and the digital back EMF detection signal VDET_D generated from the output terminal of the analog-to-digital converter 23 changes to the comparison reference value VCMP_REF for the gain compensation condition.

In the period from the first step S1 to the sixth step S6, all the bits of the stored data of the first gain adjustment register 2121 in the adjustment logic circuit 212 of the logic circuit 21 are set as "0" and the first gain adjustment register 2121 is initialized. In this period, the bit count N of the first gain adjustment register 2121 in the adjustment logic circuit 212 of the logic circuit 21 is the most significant ninth bit. The hexadecimal 000 h corresponding to the decimal number 0 is stored in the first gain adjustment register 2121.

At the timing of the sixth step S6, the current value of the VCM current Ivcm is set as −Ivcm.

In the period of the seventh step S7, the digital back EMF detection signal VDET_D generated from the output terminal of the analog-to-digital converter 23 in response to the current value −Ivcm of the VCM current Ivcm serves as the comparison input value VCMP_IN corresponding to a temperature change.

At the timing of the first-time eighth step S8, the most significant ninth bit specified by the bit count N of the first gain adjustment register 2121 in the adjustment logic circuit 212 of the logic circuit 21 is set as a high level "1", accordingly, the hexadecimal 200 h corresponding to the decimal number 512 ($=2^9$) is stored in the first gain adjustment register 2121. As a result, in response to the hexadecimal 200 h as the gain adjustment value of the first gain adjustment register 2121, the gain (=R2/R1) of the inverting amplifier 251 of the back EMF detector circuit 25 is set as a large value of the decimal number 512.

At the timing of the first-time ninth step S9, the digital back EMF detection signal VDET_D generated from the output terminal of the analog-to-digital converter 23 serves as the comparison input value VCMP_IN in response to the current value −Ivcm of the VCM current Ivcm and the gain (=R2/R1) of the inverting amplifier 251 of the back EMF detector circuit 25. In the example illustrated in FIG. 21, this gain (=R2/R1) is excessive, accordingly, the analog back EMF detection signal Vdet_A from the output terminal of the back EMF detector circuit 25 calculated by Equation 2 described above becomes as a low level. Therefore, at the timing of the first-time ninth step S9, the comparison input value VCMP_IN as the digital back EMF detection signal VDET_D generated from the output terminal of the analog-to-digital converter 23 becomes a lower level than the comparison reference value VCMP_REF for the gain compensation condition. As a result, by the first-time processing of the 10th step S10 through the 14th step S14, the most significant ninth bit of the first gain adjustment register 2121 is changed from a high level "1" to a low level "0", and at the timing of the second-time eighth step S8, the eighth bit specified by the new bit count N is set as a high level "1." Therefore, the hexadecimal 100 h corresponding to the decimal number 256 ($=2^8$) is stored in the first gain adjustment register 2121. As a result, in response to the hexadecimal 100 h as the gain adjustment value of the first gain adjustment register 2121, the gain (=R2/R1) of the inverting amplifier 251 of the back EMF detector circuit 25 is set as the comparatively small value of the decimal number 256.

At the timing of the second-time ninth step S9, the digital back EMF detection signal VDET_D generated from the output terminal of the analog-to-digital converter 23 serves as the comparison input value VCMP_IN in response to the current value −Ivcm of the VCM current Ivcm and the gain (=R2/R1) of the inverting amplifier 251 of the back EMF detector circuit 25. In the example illustrated in FIG. 21, this gain (=R2/R1) is too small, therefore, the analog back EMF detection signal Vdet_A from the output terminal of the back EMF detector circuit 25 calculated by Equation 2 described above becomes a high level. Therefore, at the timing of the second-time ninth step S9, the comparison input value VCMP_IN as the digital back EMF detection signal VDET_D generated from the output terminal of the analog-to-digital converter 23 becomes a higher level than the comparison reference value VCMP_REF for the gain compensation condition. As a result, by the second-time processing of the 10th step S10 through the 14th step S14, the eighth bit of the first gain adjustment register 2121 is maintained at the high level "1", and the seventh bit specified by the new bit count N at the timing of the third-time eighth step S8 is set as a high level "1." Therefore, the hexadecimal 180 h corresponding to the decimal number 384 (=$2^8+2^7$) is stored in the first gain adjustment register 2121. As a result, in response to the hexadecimal 180 h as the gain adjustment value of the first gain adjustment register 2121, the gain (=R2/R1) of the inverting amplifier 251 of the back EMF detector circuit 25 is set as the comparatively large value of the decimal number 384.

In the same way hereinafter, by the processing of the eighth step S8 through the 14th step S14 for up to the 10th time, the gain (=R2/R1) of the inverting amplifier 251 of the back EMF detector circuit 25 converges to the value of the decimal number 337 corresponding to the hexadecimal 151, according to the binary search algorithm. As a result, even if the resistance ratio of the parasitic resistance RL of the VCM 35 and the VCM current sensing resistor Rs varies due to a temperature change, the gain (=R2/R1) of the inverting amplifier 251 of the back EMF detector circuit 25 is changed correspondingly. Therefore, it is possible to fulfill the gain compensation condition of (RL−R2·Rs/R1)≈0 in the second term of the second line of the right-hand side of Equation 1. Therefore, since the second term of the second line of the right-hand side of Equation 1 is substantially maintained to zero, the analog back EMF detection signal Vdet_A of the back EMF detector circuit 25 does not depend on the current value of the VCM current Ivcm, and only depends on the back EMF Vbemf and the reference voltage Vref.

However, the examination conducted by the present inventors has revealed that the calibration operation for compensating the error of the detection value of the back EMF for the loading operation LOAD, examined by the present inventors prior to the present invention as illustrated in FIG. 19, FIG. 20, and FIG. 21, cannot be adapted for the calibration operation for the unloading operation UNLOAD. That is, in the calibration operation for the unloading operation UNLOAD, the arm 34 on which the magnetic head 33 is mounted is not retracted or fixed to the ramp mechanism 36 or other stoppers. The reason why the adoption is difficult in this way is as follows. That is, at the third step S3 of the calibration operation illustrated in FIG. 20, the arm 34 is not retracted or fixed to the ramp mechanism 36 or other stoppers when setting to zero (≈0 mA) the current value of the VCM current Ivcm which flows through the VCM 35. Therefore, the magnetic head 33 and the arm 34 shift in the direction of the outer circumference or the inner circumference of the magnetic disk unit 31, under the influence of the rotational wind of the magnetic disk unit 31 driven to rotate or the tension of a flexible cable which carries information to and from the magnetic head 33. Due to this movement, the back EMF Vbemf of the first term of the second line of the right-hand side of Equation 1 does not become zero substantially. Therefore, there arise disturbances or errors in the calibration operation.

On the other hand, according to the description of Patent Literature 1 described above, the calibration operation which compensates the relation between the VCM current value and the VCM velocity detection value is performed by the software processing by a CPU (central processing unit), coupled between the driver IC including the VCM speed detection circuit and the hard disk controller (HDC).

FIG. 22 explains the calibration operation for compensating the relation of the VCM current value and the VCM velocity detection value, by the software processing by an external CPU of the semiconductor integrated circuit which has been examined by the present inventors prior to the present invention based on the description of Patent Document 1.

FIG. 22 illustrates that the gain compensation condition of (RL−R2·Rs/R1)≈0 in the second term of the second line of the right-hand side of Equation 1 is satisfied at a predetermined temperature, and the analog back EMF detection signal Vdet_A and the digital back EMF detection signal VDET_D do not depend on the current value of the VCM current Ivcm.

As is the case with FIG. 22, FIG. 23 also explains the calibration operation for compensating the relation of the VCM current value and the VCM velocity detection value by the software processing performed by the external CPU, which has been examined by the present inventors prior to the present invention based on the description of Patent Document 1.

FIG. 23 illustrates that, due to a temperature change, the resistance ratio of the parasitic resistance RL of the VCM 35 and the VCM current sensing resistor Rs varies, and the gain compensation condition is no longer satisfied, and that the analog back EMF detection signal Vdet_A varies responding to a change of the VCM current Ivcm. As illustrated in FIG. 23, the analog back EMF detection signal Vdet_A has the dependence Kdet on a change of the VCM current Ivcm, and also has an offset voltage Vdet_off observed when the current value of the VCM current Ivcm is zero (≈0 mA). Furthermore, as illustrated in FIG. 23, the maximum value and the minimum value of the analog back EMF detection signal Vdet_A become equal to the operation power voltage VDD and the ground voltage CND of the semiconductor integrated circuit 2 of the COMBO driver illustrated in FIG. 19, respectively. Accordingly, the increase and the decrease of the analog back EMF detection signal Vdet_A are saturated at the maximum value and the minimum value, respectively. As a result, the linearity of the analog back EMF detection signal Vdet_A is no longer maintained due to the saturation. In FIG. 23, the range where the linearity of the analog back EMF detection signal Vdet_A is maintained is called an output range OUT_RANGE. The range of the VCM current Ivcm in the range where the linearity of the analog back EMF detection signal Vdet_A is maintained is called an input range IN_RANGE.

FIG. 24 illustrates a manner in which the digital correcting is performed by the software processing by the external CPU to the dependence Kdet and the offset voltage Vdet_off, in the calibration operation which has been examined by the present inventors prior to the present invention illustrated in FIG. 23.

It is assumed that the condition of the output range OUT_RANGE is satisfied, as far as the analog back EMF detection signal Vdet_A exists in the level between the operation power voltage VDD of the maximum value and the ground voltage GND of the minimum value, as shown by the input range IN_RANGE of FIG. 23. In the present case, the digital correcting for the digital back EMF detection signal VDET_D from the analog-to-digital converter 23 is performed by the software processing by the external CPU. Therefore, it is possible to realize characteristics in which the digital back EMF detection signal VDET_D does not depend on the current value of the VCM current Ivcm, as is the case with FIG. 22 where the gain compensation condition is satisfied. However, when the analog back EMF detection signal Vdet_A exceeds the input range IN_RANGE or the output range OUT_RANGE, even if the digital correcting by the external CPU is performed, the characteristics exhibit that the digital back EMF detection signal VDET_D is dependent on the current value of the VCM current Ivcm.

Furthermore, in order to improve the S/N ratio of the analog back EMF detection signal Vdet_A, it is necessary to set to a large value the subtraction amplification gain of the subtraction amplifier 252 of the back EMF detector circuit 25, in terms of the subtraction gain value A2_GAIN stored in the second gain setting register 2123. However, when the subtraction amplification gain of the subtraction amplifier 252 of the back EMF detector circuit 25 is set to a large value, there arises an issue that the input range IN_RANGE or the output range OUT_RANGE is narrowed. This issue has been clarified by the examination performed by the present inventors in advance of the present invention.

Solutions to such problems will be explained in the following. The other issues and new features of the present invention will become clear from the description of the present specification and the accompanying drawings.

The following explains briefly an outline of a typical embodiment to be disclosed by the present application.

That is, the typical embodiment discloses a semiconductor integrated circuit (2) which can be mounted in a motor drive controller for driving a motor (35) to move a magnetic head (33) of a hard disk drive unit.

The semiconductor integrated circuit (2) is comprised of a motor driver circuit (24), a back EMF detector circuit (25), and an adjustment unit (2125) which adjusts the gain of an internal amplifier (251) of the back EMF detector circuit (25).

The semiconductor integrated circuit (2) generates a comparison reference value (VCMP_REF) corresponding to the back EMF detection signal generated from the back EMF detector circuit (25), in a fixed state of an arm (34) and in a state where a zero current substantially with a zero current value flows through a motor (35) by the calibration operation.

At the time of the calibration operation, in response to the non-zero current which flows through the motor (35), the semiconductor integrated circuit (2) sets the back EMF detection signal generated from a back EMF detector circuit (25) as a first value (VDET_CAL1) and a second value (VDET_CAL2).

The semiconductor integrated circuit (2) calculates a comparison reference value (VCMP_REF) from the first value (VDET_CAL1) and the second value (VDET_CAL2) at the time of the calibration operation.

The adjustment unit (2125) of the semiconductor integrated circuit (2) adjusts the gain of the internal amplifier (251) of the back EMF detector circuit (25) by the calibration operation. Accordingly, a comparison input value (VCMP_IN) as the back EMF detection signal is generated from the back EMF detector circuit (25) corresponding to the gain.

The adjustment unit (2125) of the semiconductor integrated circuit (2) adjusts the gain of the internal amplifier (251) of the back EMF detector circuit (25) by the calibration operation, so as to reduce the difference of the comparison input value (VCMP_IN) and the comparison reference value (VCMP_REF) (Refer to FIG. 1).

The following explains briefly an effect obtained by the typical embodiment to be disclosed in the present application.

That is, according to the present semiconductor integrated circuit (2), it is possible to accomplish the calibration operation for the speed detection of the motor, without employing the correction process by an external CPU of the semiconductor integrated circuit.

DETAILED DESCRIPTION

1. Outline of Embodiment

Figure 1:
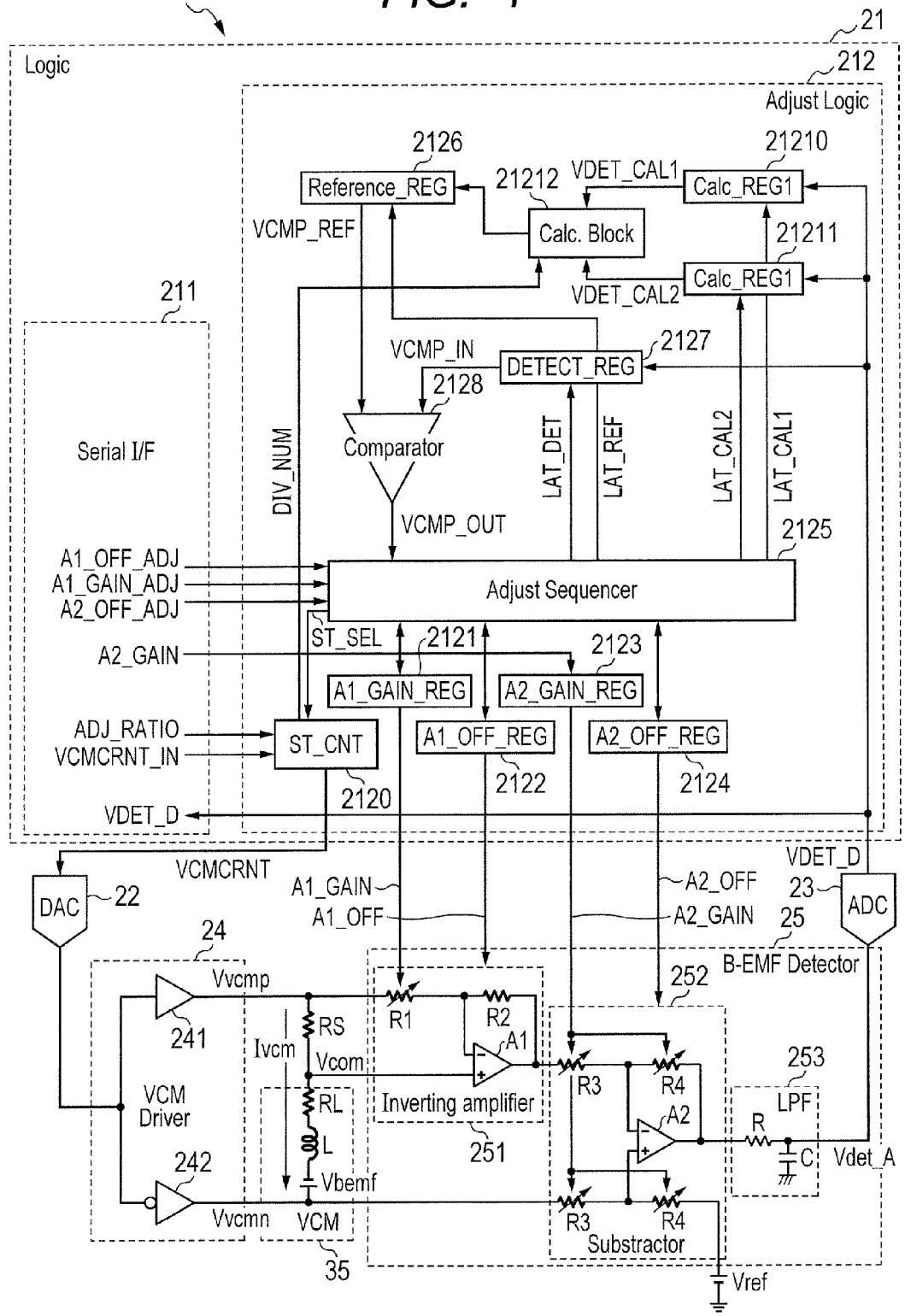
FIG. 1 is a drawing illustrating a configuration in which a semiconductor integrated circuit 2 of high integration density called a COMBO driver according to Embodiment 1 is mounted in a hard disk drive unit (HDD) illustrated in FIG. 18.

First, an outline of a typical embodiment of the invention disclosed in the present application is explained. A numerical symbol of the drawing referred to in parentheses in the outline explanation about the typical embodiment only illustrates what is included in the concept of the component to which the numerical symbol is attached.

<1> A typical embodiment discloses a semiconductor integrated circuit (2) which can be mounted in a motor drive controller for driving a motor (35) to move a magnetic head (33) of a hard disk drive unit.

In a calibration operation for a loading operation which moves the magnetic head (33) from a ramp mechanism (36) to the surface of a disk medium (31), or for a unloading operation which moves the magnetic head from the surface of the disk medium to the ramp mechanism, the semiconductor integrated circuit (2) makes flow a non-zero current (Ivcm) which is not a zero current substantially through the motor (35).

The non-zero current presses an arm (34) mounting the magnetic head against an outer circumference stopper at the time of the calibration operation for the loading operation or presses the arm mounting the magnetic head against an inner circumference stopper at the time of the calibration operation for the unloading operation, so as to bring the arm (34) into a fixed state.

The semiconductor integrated circuit (2) is comprised of a motor driver circuit (24) which drives the motor (35); a back EMF detector circuit (25) which detects a back EMF generated in the motor; and an adjustment unit (2125) which adjusts the gain of an internal amplifier (251) of the back EMF detector circuit (25).

At the time of the calibration operation, a back EMF (electromotive force) detection signal is generated from the back EMF detector circuit (25), in response to the motor driver circuit (24) making flow the non-zero current through the motor (35).

The semiconductor integrated circuit (2) generates a comparison reference value (VCMP_REF) corresponding to the back EMF detection signal generated from the back EMF detector circuit (25), in the fixed state of the arm (34) and the state where a zero current substantially with a zero current value flows through the motor (35) by the calibration operation.

At the time of the calibration operation, the semiconductor integrated circuit (2) sets the back EMF detection signal generated from the back EMF detector circuit (25) as a first value (VDET_CAL1) and a second (VDET_CAL2), in response to the non-zero current flowing through the motor (35).

At the time of the calibration operation, the semiconductor integrated circuit (2) calculates the comparison reference value (VCMP_REF) from the back EMF detection signal as the first value (VDET_CAL1) and the back EMF detection signal as the second value (VDET_CAL2).

The adjustment unit (2125) of the semiconductor integrated circuit (2) adjusts the gain of the internal amplifier (251) of the back EMF detector circuit (25) by the calibration operation, and the back EMF detector circuit (25) to which the adjusted gain is reflected generates the back EMF detection signal as a comparison input value (VCMP_IN).

The adjustment unit (2125) of the semiconductor integrated circuit (2) adjusts the gain of the internal amplifier (251) of the back EMF detector circuit (25) by the calibration operation, so as to reduce the difference of the comparison input value (VCMP_IN) and the comparison reference value (VCMP_REF) (Refer to FIG. 1).

According to the present embodiment, it is possible to accomplish the calibration operation for the speed detection of the motor, without employing the digital correction process by an external CPU of the semiconductor integrated circuit.

According to a preferred embodiment, at the time of the calibration operation, the semiconductor integrated circuit (2) sets the back EMF detection signal generated from the back EMF detector circuit (25) as the first value and the second value, respectively, by setting the non-zero current flowing through the motor as a first current value (Ivcm1) and a second current value (Ivcm2), respectively (refer to FIG. 1).

According to another preferred embodiment, the back EMF detector circuit (25) is comprised of a preceding-stage inverting amplifier (251) and a subsequent-stage subtraction amplifier (252), as the internal amplifier.

The preceding-stage inverting amplifier (251) and the subsequent-stage subtraction amplifier (252) of the back EMF detector circuit (25) amplify an inter-terminal voltage of the motor (35) and an inter-terminal voltage of a current sensing resistor (Rs) coupled in series with the motor (35), and accordingly, the back EMF detection signal is generated from the back EMF detector circuit (25).

Figure 10:
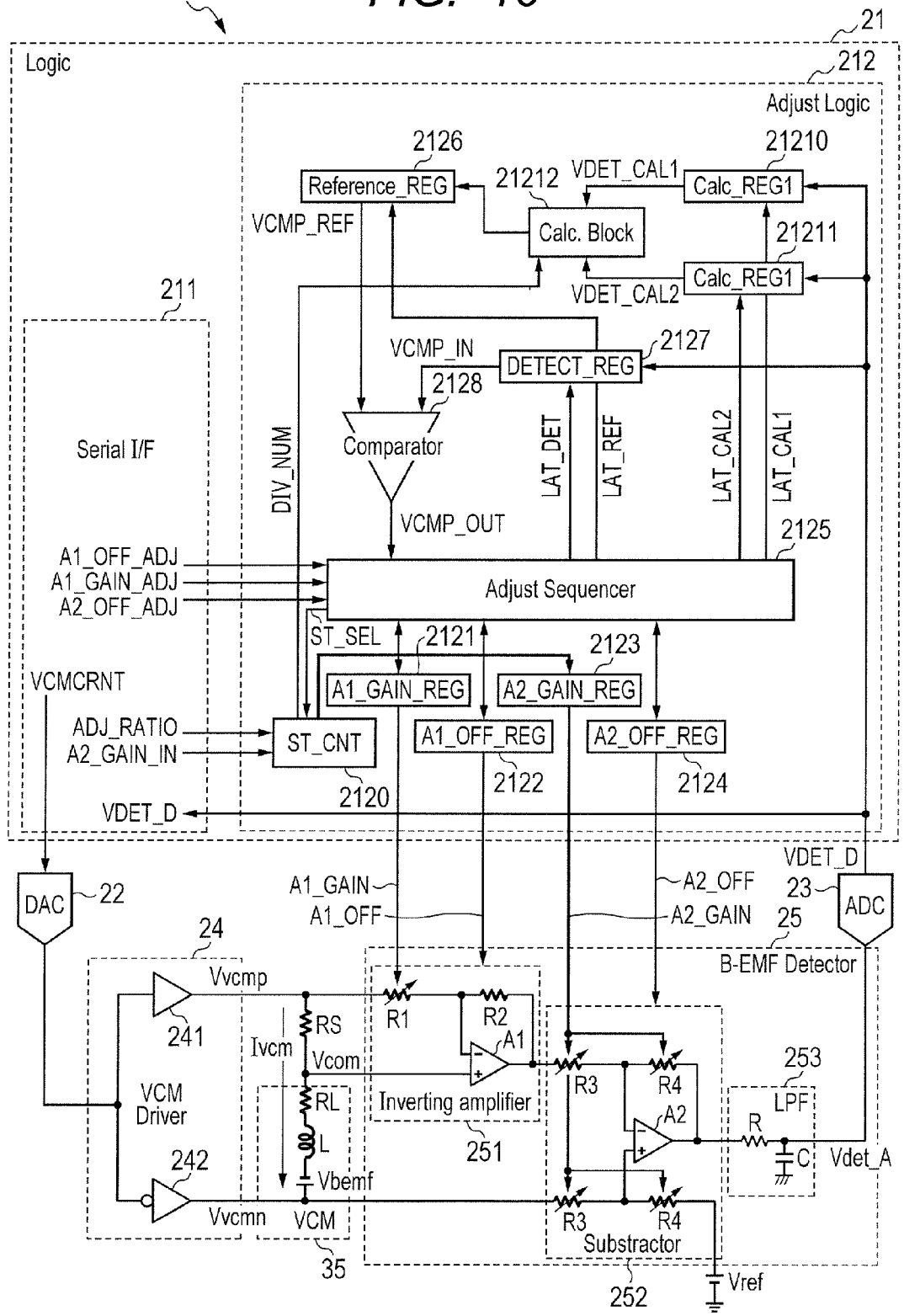
FIG. 10 is a drawing illustrating a configuration in which a semiconductor integrated circuit 2 of high integration density called a COMBO driver according to Embodiment 2 is mounted in a hard disk drive unit (HDD) illustrated in FIG. 18.

At the time of the calibration operation, the semiconductor integrated circuit sets a subtraction gain value (A2_GAIN) of the subsequent-stage subtraction amplifier (252) as a first subtraction gain value (A2_GAIN1) and a second subtraction gain value (A2_GAIN2), respectively, and sets the back EMF detection signal generated from the back EMF detector circuit (25) as the first value and the second value, respectively (Refer to FIG. 10).

According to a further another preferred embodiment, the back EMF detection signal as an analog back EMF detection signal (Vdet_A) is generated from the back EMF detector circuit (25).

Figure 15:
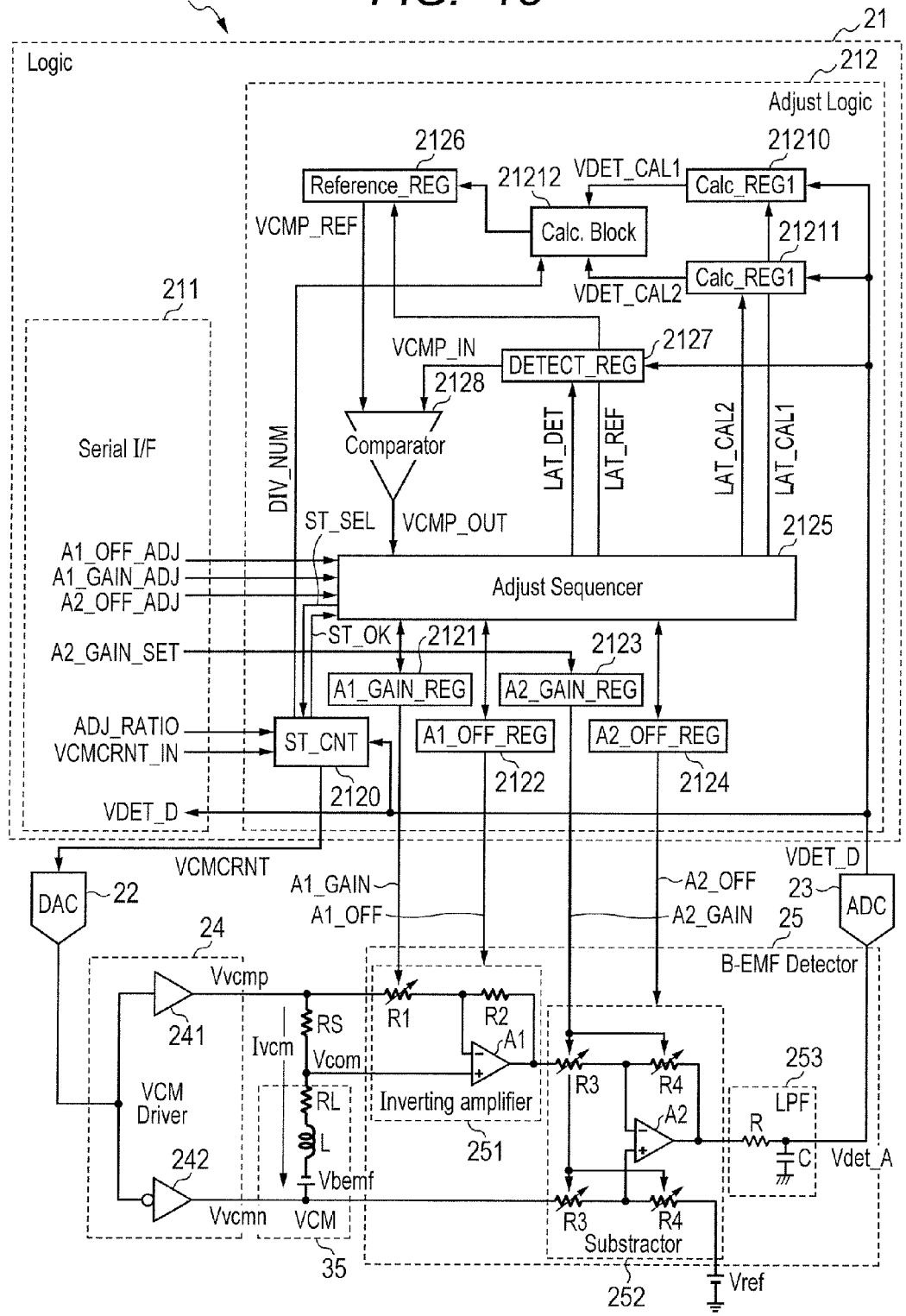
FIG. 15 is a drawing illustrating a configuration in which a semiconductor integrated circuit 2 of high integration density called a COMBO driver according to Embodiment 3 is mounted in a hard disk drive unit (HDD) illustrated in FIG. 18.
Figure 16:
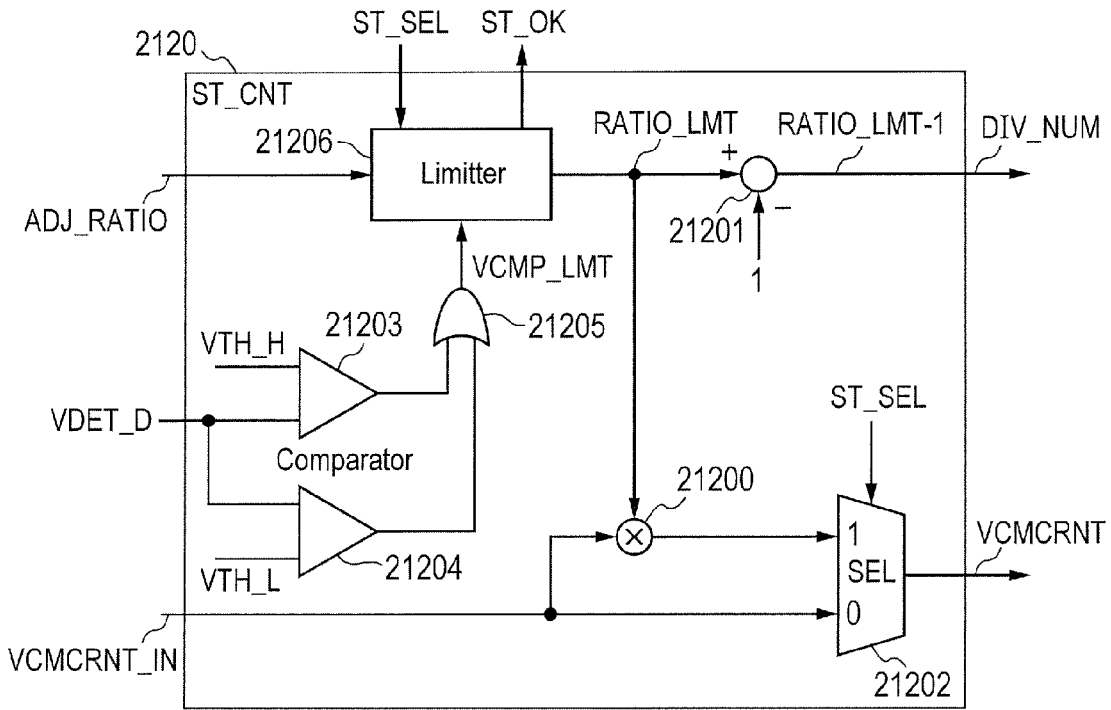
FIG. 16 is a drawing illustrating a configuration of a state control unit 2120 which generates a division indicating value DIV_NUM and a digital VCM current indicating value VCMCRNT, in the semiconductor integrated circuit 2 according to Embodiment 3 illustrated in FIG. 15.
Figure 17:
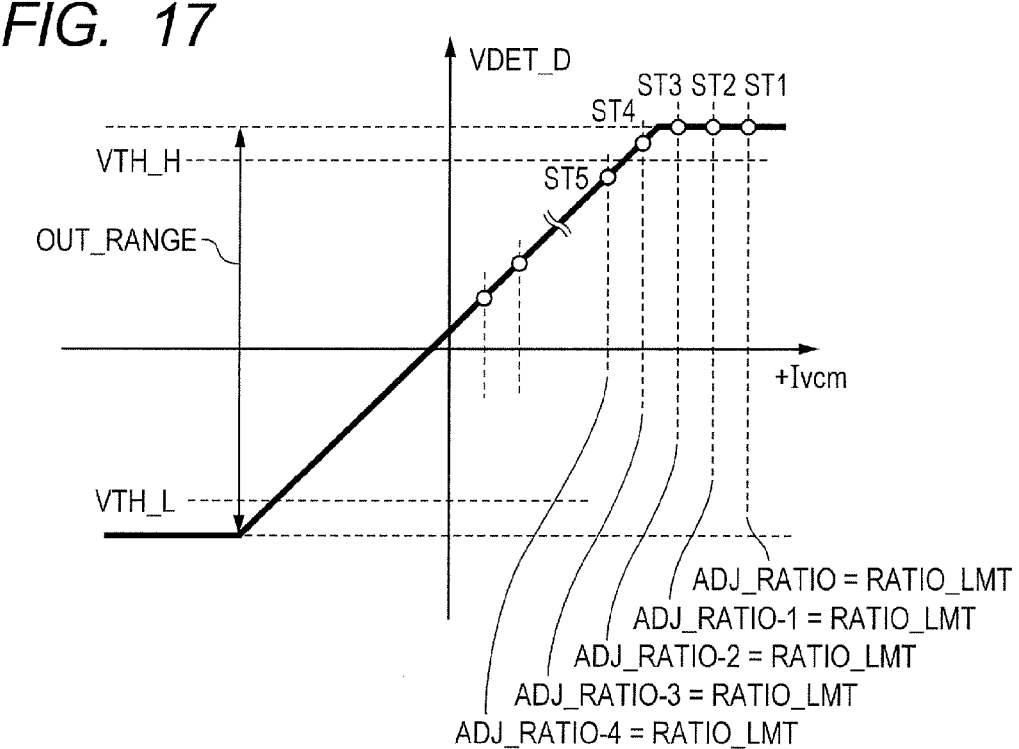
FIG. 17 is a drawing illustrating the characteristics of a digital back EMF detection signal VDET_D generated from an analog-to-digital converter 23 of the semiconductor integrated circuit 2 according to Embodiment 3 illustrated in FIG. 15, provided with a state control unit 2120 to generate a digital VCM current indicating value VCMCRNT illustrated in FIG. 16.

A maximum value of the analog back EMF detection signal (Vdet_A) is controlled to an allowable maximum voltage (VTH_H) lower than an operation power voltage (VDD) of the semiconductor integrated circuit (2), and a minimum value of the analog back EMF detection signal (Vdet_A) is controlled to an allowable minimum voltage (VTH_L) higher than a ground voltage (GND) of the semiconductor integrated circuit (2) (Refer to FIG. 15 through FIG. 17).

According to a more preferred embodiment, the semiconductor integrated circuit (2) is further configured with a digital-to-analog converter (22) and an analog-to-digital converter (23).

An output terminal of the digital-to-analog converter (22) is coupled to an input terminal of the motor driver circuit (24).

The analog back EMF detection signal (Vdet_A) as the back EMF detection signal generated by the back EMF detector circuit (25) is supplied to an input terminal of the analog-to-digital converter (23), and a digital back EMF detection signal (VDET_D) is generated from an output terminal of the analog-to-digital converter (23) (refer to FIG. 1).

According to another more preferred embodiment, the semiconductor integrated circuit (2) is further configured with a first detection register (2126), a second detection register (2127), a third detection register (21210), a fourth detection register (21211), a calculation unit (21212), and a comparator (2128).

At the time of the calibration operation, the digital back EMF detection signal (VDET_D) of the analog-to-digital converter (23), corresponding to the first value (VDET_CAL1) of the back EMF detection signal generated from the back EMF detector circuit (25) in response to the non-zero current flowing through the motor (35), is stored in the third detection register (21210).

At the time of the calibration operation, the digital back EMF detection signal (VDET_D) of the analog-to-digital converter (23), corresponding to the second value (VDET_CAL2) of the back EMF detection signal generated from the back EMF detector circuit (25) in response to the non-zero current flowing through the motor (35), is stored in the fourth detection register (21211).

The calculation unit (21212) calculates the comparison reference value (VCMP_REF) from the first information (VDET_CAL1) stored in the third detection register (21210) and the second information (VDET_CAL2) stored in the fourth detection register (21211), and stores the calculated comparison reference value into the first detection register (2126).

The digital back EMF detection signal (VDET_D) of the analog-to-digital converter (23), corresponding to the comparison input value (VCMP_IN) generated in response to the gain adjusted by the calibration operation, is stored in the second detection register (2127).

The comparator (2128) compares the comparison reference value (VCMP_REF) stored in the first detection register (2126) with the digital back EMF detection signal (VDET_D) of the analog-to-digital converter (23) stored in the second detection register (2127) corresponding to the comparison input value (VCMP_IN).

The adjustment unit (2125) adjusts the gain of the internal amplifier (251) of the back EMF detector circuit (25) by the calibration operation in response to the comparison result of the comparator (2128) (Refer to FIG. 1).

According to a further another more preferred embodiment, the calculation unit (21212) is comprised of a subtractor (212120), a divider (212121), and an adder (212122).

The first information (VDET_CAL1) stored in the third detection register (21210) is supplied to one input terminal of the subtractor (212120), the second information (VDET_CAL2) stored in the fourth detection register (21211) is supplied to the other input terminal of the subtractor, and a subtraction result is generated from an output terminal of the subtractor.

The subtraction result (VDET_CAL1−VDET_CAL2) of the subtractor (212120) is supplied to one input terminal of the divider (212121), a division indicating value (DIV_NUM) is supplied to the other input terminal of the divider, and a division result ((VDET_CAL1−VDET_CAL2)/DIV_NUM) is generated from the output terminal of the divider.

Figure 2:
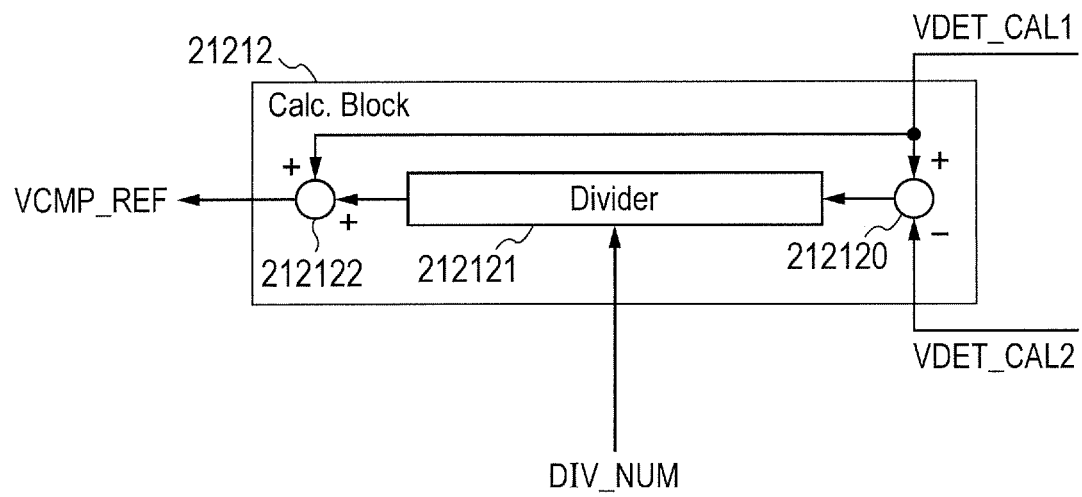
FIG. 2 is a drawing illustrating a configuration of a calculation unit 21212 which calculates a comparison reference value VCMP_REF for a gain compensation condition in the case of a zero (≈0 mA) current value of a VCM current Ivcm, from a first detection calibration signal VDET_CAL1, a second detection calibration signal VDET_CAL2, and a division indicating value DIV_NUM, in the semiconductor integrated circuit 2 according to Embodiment 1 illustrated in FIG. 1.

The first information (VDET_CAL1) stored in the third detection register (21210) is supplied to one input terminal of the adder (212122), the division result of the divider is supplied to the other input terminal of the adder, and the comparison reference value (VCMP_REF) as the addition result is generated from the output terminal of the adder (refer to FIG. 2).

According to a yet another more preferred embodiment, the semiconductor integrated circuit (2) is further configured with a state control unit (2120) for setting the back EMF detection signal, generated from the back EMF detector circuit (25) in response to the non-zero current flowing through the motor at the time of the calibration operation, as the first value (VDET_CAL1) and the second value (VDET_CAL2).

The state control unit (2120) is comprised of at least a multiplier (21200) and a selector (21202).

A ratio indicating value (ADJ_RATIO) is supplied to one input terminal of the multiplier (21200), a motor input current indicating value (VCMCRNT_IN) is supplied to the other input terminal of the multiplier, and a multiplication result (ADJ_RATIO·VCMCRNT_IN) is generated from an output terminal of the multiplier.

The multiplication result (ADJ_RATIO·VCMCRNT_IN) of the multiplier is supplied to one input terminal of the selector (21202), the motor input current indicating value (VCMCRNT_IN) is supplied to the other input terminal of the selector, and a selection instruction signal (ST_SEL) is supplied to a selection control terminal of the selector.

When the selection instruction signal supplied to the selection control terminal of the selector (21202) is in a first state (low level), the motor input current indicating value (VCMCRNT_IN) supplied to the other input terminal of the selector is generated from the output terminal of the selector as a motor current indicating value (VCMCRNT).

When the selection instruction signal supplied to the selection control terminal of the selector (21202) is in a second state (high level), the multiplication result (ADJ_RATIO·VCMCRNT_IN) of the multiplier supplied to the one input terminal of the selector is generated from the output terminal of the selector as the motor current indicating value (VCMCRNT).

The motor current indicating value (VCMCRNT) generated from the output terminal of the selector (21202) in response to the selection instruction signal of the first state sets the back EMF detection signal as the first value (VDET_CAL1).

The motor current indicating value (VCMCRNT) generated from the output terminal of the selector (21202) in response to the selection instruction signal of the second state sets the back EMF detection signal as the second value (VDET_CAL2).

The state control unit (2120) generates the division indicating value (DIV_NUM) depending on the ratio indicating value (ADJ_RATIO) supplied to the one input terminal of the multiplier (21200).

Figure 3:
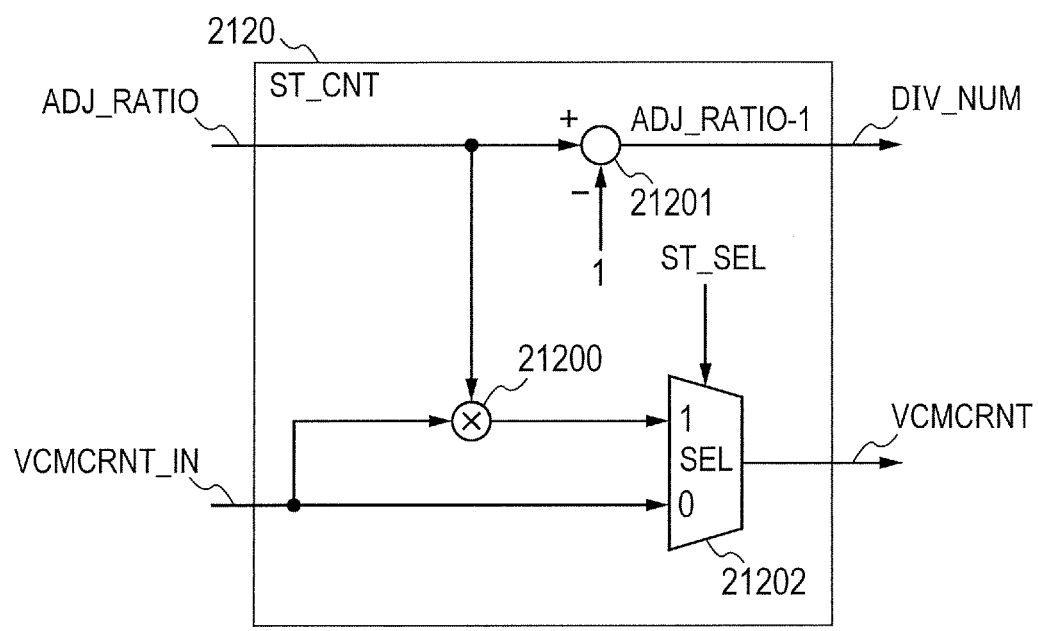
FIG. 3 is a drawing illustrating a configuration of a state control unit 2120 which generates a division indicating value DIV_NUM and a digital VCM current indicating value VCMCRNT, in the semiconductor integrated circuit 2 according to Embodiment 1 illustrated in FIG. 1.

The division indicating value (DIV_NUM) generated from the state control unit (2120) is supplied to the other input terminal of the divider (212121) of the calculation unit (21212) (refer to FIG. 1 through FIG. 3).

According to a further yet another more preferred embodiment, the state control unit (2120) is further configured with a subtractor (21201).

The ratio indicating value (ADJ_RATIO) is supplied to one input terminal of the subtractor (21201), "1" is supplied to the other input terminal of the subtractor, and the division indicating value (DIV_NUM) as the subtraction result is generated from the output terminal of the subtractor.

The division indicating value (DIV_NUM) generated from the output terminal of the subtractor (21201) of the state control unit (2120) is the subtraction result (ADJ_RATIO−1) in which "1" is subtracted from the ratio indicating value (ADJ_RATIO).

The ratio indicating value (ADJ_RATIO) satisfies the conditions of ADJ_RATIO=$2^n$+1 (n is an integer), and the divider (212121) of the calculation unit (21212) is comprised of a shift register which shifts the bit data of the ratio indicating value (ADJ_RATIO) rightward in response to the division indicating value (DIV_NUM) (refer to FIG. 2 and FIG. 3).

According to a specific embodiment, the semiconductor integrated circuit (2) is further configured with a state control unit (2120) for setting the back EMF detection signal generated from the back EMF detector circuit (25) as the first value (VDET_CAL1) and the second value (VDET_CAL2), in response to the non-zero current flowing through the motor, at the time of the calibration operation.

The state control unit (2120) is comprised of a multiplier (21200) and a selector (21202) at least.

A ratio indicating value (ADJ_RATIO) is supplied to one input terminal of the multiplier (21200), a gain indicating value (A2_GAIN_IN) is supplied to the other input terminal of the multiplier, and a multiplication result (ADJ_RATIO·A2_GAIN_IN) is generated from an output terminal of the multiplier.

The multiplication result (ADJ_RATIO·A2_GAIN_IN) of the multiplier is supplied to one input terminal of the selector (21202), the gain indicating value (A2_GAIN_IN) is supplied to the other input terminal of the selector, and a selection instruction signal (ST_SEL) is supplied to a selection control terminal of the selector.

When the selection instruction signal supplied to the selection control terminal of the selector (21202) is in a first state (low level), the gain indicating value (A2_GAIN_IN) supplied to the other input terminal of the selector is generated from an output terminal of the selector as the subtraction gain value (A2_GAIN) of the subtraction amplifier (251).

When the selection instruction signal supplied to the selection control terminal of the selector (21202) is in a second state (high level), the multiplication result (ADJ_RATIO ·A2_GAIN_IN) of the multiplier supplied to the one input terminal of the selector is generated from the output terminal of the selector as the subtraction gain value (A2_GAIN) of the subtraction amplifier (251).

The subtraction gain value (A2_GAIN) of the subtraction amplifier (251) generated from the output terminal of the selector (21202) in response to the selection instruction signal of the first state sets the back EMF detection signal as the first value (VDET_CAL1).

The subtraction gain value (A2_GAIN) of the subtraction amplifier (251) generated from the output terminal of the selector (21202) in response to the selection instruction signal of the second state sets the back EMF detection signal as the second value (VDET_CAL2).

The state control unit (2120) generates the division indicating value (DIV_NUM) depending on the ratio indicating value (ADJ_RATIO) supplied to the one input terminal of the multiplier (21200).

Figure 11:
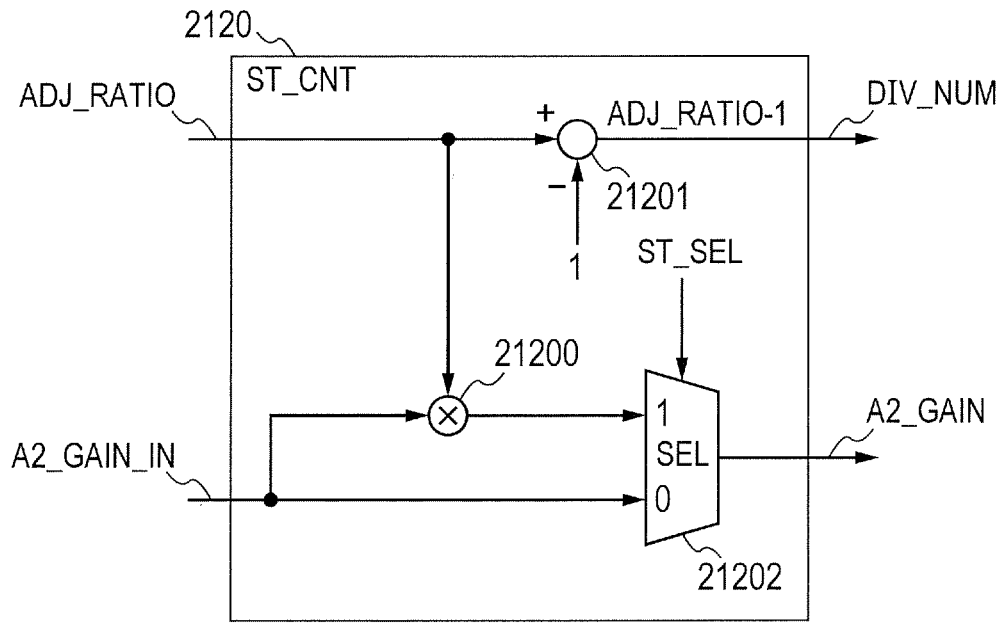
FIG. 11 is a drawing illustrating a configuration of a state control unit 2120 which generates a division indicating value DIV_NUM and a subtraction gain value A2_GAIN, in the semiconductor integrated circuit 2 according to Embodiment 2 illustrated in FIG. 10.

The division indicating value (DIV_NUM) generated from the state control unit (2120) is supplied to the other input terminal of the divider (212121) of the calculation unit (21212) (refer to FIG. 2, FIG. 10, and FIG. 11)

According to another specific embodiment, the state control unit (2120) is further configured with a subtractor (21201).

The ratio indicating value (ADJ_RATIO) is supplied to one input terminal of the subtractor (21201), "1" is supplied to the other input terminal of the subtractor, and the division indicating value (DIV_NUM) as the subtraction result is generated from an output terminal of the subtractor.

The division indicating value (DIV_NUM) generated from the output terminal of the subtractor (21201) of the state control unit (2120) is the subtraction result (ADJ_RATIO−1) in which "1" is subtracted from the ratio indicating value (ADJ_RATIO).

The ratio indicating value (ADJ_RATIO) satisfies the conditions of ADJ_RATIO=$2^n$+1 (n is an integer), and the divider (212121) of the calculation unit (21212) is comprised of a shift register which shifts the bit data of the ratio indicating value rightward in response to the division indicating value (refer to FIG. 2 and FIG. 11).

According to a more specific embodiment, the state control unit (2120) controls the maximum value and the minimum value of the analog back EMF detection signal (Vdet_A) to the allowable maximum voltage (VTH_H) and the allowable minimum voltage (VTH_L), respectively.

The state control unit (2120) is further configured with a first comparator (21203), a second comparator (21204), an OR circuit (21205), and a limiter (21206).

The digital back EMF detection signal (VDET_D) of the analog-to-digital converter (23) is supplied in common to one input terminal of the first comparator (21203) and one input terminal of the second comparator (21204).

The allowable maximum voltage (VTH_H) is supplied to the other input terminal of the first comparator (21203), and the allowable minimum voltage (VTH_L) is supplied to the other input terminal of the second comparator (21204).

A comparison output signal of the first comparator (21203) and a comparison output signal of the second comparator (21204) are supplied respectively to one input terminal and the other input terminal of the OR circuit (21205).

The ratio indicating value (ADJ_RATIO) and an output signal (VCMP_LMT) generated from the OR circuit (21205) are supplied to the limiter (21206).

When the digital back EMF detection signal (VDET_D) supplied in common to the one input terminal of the first comparator and the one input terminal of the second comparator is higher than the allowable maximum voltage or is lower than the allowable minimum voltage, the limiter (21206) generates a limit ratio indicating value (RATIO_LMT).

The limit ratio indicating value (RATIO_LMT) generated by the limiter (21206) is set as a value smaller than the ratio indicating value (ADJ_RATIO), and supplied to the one input terminal of the subtractor (21201) of the state control unit (2120) (refer to FIG. 16).

According to another more specific embodiment, the motor driver circuit (24) drives a voice coil motor (VCM) as the motor (35) to move the magnetic head (33) of the hard disk drive unit.

According to the most specific embodiment, the semiconductor integrated circuit (2) integrates a voice coil motor driver for driving the voice coil motor (VCM) and a spindle motor driver for driving the spindle motor to turn the disk medium (31).

<2> A typical embodiment of another viewpoint discloses an operating method of a semiconductor integrated circuit (2) which can be mounted in a motor drive controller for driving a motor (35) which moves a magnetic head (33) of a hard disk drive unit.

In a calibration operation for a loading operation which moves the magnetic head (33) from a ramp mechanism (36) to the surface of a disk medium (31), or for a unloading operation which moves the magnetic head from the surface of the disk medium to the ramp mechanism, the semiconductor integrated circuit (2) makes flow a non-zero current (Ivcm) which is not a zero current substantially through the motor (35).

The non-zero current presses an arm (34) mounting the magnetic head against an outer circumference stopper at the time of the calibration operation for the loading operation or presses the arm mounting the magnetic head against an inner circumference stopper at the time of the calibration operation for the unloading operation, so as to bring the arm (34) into a fixed state.

The semiconductor integrated circuit (2) is comprised of a motor driver circuit (24) which drives the motor (35); a back EMF detector circuit (25) which detects a back EMF generated in the motor; and an adjustment unit (2125) which adjusts the gain of an internal amplifier (251) of the back EMF detector circuit (25).

At the time of the calibration operation, a back EMF (electromotive force) detection signal is generated from the back EMF detector circuit (25), in response to the motor driver circuit (24) making flow the non-zero current through the motor (35).

The semiconductor integrated circuit (2) generates a comparison reference value (VCMP_REF) corresponding to the back EMF detection signal generated from the back EMF detector circuit (25), in the fixed state of the arm (34) and the state where a zero current substantially with a zero current value flows through the motor (35) by the calibration operation.

At the time of the calibration operation, the semiconductor integrated circuit (2) sets the back EMF detection signal generated from the back EMF detector circuit (25) as a first value (VDET_CAL1) and a second (VDET_CAL2), in response to the non-zero current flowing through the motor (35).

At the time of the calibration operation, the semiconductor integrated circuit (2) calculates the comparison reference value (VCMP_REF) from the back EMF detection signal as the first value (VDET_CAL1) and the back EMF detection signal as the second value (VDET_CAL2).

The adjustment unit (2125) of the semiconductor integrated circuit (2) adjusts the gain of the internal amplifier (251) of the back EMF detector circuit (25) by the calibration operation, and the back EMF detector circuit (25) to which the adjusted gain is reflected generates the back EMF detection signal as a comparison input value (VCMP_IN).

The adjustment unit (2125) of the semiconductor integrated circuit (2) adjusts the gain of the internal amplifier (251) of the back EMF detector circuit (25) by the calibration operation, so as to reduce the difference of the comparison input value (VCMP_IN) and the comparison reference value (VCMP_REF) (Refer to FIG. 1).

According to the present embodiment, it is possible to accomplish the calibration operation for the speed detection of the motor, without employing the correction process by an external CPU of the semiconductor integrated circuit.

2. Details of Embodiments

Next, the embodiments are further explained in full detail. In the entire diagrams for explaining the embodiments of the present invention, the same symbol is attached to an element which possesses the same function as in the previous diagram, and the repeated explanation thereof is omitted.

Embodiment 1

A Configuration of a Semiconductor Integrated Circuit According to Embodiment 1

Figure 18:
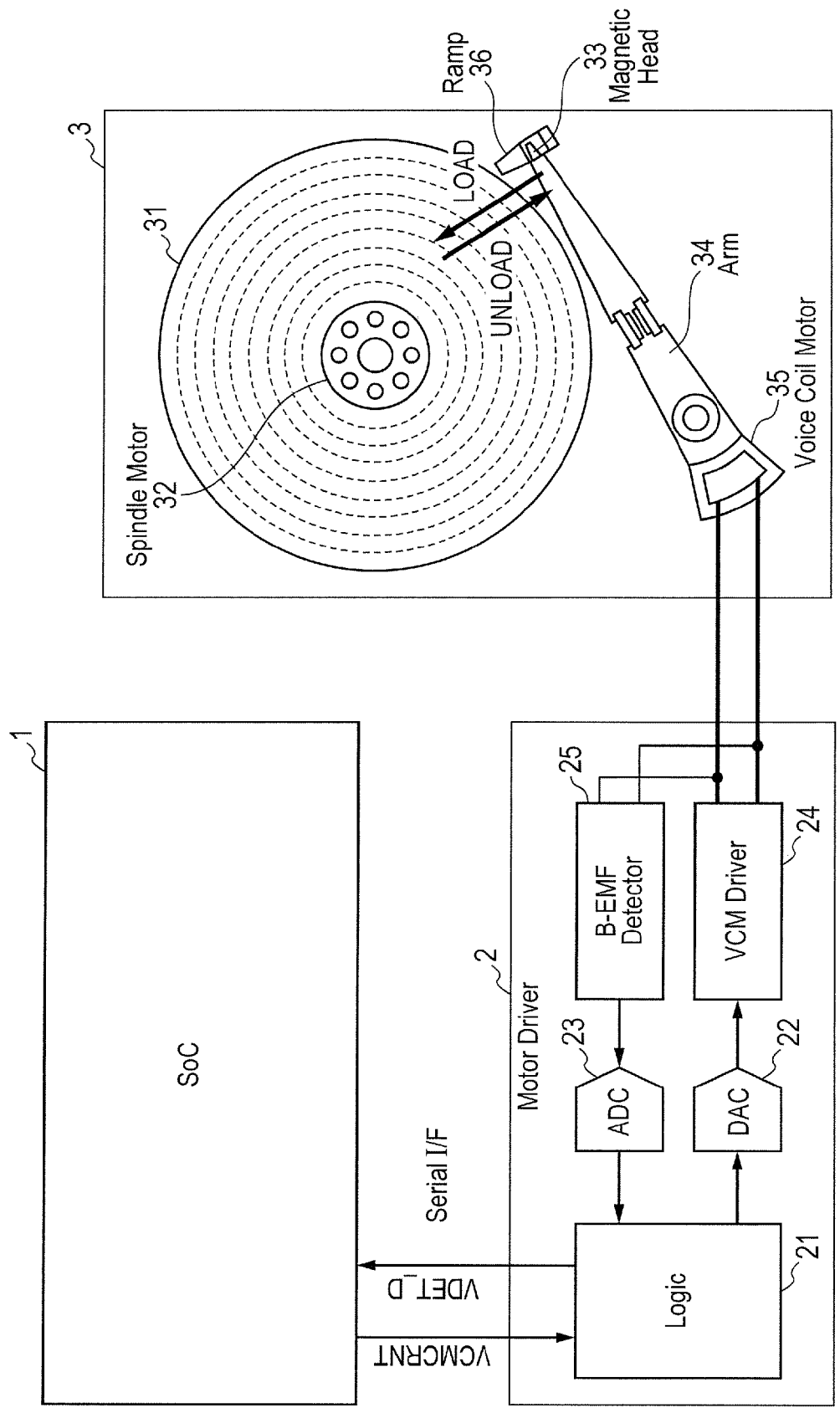
FIG. 18 is a drawing illustrating a configuration of a hard disk drive unit (HDD) in which a semiconductor integrated circuit 2 of high integration density called a COMBO driver is mounted.

FIG. 1 illustrates a configuration in which a semiconductor integrated circuit 2 of high integration density called a COMBO driver according to Embodiment 1 is mounted in a hard disk drive unit (HDD) illustrated in FIG. 18. The semiconductor integrated circuit 2 according to Embodiment 1 illustrated in FIG. 1 performs control over the moving velocity of the magnetic head 33 to a constant velocity, in the unloading operation UNLOAD and the loading operation LOAD for example, by controlling the digital back EMF detection signal VDET_D to be constant, through the feedback control of the digital VCM current indicating value VCMCRNT by the controller 1.

The Outline of the Semiconductor Integrated Circuit According to Embodiment 1

Figure 19:
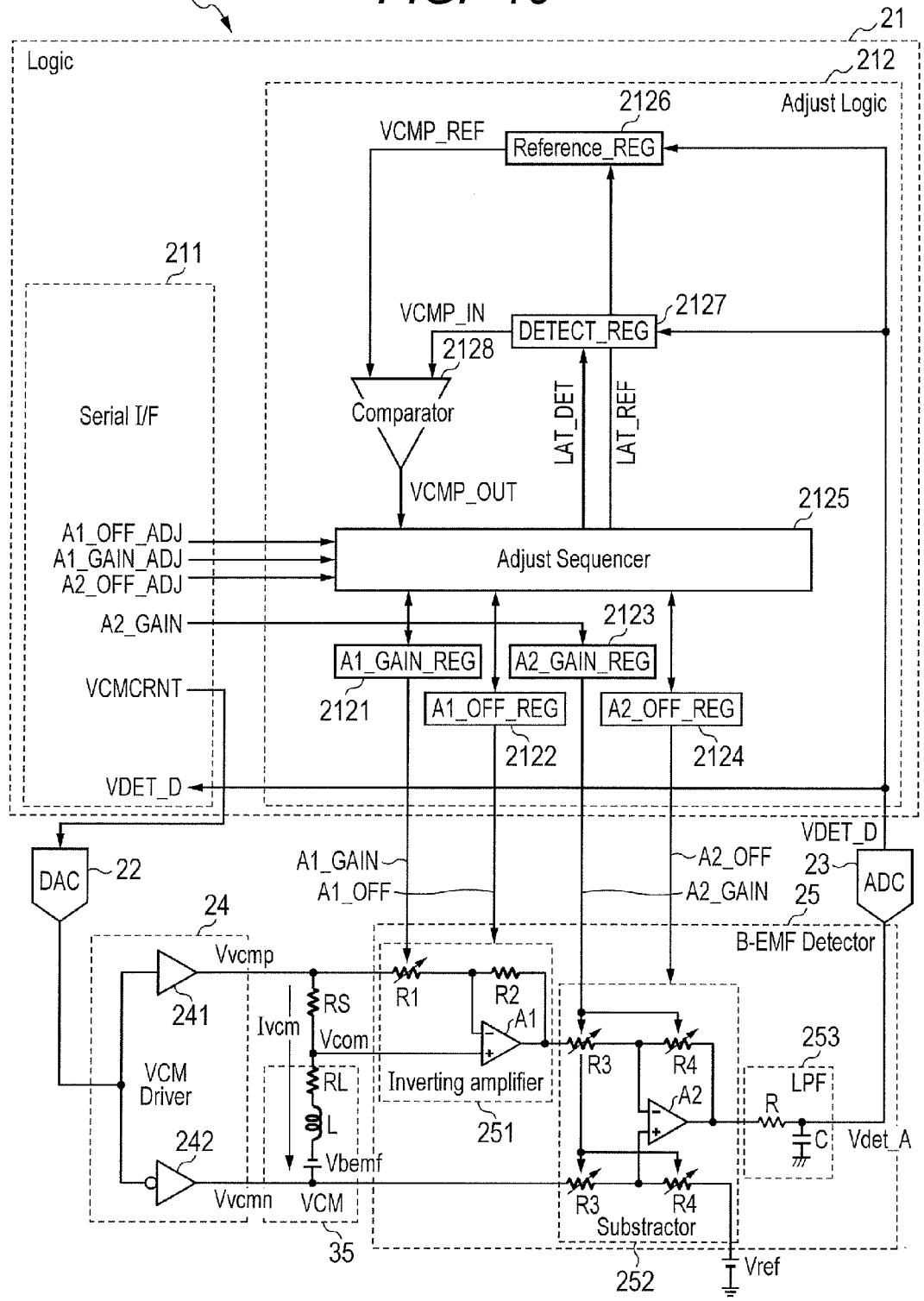
FIG. 19 is a drawing illustrating a state where the semiconductor integrated circuit 2 of high integration density called the COMBO driver, examined by the present inventors prior to the present invention, is mounted in the hard disk drive unit (HDD) illustrated in FIG. 18.

As illustrated in FIG. 1, as is the case with the semiconductor integrated circuit 2 illustrated in FIG. 19, a semiconductor integrated circuit 2 of the COMBO driver according to Embodiment 1 is comprised of the logic circuit 21, the digital-to-analog converter 22, the analog-to-digital converter 23, the VCM driver circuit 24, and the back EMF detector circuit 25. The semiconductor integrated circuit 2 according to Embodiment 1 illustrated in FIG. 1 is different in the following point from the semiconductor integrated circuit 2, which has been examined by the present inventors prior to the present invention and is illustrated in FIG. 19.

That is, in the adjustment logic circuit 212 of the logic circuit 21 of the semiconductor integrated circuit 2 according to Embodiment 1 illustrated in FIG. 1, a state control unit 2120, a third detection register 21210, a fourth detection register 21211, and a calculation unit 21212, which do not exist in the semiconductor integrated circuit 2 of FIG. 19, are added. This is the point of difference from the semiconductor integrated circuit 2 which has been examined by the present inventors prior to the present invention and is illustrated in FIG. 19.

That is, the state control unit 2120 of the semiconductor integrated circuit 2 according to Embodiment 1 illustrated in FIG. 1 sets the analog back EMF detection signal Vdet_A of the back EMF detector circuit 25 to the first value and the second value, during the calibration operation period for the unloading operation UNLOAD or the loading operation LOAD, for correcting an error involved in the detection value of the back EMF Vbemf of the VCM 35. In this way, in the period when the analog back EMF detection signal Vdet_A of the back EMF detector circuit 25 is set as the first value and the second value, the magnetic head 33 and the arm 34 are pressed against an inner circumference stopper or an outer circumference stopper by setting the current value of the VCM current Ivcm flowing through the VCM 35 as a non-zero current ($\neq$0 mA). As a result, the magnetic head 33 and the arm 34 are brought in a fixed state, without moving to the inward direction or the outward direction of the magnetic disk unit 31. Therefore, the back EMF Vbemf of the first term of the second line of the right-hand side of Equation 1 becomes zero substantially, and it becomes possible to prevent the occurrence of disturbances or errors in the calibration operation.

The inner circumference stopper is a mechanical member which forbids, in the calibration operation for the unloading operation UNLOAD, the magnetic head 33 and the arm 34 to excessively move inward beyond the most inner circumference of the storage sector region of the magnetic disk 31, by the VCM current Ivcm of a positive current value.

The outer circumference stopper is a mechanical member which forbids, in the calibration operation for the loading operation LOAD, the magnetic head 33 and the arm 34 to excessively move outward beyond the most outer circumference of the storage sector region of the magnetic disk 31, by the VCM current Ivcm of a negative current value.

The digital back EMF detection signal VDET_D, outputted from the analog-to-digital converter 23 in response to the analog back EMF detection signal Vdet_A set as the first value, is stored in the third detection register 21210 as the first detection calibration signal VDET_CAL1. Similarly, the digital back EMF detection signal VDET_D, outputted from the analog-to-digital converter 23 in response to the analog back EMF detection signal Vdet_A set as the second value, is stored in the fourth detection register 21211 as the second detection calibration signal VDET_CAL2.

From the first detection calibration signal VDET_CAL1 stored in the third detection register 21210 and the second detection calibration signal VDET_CAL2 stored in the fourth detection register 21211, the calculation unit 21212 calculates a comparison reference value VCMP_REF for a gain compensation condition in cases where the current value of the VCM current Ivcm is zero ($\approx$0 mA). The comparison reference value VCMP_REF for the gain compensation condition calculated by the calculation unit 21212 is stored in the first detection register 2126. During the calibration operation period, a comparison reference value VCMP_REF for the gain compensation condition is supplied to one input terminal of the comparator 2128 from the first detection register 2126, and a comparison input value VCMP_IN responding to the digital back EMF detection signal VDET_D is supplied from the second detection register 2127 to the other input terminal of the comparator 2128. As a result, in response to the comparison output signal VCMP_OUT of the comparator 2128, the adjustment sequencer 2125 converges the gain (=R2/R1) of the inverting amplifier 251 of the back EMF detector circuit 25 to a prescribed value, with the use of a binary search algorithm, for example. That is, even if the resistance ratio of the parasitic resistance RL of the VCM 35 and the VCM current sensing resistor Rs varies due to a temperature change, the gain (=R2/R1) of the inverting amplifier 251 of the back EMF detector circuit 25 is varied correspondingly; thereby it becomes possible to fulfill the gain compensation condition of (RL−R2·Rs/R1)≈0 in the second term of the second line of the right-hand side of Equation 1.

The adjustment sequencer 2125 which performs the calibration operation for attaining the gain compensation condition described above can be configured with an internal CPU integrated into a single semiconductor chip of the semiconductor integrated circuit 2, for example. The operation program for the internal CPU which composes the adjustment sequencer 2125 to perform the calibration operation is stored in a nonvolatile memory. This nonvolatile memory can be arranged in the hard disk drive unit (HDD) illustrated in FIG. 18. It is also possible to integrate the nonvolatile memory into single semiconductor chip of the semiconductor integrated circuit 2.

In this way, according to the semiconductor integrated circuit 2 according to Embodiment 1 illustrated in FIG. 1, it is possible to perform the calibration operation for the speed detection of the motor, without employing the digital correcting by means of an external CPU. According to the semiconductor integrated circuit 2 according to Embodiment 1 illustrated in FIG. 1, it is possible to satisfies the gain compensation condition of the inverting amplifier 251 of the back EMF detector circuit 25 by the calibration operation for the unloading operation UNLOAD or the loading operation LOAD in particular. Therefore, it becomes possible to maintain the linearity of the analog back EMF detection signal Vdet_A generated from the back EMF detector circuit 25. Furthermore, according to the semiconductor integrated circuit 2 according to Embodiment 1 illustrated in FIG. 1, the VCM current Ivcm is set as a non-zero current (≠0 mA) during the period when the analog back EMF detection signal Vdet_A is set as the first value and the second value by the calibration operation. Therefore, the magnetic head 33 and the arm 34 are pressed against the inner circumference stopper or the outer circumference stopper. As a result, the magnetic head 33 and the arm 34 are brought in a fixed state, without moving to the inward direction or the outward direction of the magnetic disk unit 31. Therefore, the back EMF Vbemf of the first term of the second line of the right-hand side of Equation 1 becomes zero substantially, and it becomes possible to prevent the occurrence of disturbances or errors in the calibration operation.

Furthermore, according to the semiconductor integrated circuit 2 according to Embodiment 1 illustrated in FIG. 1, it becomes possible to calculate the comparison reference value VCMP_REF for the gain compensation condition in cases where the current value of the VCM current Ivcm is zero (≈0 mA), from the first detection calibration signal VDET_CAL1 and the second detection calibration signal VDET_CAL2 responding to the analog back EMF detection signal Vdet_A set as the first value and the second value.

A Detailed Configuration of the Semiconductor Integrated Circuit According to Embodiment 1

The following explains the detailed configuration of the semiconductor integrated circuit 2 of the COMBO driver according to Embodiment 1 illustrated in FIG. 1. The semiconductor integrated circuit 2 of the COMBO driver according to Embodiment 1 illustrated in FIG. 1 integrates the voice coil motor driver for driving the VCM 35 illustrated in FIG. 18 and the spindle motor driver for driving the spindle motor rotating the magnetic disk unit 31 illustrated in FIG. 18 at high velocity. However, the spindle motor driver integrated into the semiconductor integrated circuit 2 of the COMBO driver according to Embodiment 1 illustrated in FIG. 1 is irrelevant to the essential feature of the present invention; therefore, the detailed explanation thereof is omitted.

The semiconductor integrated circuit 2 according to Embodiment 1 illustrated in FIG. 1 also controls the digital back EMF detection signal VDET_D to be constant by means of the feedback control of the digital VCM current indicating value VCMCRNT by the controller 1, so that the moving velocity of the magnetic head 33 is controlled to be approximately constant in the loading operation LOAD and the unloading operation UNLOAD.

The semiconductor integrated circuit 2 of the COMBO driver according to Embodiment 1 illustrated in FIG. 1 is comprised of a logic circuit 21, a digital-to-analog converter 22, an analog-to-digital converter 23, a VCM driver circuit 24, and a back EMF detector circuit 25. These circuits 21, 22, 23, 24, and 25 are integrated as an internal electronic circuit of the semiconductor integrated circuit 2, into the single semiconductor chip of the semiconductor integrated circuit 2 by the semiconductor manufacturing process. The VCM 35 and the detection resistor Rs are electrically coupled to the semiconductor integrated circuit 2 as external components of the semiconductor integrated circuit 2.

The logic circuit 21 is comprised of a serial interface 211 and an adjustment logic circuit 212.

External control signals A1_OFF_ADJ, A1_GAIN_ADJ, A2_OFF_ADJ, A2_GAIN, and ADJ_RATIO are supplied to the serial interface 211 from the controller 1 configured with the system on a chip (SoC) of FIG. 18. In response to the digital voice coil motor input current indicating value (hereinafter referred to as the digital VCM input current indicating value) VCMCRNT_IN supplied from the controller 1 and the serial interface 211, the adjustment logic circuit 212 supplies the digital VCM current indicating value VCMCRNT to the input terminal of the digital-to-analog converter 22. The serial interface 211 supplies a digital back EMF detection signal VDET_D generated by the analog-to-digital converter 23 to the controller 1.

The adjustment logic circuit 212 is comprised of a state control unit 2120, four adjustment registers 2121, 2122, 2123, and 2124, an adjustment sequencer 2125, four back EMF detection signal registers 2126, 2127, 21210, and 21211, and a comparator 2128.

A digital VCM current indicating value VCMCRNT is supplied from the adjustment logic circuit 212 of the logic circuit 21 to the input terminal of the digital-to-analog converter 22, and an analog VCM current indicating value is supplied from an output terminal of the digital-to-analog converter 22 to an input terminal of the VCM driver circuit 24.

The VCM driver circuit 24 is comprised of a non-inverting amplifier 241 and an inverting amplifier 242, in order to generate a positive polarity VCM drive voltage Vvcmp and a negative polarity VCM drive voltage Vvcmn. The analog VCM current indicating value of the output terminal of the digital-to-analog converter 22 is supplied to an input terminal of the non-inverting amplifier 241 and an input terminal of the inverting amplifier 242. One end of the detection resistor Rs for detecting the VCM current Ivcm which flows through the VCM 35 is coupled to the output terminal of the non-inverting amplifier 241. The other end of the detection resistor Rs is coupled to one end of the VCM 35, and the other end of the VCM 35 is coupled to the output terminal of the inverting amplifier 242. Between one end and the other end of the VCM 35, a coil L, a parasitic resistance RL, and a back EMF Vbemf of the VCM 35 are coupled in series.

The back EMF detector circuit 25 is comprised of an inverting amplifier 251, a subtraction amplifier 252, and a low pass filter 253. The inverting amplifier 251 is comprised of a first resistor of a value of resistance R1, a second resistor of a value of resistance R2, and a first differential amplifier A1. The subtraction amplifier 252 is comprised of a third resistor of a value of resistance R3, a fourth resistor of a value of resistance R4, a fifth resistor of a value of resistance R3, a sixth resistor of a value of resistance R4, and a second differential amplifier A2. The lowpass filter 253 is comprised of a resistor R and a capacitor C. The low pass filter 253 has the function of removing a high-frequency voltage component generated across both ends of the coil L of the VCM 35. One end of the first resistor of the value of resistance R1 of the inverting amplifier 251 is coupled to one end of a detection resistor Rs for detecting the VCM current Ivcm, the other end of the first resistor of the value of resistance R1 is coupled to an inverting input terminal (−) of the first differential amplifier A1 and one end of the second resistor of the value of resistance R2, and the other end of the second resistor of the value of resistance R2 is coupled to an output terminal of the first differential amplifier A1. A common voltage Vcom at a connection node of the other end of the detection resistor Rs and one end of the VCM 35 is supplied to a noninverting input terminal (+) of the first differential amplifier A1. An output signal of the inverting amplifier 251 is supplied to one end of the third resistor of the value of resistance R3 of the subtraction amplifier 252, the other end of the third resistor of the value of resistance R3 is coupled to one end of an inverting input terminal (−) of the second differential amplifier A2 and one end of the fourth resistor of the value of resistance R4, and the other end of the fourth resistor of the value of resistance R4 is coupled to an output terminal of the second differential amplifier A2. The other end of the VCM 35 is coupled to one end of the fifth resistor of the value of resistance R3, the other end of the fifth resistor of the value of resistance R3 is coupled to one end of an noninverting input terminal (+) of the second differential amplifier A2 and one end of the sixth resistor of the value of resistance R4, and a reference voltage Vref is supplied to the other end of the sixth resistor of the value of resistance R4. An output signal of the subtraction amplifier 252 is supplied to one end of the resistor R of the low pass filter 253, the other end of the resistor R is coupled to one end of the capacitor C of the low pass filter 253, and the other end of the capacitor C is coupled to the ground potential. An analog back EMF detection signal Vdet_A is generated from an output terminal of the low pass filter 253 of the back EMF detector circuit 25. The analog back EMF detection signal Vdet_A is converted into a digital back EMF detection signal by the analog-to-digital converter 23, and the digital back EMF detection signal VDET_D is supplied to the controller 1 via the logic circuit 21.

Assuming that the electric current which flows through the coil L of the VCM 35 is Ivcm, the back EMF is Vbemf, and the reference voltage is Vref, the analog back EMF detection signal Vdet_A from the output terminal of the back EMF detector circuit 25 is given by Equation 1 and Equation 2 described above.

Here, "+Ivcm" in the second term of the second line of the right-hand side of Equation 1 expresses that the VCM current Ivcm is a positive current value and that the magnetic head 33 moves from the ramp mechanism 36 toward the inward direction of the magnetic disk unit 31 at the time of the loading operation LOAD. "+Ivcm" in the second term of the second line of the right-hand side of Equation 1 expresses that the VCM current Ivcm is a positive current value and that the magnetic head 33 is pressed against the inner circumference stopper at the time of the calibration operation for the unloading operation UNLOAD. Furthermore, "−Ivcm" in the second term of the second line of the right-hand side of Equation 2 expresses that the VCM current Ivcm is a negative current value and that the magnetic head 33 moves from the inner circumference of the magnetic disk unit 31 to the direction of the ramp mechanism 36 at the time of the unloading operation UNLOAD. Also, "−Ivcm" in the second term of the second line of the right-hand side of Equation 2 expresses that the VCM current Ivcm is a negative current value and that the magnetic head 33 is pressed against an outer circumference stopper at the time of the calibration operation for the loading operation LOAD.

The adjustment logic circuit 212 of the logic circuit 21 is comprised of a first gain adjustment register 2121, a first offset control register 2122, a second gain adjustment register 2123, a second offset control register 2124, and an adjustment sequencer 2125. Furthermore, the adjustment logic circuit 212 of the logic circuit 21 is comprised of a first detection register 2126, a second detection register 2127, a comparator 2128, a third detection register 21210, a fourth detection register 21211, a calculation unit 21212, and a state control unit 2120.

The serial interface 211 of the logic circuit 21 is supplied, from the controller 1, with an inverting gain adjustment instruction signal A1_GAIN_ADJ, a first offset control instruction signal A1_OFF_ADJ, a subtraction gain value A2_GAIN, a second offset control instruction signal A2_OFF_ADJ, a digital VCM current indicating value VCMCRNT, and a ratio indicating value ADJ_RATIO.

During the calibration operation period which corrects an error involved in the detection value of the back EMF Vbemf of the VCM 35 for the loading operation LOAD or the unloading operation UNLOAD, the inverting gain adjustment instruction signal A1_GAIN_ADJ is supplied from the controller 1 to the adjustment sequencer 2125 via the serial interface 211. As the result, responding to the output signal of the comparator 2128 during the calibration operation, the adjustment sequencer 2125 corrects the inverting gain value A1_GAIN of the first gain adjustment register 2121 to a proper value. The inverting gain value A1_GAIN stored in the first gain adjustment register 2121 sets up the value of resistance R1 of the first resistor of the inverting amplifier 251 of the back EMF detector circuit 25. Therefore, the amplification gain of the inverting amplifier 251 of the back EMF detector circuit 25 is set up by the first resistor of the value of resistance R1 adjusted by the inverting gain adjustment instruction signal A1_ GAIN- _ADJ stored in the first gain adjustment register 2121. During the preparation period prior to the calibration operation, the first offset control instruction signal A1_OFF_ADJ is supplied from the controller 1 to the adjustment sequencer 2125 via the serial interface 211. Therefore, responding to the output signal of the comparator 2128 during the preparation period, the adjustment sequencer 2125 adjusts the first offset value A1_OFF of the first offset control register 2122 to a proper value. As a result, the first offset value A1_OFF stored in the first offset control register 2122 compensates the first differential input offset of the first differential amplifier A1 in the inverting amplifier 251 of the back EMF detector circuit 25. Similarly, the second offset control instruction signal A2_OFF_ADJ is supplied from the controller 1 to the adjustment sequencer 2125 via the serial interface 211 during the preparation period. Therefore, responding to the output signal of the comparator 2128 during the preparation period, the adjustment sequencer 2125 adjusts the second offset value A2_OFF of the second offset control register 2124 to a proper value. As a result, the second offset value A2_OFF stored in the second offset control register 2124 compensates the second differential input offset of the second differential amplifier A2 in the subtraction amplifier 252 of the back EMF detector circuit 25. Furthermore, during the preparation period prior to the calibration operation, the subtraction gain value A2_GAIN is supplied from the controller 1 to the second gain setting register 2123 via the serial interface 211. As the result, the subtraction gain value A2_GAIN stored in the second gain setting register 2123 sets up, in the subtraction amplifier 252 of the back EMF detector circuit 25, the resistance ratio of the third resistor of the value of resistance R3 and the fourth resistor of the value of resistance R4 and the resistance ratio of the fifth resistor of the value of resistance R3 and the sixth resistor of the value of resistance R4. That is, the subtraction amplification gain of the subtraction amplifier 252 of the back EMF detector circuit 25 is set up by the subtraction gain value A2_GAIN stored in the second gain setting register 2123.

The digital back EMF detection signal VDET_D generated from the analog-to-digital converter 23 is supplied to a signal input terminal of the second detection register 2127, a signal input terminal of the third detection register 21210, and a signal input terminal of the fourth detection register 21211. The detection value latch control signal LAT_DET is supplied from the adjustment sequencer 2125 to the latch control terminal of the second detection register 2127, the detection value latch control signal LAT_CAL1 is supplied from the adjustment sequencer 2125 to a latch control terminal of the third detection register 21210, and the detection value latch control signal LAT_CAL2 is supplied from the adjustment sequencer 2125 to a latch control terminal of the fourth detection register 21211. The digital back EMF detection signal VDET_D, outputted from the analog-to-digital converter 23 in response to the analog back EMF detection signal Vdet_A set as the first value, is stored in the third detection register 21210 as the first detection calibration signal VDET_CAL1. The digital back EMF detection signal VDET_D, outputted from the analog-to-digital converter 23 in response to the analog back EMF detection signal Vdet_A set as the second value, is stored in the fourth detection register 21211 as the second detection calibration signal VDET_CAL2.

The division indicating value DIV_NUM to be explained later in full detail is supplied from the state control unit 2120 to the calculation unit 21212. As a result, the calculation unit 21212 calculates the comparison reference value VCMP_REF for the gain compensation condition in cases where the current value of the VCM current Ivcm is zero ($\approx$0 mA), from the division indicating value DIV_NUM supplied by the state control unit 2120, the first detection calibration signal VDET_CAL1 of the third detection register 21210, and the second detection calibration signal VDET_CAL2 of the fourth detection register 21211. The comparison reference value VCMP_REF for the gain compensation condition computed by the calculation unit 21212 is stored in the first detection register 2126. During the calibration operation period, the comparison reference value VCMP_REF for the gain compensation condition is supplied from the first detection register 2126 to one input terminal of the comparator 2128, and the comparison input value VCMP_IN responding to the digital back EMF detection signal VDET_D is supplied from the second detection register 2127 to the other input terminal of the comparator 2128. As the result, in response to the comparison output signal VCMP_OUT of the comparator 2128, the adjustment sequencer 2125 converges the gain (=R2/R1) of the inverting amplifier 251 of the back EMF detector circuit 25 to a prescribed value, with the use of a binary search algorithm, for example. That is, even if the resistance ratio of the parasitic resistance RL of the VCM 35 and the VCM current sensing resistor Rs varies due to a temperature change, the gain (=R2/R1) of the inverting amplifier 251 of the back EMF detector circuit 25 is varied correspondingly. Therefore, it is possible to fulfill the gain compensation condition of (RL−R2·Rs/R1)$\approx$0 in the second term of the second line of the right-hand side of Equation 1.

<<A Configuration of the Calculation Unit to Calculate the Comparison Reference Value>>

FIG. 2 illustrates a configuration of the calculation unit 21212 which calculates the comparison reference value VCMP_REF for the gain compensation condition in the case of a zero ($\approx$0 mA) current value of the VCM current Ivcm, from the first detection calibration signal VDET_CAL1, the second detection calibration signal VDET_CAL2, and the division indicating value DIV_NUM, in the semiconductor integrated circuit 2 according to Embodiment 1 illustrated in FIG. 1.

As illustrated in FIG. 2, the calculation unit 21212 is comprised of a subtractor 212120, a divider 212121, and an adder 212122.

The first detection calibration signal VDET_CAL1 is supplied from the third detection register 21210 to one input terminal of the subtractor 212120, the second detection calibration signal VDET_CAL2 is supplied from the fourth detection register 21211 to the other input terminal of the subtractor 212120. Therefore, a subtraction result VDET_CAL1−VDET_CAL2 is generated from an output terminal of the subtractor 212120.

The subtraction result VDET_CAL1−VDET_CAL2 is supplied from the output terminal of the subtractor 212120 to one input terminal of the divider 212121, and the division indicating value DIV_NUM is supplied from the state control unit 2120 to the other input terminal of the divider 212121. As will be explained in full detail in FIG. 3, the division indicating value DIV_NUM is equal to a value ADJ_RATIO−1 in which "1" is subtracted from the ratio indicating value ADJ_RATIO. Therefore, the division result (VDET_CAL1−VDET_CAL2)/(ADJ_RATIO−1) is generated from the output terminal of the divider 212121.

The first detection calibration signal VDET_CAL1 is supplied from the third detection register 21210 to one input terminal of the adder 212122, and the division result of the output terminal of the divider 212121 is supplied to the other input terminal of the adder 212122. As a result, from an output terminal of the adder 212122 as an output terminal of the calculation unit 21212, the comparison reference value VCMP_REF as the addition result is generated. That is, the comparison reference value VCMP_REF generated from the calculation unit 21212 is given by Equation 3 described below.

$$V_{CMP\_REF} = V_{DET\_CAL1} + \frac{V_{DET\_CAL1} - V_{DET\_CAL2}}{ADJ\_RATIO - 1} \quad \text{(Equation 3)}$$

According to a preferred embodiment, on the conditions that the ratio indicating value ADJ_RATIO=$2^n$+1 (n is an integer), it is possible to configure the divider 212121 of the calculation unit 21212 illustrated in FIG. 2 with a shift register which shifts bit data rightward. Accordingly, it is possible to avoid use of a digital divider of a very large circuit scale. That is, when the subtraction result VDET_CAL1−VDET_CAL2 supplied from the subtractor 212120 to one input terminal of the divider 212121 as a dividend is the decimal number 256, the corresponding binary digit is a 10-bit "0100000000." When the division indicating value DIV_NUM supplied from the control unit 2120 to the other input terminal of the divider 212121 as a divisor is the decimal number 4, the corresponding binary digit is a 10-bit "0000000100." Therefore, the 10-bit binary dividend "0100000000" is shifted rightward by 2 bits as indicated by the 10-bit binary divisor "0000000100", by use of the shift register configured as the divider 212121. A shift output signal "0001000000" is generated from the shift register configured as the divider 212121 by the rightward shift of 2 bits. The shift output signal "0001000000" in the 10-bit binary digits is the decimal number 64. Accordingly, it is understood that the decimal number 64 as the division result of the decimal number 256 divided by the decimal number 4 is generated from the shift register configured as the divider 212121.

However, in the case where use of a digital divider of a very large circuit scale does not become an issue, it is also possible to employ the digital divider of a very large circuit scale, instead of the shift register which performs the rightward shift as the divider 212121 of the calculation unit 21212.

<<A Configuration of the State Control Unit to Generate the Division Indicating Value and the Current Indicating Value>>

FIG. 3 illustrates a configuration of the state control unit 2120 which generates the division indicating value DIV_NUM and the digital VCM current indicating value VCMCRNT, in the semiconductor integrated circuit 2 according to Embodiment 1 illustrated in FIG. 1.

As illustrated in FIG. 3, the state control unit 2120 is comprised of a multiplier 21200, a subtractor 21201, and a selector 21202.

The ratio indicating value ADJ_RATIO is supplied from the serial interface 211 of the logic circuit 21 to one input terminal of the multiplier 21200, and the digital VCM input current indicating value VCMCRNT_IN is supplied from the serial interface 211 of the logic circuit 21 to the other input terminal of the multiplier 21200. As a result, a multiplication result ADJ_RATIO·VCMCRNT_IN is generated from an output terminal of the multiplier 21200.

The ratio indicating value ADJ_RATIO is supplied from the serial interface 211 of the logic circuit 21 to one input terminal of the subtractor 21201, and "1" is supplied to the other input terminal of the subtractor 21201. As a result, the division indicating value DIV_NUM as the subtraction result is generated from an output terminal of the subtractor 21201. The division indicating value DIV_NUM is equal to a value ADJ_RATIO−1 in which "1" is subtracted from the ratio indicating value ADJ_RATIO.

A value ADJ_RATIO·VCMCRNT_IN is supplied from the multiplier 21200 to one input terminal of the selector 21202, and a digital VCM input current indicating value VCMCRNT_IN is supplied from the serial interface 211 of the logic circuit 21 to the other input terminal of the selector 21202. A selection instruction signal ST_SEL is supplied from the adjustment sequencer 2125 to a selection control terminal of the selector 21202. When the selection instruction signal ST_SEL is at a high level "1", the value ADJ_RATIO·VCMCRNT_IN supplied from the multiplier 21200 to one input terminal of the selector 21202 is generated from the output terminal of the selector 21202 as the digital VCM current indicating value VCMCRNT. When the selection instruction signal ST_SEL is at a low level "0", the digital VCM input current indicating value VCMCRNT_IN supplied to the other input terminal of the selector 21202 is generated from the output terminal of the selector 21202 as the digital VCM current indicating value VCMCRNT.

Figure 4:
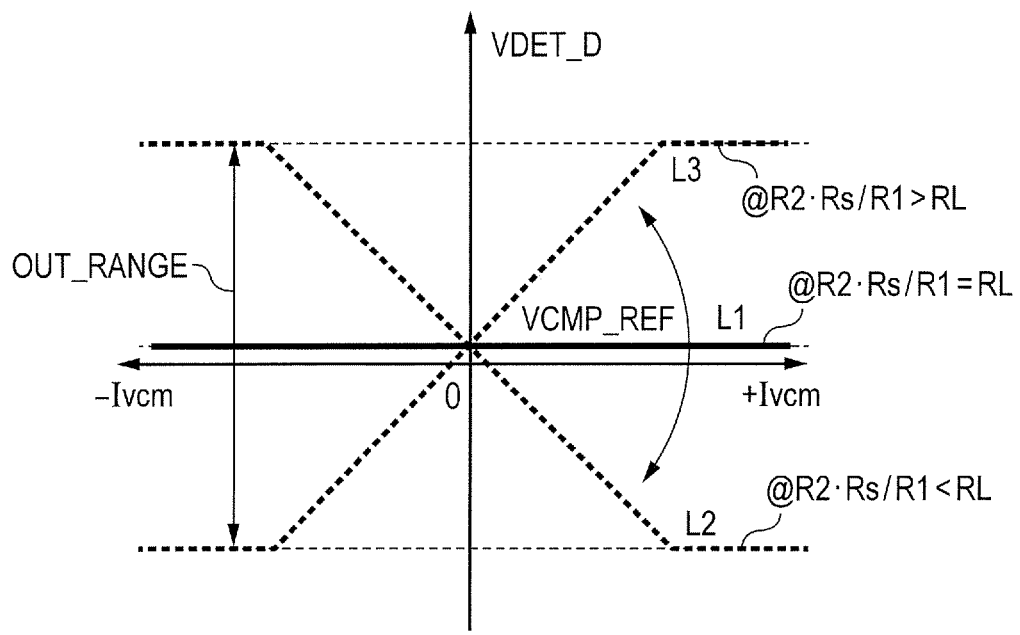
FIG. 4 is a drawing illustrating dependence of a digital back EMF detection signal VDET_D on a VCM current Ivcm, in the case where the resistance ratio of a parasitic resistance RL of a VCM 35 and a VCM current sensing resistor Rs is varied due to various changes in temperature, in the semiconductor integrated circuit 2 according to Embodiment 1 illustrated in FIG. 1.

FIG. 4 illustrates dependence of the digital back EMF detection signal VDET_D on the VCM current Ivcm, in the case where the resistance ratio of the parasitic resistance RL of the VCM 35 and the VCM current sensing resistor Rs is varied due to various changes in temperature, in the semiconductor integrated circuit 2 according to Embodiment 1 illustrated in FIG. 1.

Figure 20:
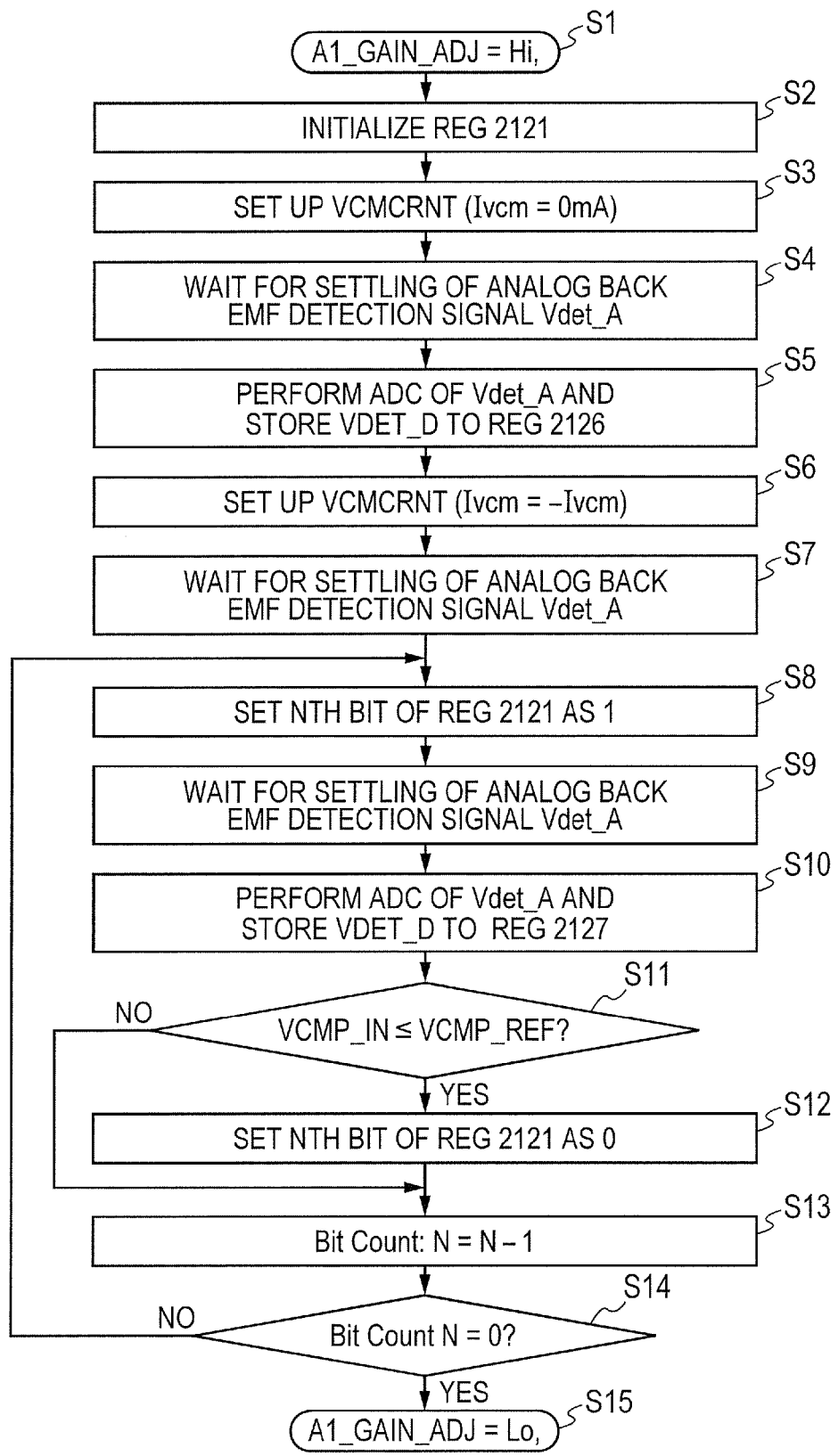
FIG. 20 is an explanatory drawing of the calibration operation for compensating an error involved in the detection value of the back EMF Vbemf of the VCM 35 for an loading operation LOAD, in the semiconductor integrated circuit 2 illustrated in FIG. 19, which has been examined by the present inventors prior to the present invention.
Figure 21:
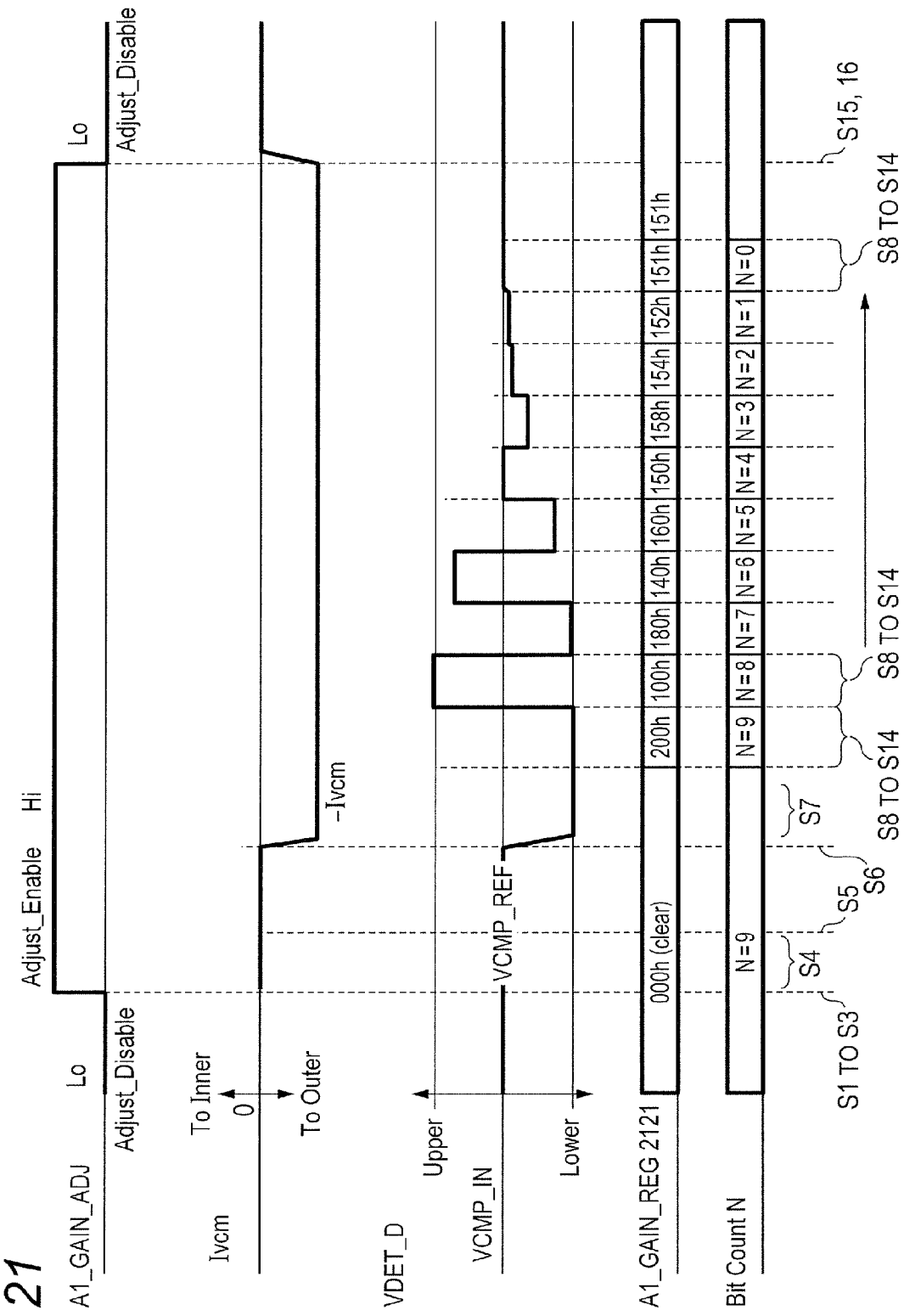
FIG. 21 is a drawing illustrating waveforms of signals of each part of the semiconductor integrated circuit 2 according to the operation flow of the calibration operation examined by the present inventors prior to the present invention, as illustrated in FIG. 20.
Figure 22:
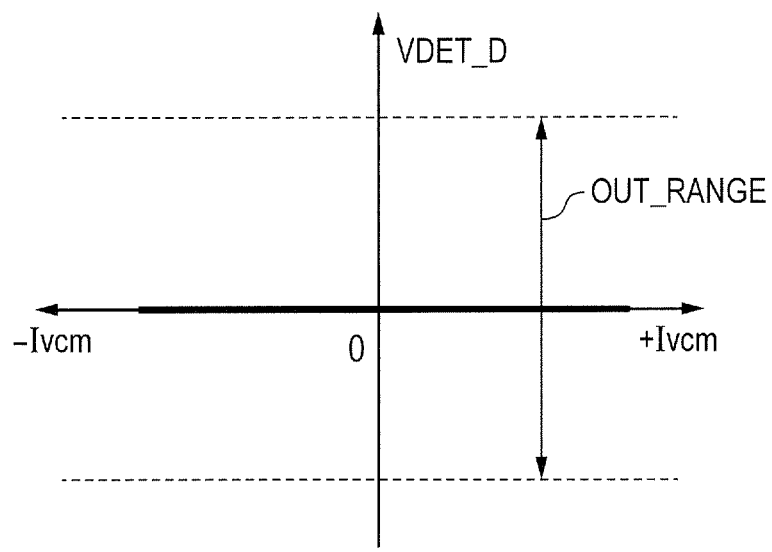
FIG. 22 is an explanatory drawing of the calibration operation for compensating the relation of the VCM current value and the VCM velocity detection value, by the software processing by an external CPU of the semiconductor integrated circuit which has been examined by the present inventors prior to the present invention based on the description of the Patent Document 1.

In FIG. 4, @R2·Rs/R1=RL corresponds to the state where the temperature is set as the predetermined temperature described above, and the gain compensation condition of (RL−R2·Rs/R1)≈0 in the second term of the second line of the right-hand side of Equation 1 is satisfied. In the state corresponding to the predetermined temperature, the gain compensation condition of (RL−R2·Rs/R1)≈0 in the second term of the second line of the right-hand side of Equation 1 is satisfied, and the analog back EMF detection signal Vdet_A and the digital back EMF detection signal VDET_D do not depend on the current value of the VCM current Ivcm, as illustrated in the characteristic L1 of FIG. 4. Therefore, according to the characteristic L1 of FIG. 4 which satisfies the gain compensation condition, the analog back EMF detection signal Vdet_A of the back EMF detector circuit 25 does not depend on the current value of the VCM current Ivcm, and only depends on the back EMF Vbemf and the reference voltage Vref. The characteristic L1 of FIG. 4 corresponds to the comparison reference value VCMP_REF stored in the first detection register 2126 at the fifth step S5, after setting the current value of the VCM current Ivcm to zero (≈0 mA) at the third step S3, in the calibration operation which has been examined by the present inventors prior to the present invention and is illustrated in FIG. 20.

In FIG. 4, @R2·Rs/R1<RL corresponds to the state where the temperature changes from the predetermined temperature described above, and the gain compensation condition of (RL−R2·Rs/R1)≈0 in the second term of the second line of the right-hand side of Equation 1 is not satisfied. In the state of the gain compensation condition being not satisfied, the analog back EMF detection signal Vdet_A and the digital back EMF detection signal VDET_D change depending on the current value of the VCM current Ivcm, as illustrated in the characteristic L2 of FIG. 4.

In FIG. 4, @R2·Rs/R1>RL corresponds to the state where the temperature changes from the predetermined temperature described above, and the gain compensation condition of (RL−R2·Rs/R1)≈0 in the second term of the second line of the right-hand side of Equation 1 is not satisfied. In the state of the gain compensation condition being not satisfied, the analog back EMF detection signal Vdet_A and the digital back EMF detection signal VDET_D change depending on the current value of the VCM current Ivcm, as illustrated in the characteristic L3 of FIG. 4.

That is, according to the characteristics L2 and L3 of FIG. 4 which do not satisfy the gain compensation condition, the analog back EMF detection signal Vdet_A of the back EMF detector circuit 25 varies depending not only on the back EMF Vbemf and the reference voltage Vref but also on the current value of the VCM current Ivcm. Therefore, as illustrated in the characteristics L2 and L3 of FIG. 4, when the temperature changes from the predetermined temperature at which the gain compensation condition is satisfied, the semiconductor integrated circuit 2 according to Embodiment 1 illustrated in FIG. 1 performs the calibration operation so that the gain compensation condition may be satisfied again by changing the gain (=R2/R1) of the inverting amplifier 251 of the back EMF detector circuit 25.

Figure 5:
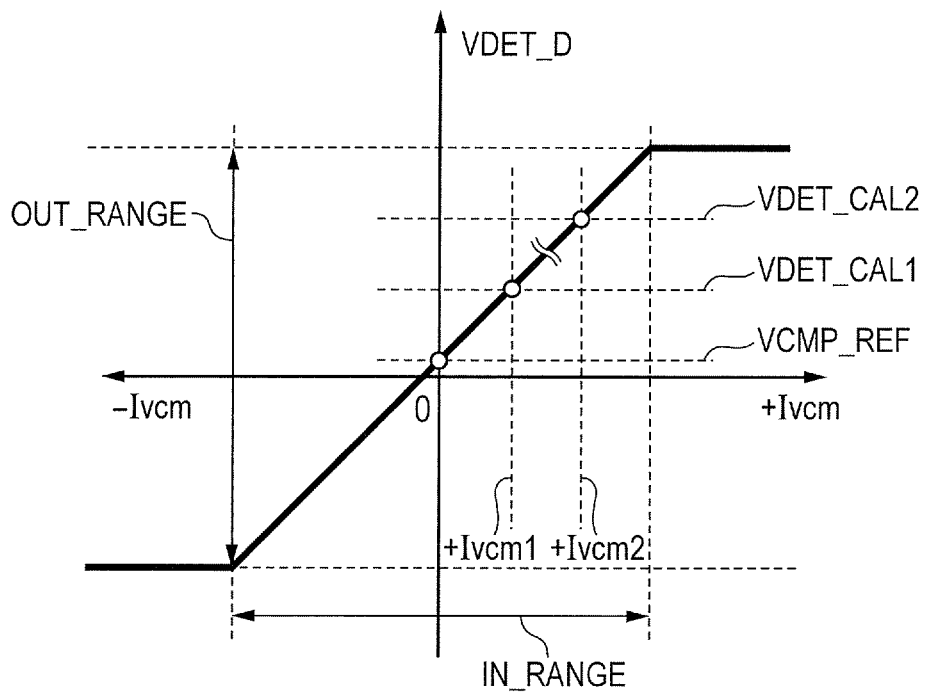
FIG. 5 is a drawing illustrating a manner that, when the semiconductor integrated circuit 2 according to Embodiment 1 illustrated in FIG. 1 performs a calibration operation to satisfy again the gain compensation condition to the temperature change explained in FIG. 4, a comparison reference value VCMP_REF is calculated for the gain compensation condition of the zero (≈0 mA) current value of the VCM current Ivcm from the first detection calibration signal VDET_CAL1 and the second detection calibration signal VDET_CAL2.

FIG. 5 illustrates a manner that, when the semiconductor integrated circuit 2 according to Embodiment 1 illustrated in FIG. 1 performs a calibration operation to satisfy again the gain compensation condition to the temperature change explained in FIG. 4, a comparison reference value VCMP_REF is calculated for the gain compensation condition of the zero (≈0 mA) current value of the VCM current Ivcm from the first detection calibration signal VDET_CAL1 and the second detection calibration signal VDET_CAL2. The present comparison reference value VCMP_REF corresponds to the state of the zero (≈0 mA) current value of the VCM current Ivcm, and to the state in which the magnetic head 33 and the arm 34 are pressed against the inner circumference stopper or the outer circumference stopper, or retracted to the ramp mechanism 36.

Therefore, the comparison reference value VCMP_REF corresponds to the analog back EMF detection signal Vdet_A in the state where the back EMF Vbemf is zero substantially and the current value of the VCM current Ivcm is zero (≈0 mA), in Equation 1 and Equation 2. Accordingly, the comparison reference value VCMP_REF for the gain compensation condition is derived as follows from Equation 1 and Equation 2.

$$V_{CMP\_REF} = V_{ref} \quad \text{(Equation 4)}$$

As explained in FIG. 3, in response to the selection instruction signal ST_SEL at a low level "0", the digital VCM input current indicating value VCMCRNT_IN supplied to the other input terminal of the state control unit 2120 is generated from the output terminal of the selector 21202 as the digital VCM current indicating value VCMCRNT.

As explained in FIG. 1, the state control unit 2120 of the semiconductor integrated circuit 2 according to Embodiment 1 illustrated in FIG. 1 sets the analog back EMF detection signal Vdet_A of the back EMF detector circuit 25 as the first value, during the period of the calibration operation which corrects an error involved in the detection value of the back EMF Vbemf of the VCM 35 for the unloading operation UNLOAD or the loading operation LOAD. Therefore, in order to set the analog back EMF detection signal Vdet_A as the first value, the current value of the VCM current Ivcm is set as the first current value +Ivcm1, in response to the digital VCM current indicating value VCMCRNT which is generated from the output terminal of the selector 21202 in response to the selection instruction signal ST_SEL at a low level "0." That is, as illustrated in FIG. 5, in response to the digital VCM current indicating value VCMCRNT as the digital VCM input current indicating value VCMCRNT_IN, the analog-to-digital converter 23 and the VCM driver circuit 24 make flow the VCM current Ivcm of the first current value +Ivcm1 through the VCM 35. Therefore, in response to the VCM current Ivcm of the first current value +Ivcm1, the back EMF detector circuit 25 and the analog-to-digital converter 23 generate the first detection calibration signal VDET_CAL1 as the digital back EMF detection signal VDET_D.

Furthermore, the state control unit 2120 of the semiconductor integrated circuit 2 according to Embodiment 1 illustrated in FIG. 1 sets the analog back EMF detection signal Vdet_A of the back EMF detector circuit 25 as the second value, during the period of the calibration operation which corrects an error involved in the detection value of the back EMF Vbemf of the VCM 35 for the unloading operation UNLOAD or the loading operation LOAD. As explained in FIG. 3, the multiplication result ADJ_RATIO·VCMCRNT_IN from the multiplier 21200 to be supplied to one input terminal of the state control unit 2120 is generated from the output terminal of the selector 21202 as the digital VCM current indicating value VCMCRNT, in response to the selection instruction signal ST_SEL at a high level "1." Therefore, in order to set the analog back EMF detection signal Vdet_A as the second value, the current value of the VCM current Ivcm is set as the second current value +Ivcm2, in response to the digital VCM current indicating value VCMCRNT which is generated from the output terminal of the selector 21202 in response to the selection instruction signal ST_SEL of a high level "1." That is, as illustrated in FIG. 5, in response to the digital VCM current indicating value VCMCRNT as the multiplication result ADJ_RATIO·VCMCRNT_IN of the multiplier 21200, the analog-to-digital converter 23 and the VCM driver circuit 24 make flow the VCM current Ivcm of the second current value +Ivcm2 through the VCM 35. Therefore, in response to the VCM current Ivcm of the second current value +Ivcm2, the back EMF detector circuit 25 and the analog-to-digital converter 23 generate the second detection calibration signal VDET_CAL2 as the digital back EMF detection signal VDET_D. Therefore, the following relation holds between the second current value +Ivcm2 and the first current value +Ivcm1.

$$I_{vcm2} = ADJ\_RATIO \cdot I_{vcm1} \quad \text{(Equation 5)}$$

The first detection calibration signal VDET_CAL1 described above is stored in the third detection register 21210, and the second detection calibration signal VDET_CAL2 is stored in the fourth detection register 21211. Furthermore, the calculation unit 21212 calculates a comparison reference value VCMP_REF for a gain compensation condition in cases where the current value of the VCM current Ivcm is zero (≈0 mA), from the first detection calibration signal VDET_CAL1 stored in the third detection register 21210 and the second detection calibration signal VDET_CAL stored in the fourth detection register 21211. The comparison reference value VCMP_REF for the gain compensation condition calculated by the calculation unit 21212 is stored in the first detection register 2126. During the calibration operation period, the comparison reference value VCMP_REF for the gain compensation condition is supplied from the first detection register 2126 to one input terminal of the comparator 2128, and a comparison input value VCMP_IN responding to the digital back EMF detection signal VDET_D is supplied from the second detection register 2127 to the other input terminal of the comparator 2128.

As a result, in response to the comparison output signal VCMP_OUT of the comparator 2128, the adjustment sequencer 2125 converges the gain (=R2/R1) of the inverting amplifier 251 of the back EMF detector circuit 25 to a prescribed value, with the use of a binary search algorithm, for example. That is, even if the resistance ratio of the parasitic resistance RL of the VCM 35 and the VCM current sensing resistor Rs varies due to a temperature change, the gain (=R2/R1) of the inverting amplifier 251 of the back EMF detector circuit 25 is varied correspondingly. Therefore, it is possible to fulfill the gain compensation condition of (RL−R2·Rs/R1)≈0 in the second term of the second line of the right-hand side of Equation 1.

The calibration operation performed here is for the unloading operation UNLOAD and the magnetic head 33 is pressed against the inner circumference stopper by the positive polarity of the VCM current Ivcm which has the first current value +Ivcm1 or the second current value +Ivcm2. Therefore, in the state where the magnetic head 33 is pressed against the inner circumference stopper, the back EMF Vbemf of the first term of the second line of the right-hand side of Equation 1 becomes zero substantially.

Therefore, the first detection calibration signal VDET_CAL1 as the digital back EMF detection signal VDET_D responding to the VCM current Ivcm having the first current value +Ivcm1 is calculated as the following equation from Equation 1, Equation 2, and Equation 4.

$$V_{DET\_CAL1} \equiv -\frac{R_4}{R_3} \cdot \left(R_L - \frac{R_2}{R_1} \cdot R_S\right) \cdot (+I_{vcm1}) + V_{CMP\_REF} \quad \text{(Equation 6)}$$

In a similar way, the second detection calibration signal VDET_CAL2 as the digital back EMF detection signal VDET_D responding to the VCM current Ivcm having the second current value +Ivcm2 is calculated as the following equation from Equation 1, Equation 2, and Equation 4.

$$V_{DET\_CAL2} \equiv -\frac{R_4}{R_3} \cdot \left(R_L - \frac{R_2}{R_1} \cdot R_S\right) \cdot (+I_{vcm2}) + V_{CMP\_REF} \quad \text{(Equation 7)}$$

Furthermore, the following relation is obtained from Equation 5, Equation 6, and Equation 7.

$$\begin{aligned}V_{DET\_CAL2} &\equiv -\frac{R_4}{R_3} \cdot \left(R_L - \frac{R_2}{R_1} \cdot R_S\right) \cdot (+\text{ADJ\_RATIO} \cdot I_{vcm1}) + V_{CMP\_REF} \\ &\equiv \frac{R_4}{R_3} \cdot \{(-R_L \cdot (+I_{vcm1}) \cdot \text{ADJ\_RATIO}) - \\ &\quad \left(-\frac{R_2}{R_1} \cdot R_S \cdot I_{vcm1} \cdot \text{ADJ\_RATIO}\right)\} + V_{CMP\_REF} \\ &\equiv \text{ADJ\_RATIO} \cdot V_{DET\_CAL1} + (1 - \text{ADJ\_RATIO}) \cdot V_{CMP\_REF}\end{aligned} \quad \text{(Equation 8)}$$

As to the comparison reference value VCMP_REF for the gain compensation condition described above, the following relation defined by Equation 9 is obtained from Equation 8.

$$\begin{aligned}V_{CMP\_REF} &\equiv \frac{V_{DET\_CAL2}}{1 - \text{ADJ\_RATIO}} - \frac{\text{ADJ\_RATIO} \cdot V_{DET\_CAL1}}{1 - \text{ADJ\_RATIO}} \\ &\equiv \frac{\text{ADJ\_RATIO}}{\text{ADJ\_RATIO} - 1} \cdot V_{DET\_CAL1} - \frac{V_{DET\_CAL2}}{\text{ADJ\_RATIO} - 1} \\ &\equiv \frac{\text{ADJ\_RATIO} - 1}{\text{ADJ\_RATIO} - 1} \cdot V_{DET\_CAL1} + \frac{V_{DET\_CAL1}}{\text{ADJ\_RATIO} - 1} - \frac{V_{DET\_CAL2}}{\text{ADJ\_RATIO} - 1} \\ &\equiv V_{DET\_CAL1} + \frac{V_{DET\_CAL1} - V_{DET\_CAL2}}{\text{ADJ\_RATIO} - 1}\end{aligned} \quad \text{(Equation 9)}$$

It is understood that the relation defined by Equation 9 is the same as the relation defined by Equation 3.

Figure 23:
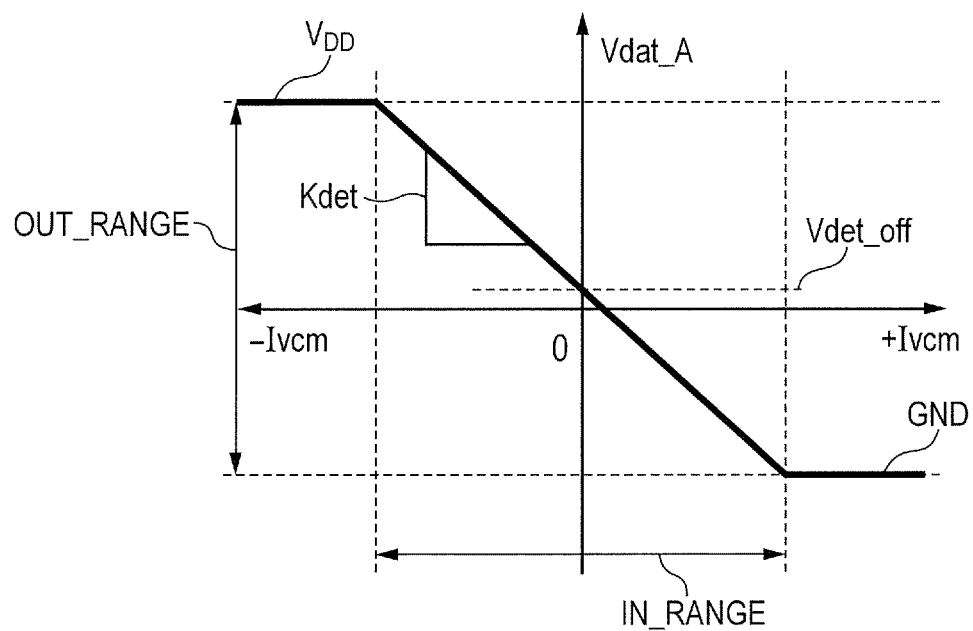
FIG. 23 is a drawing illustrating that, due to a temperature change, the resistance ratio of the parasitic resistance RL of the VCM 35 and the VCM current sensing resistor Rs varies, and the gain compensation condition is no longer satisfied, and that the analog back EMF detection signal Vdet_A varies responding to a change of the VCM current Ivcm.
Figure 24:
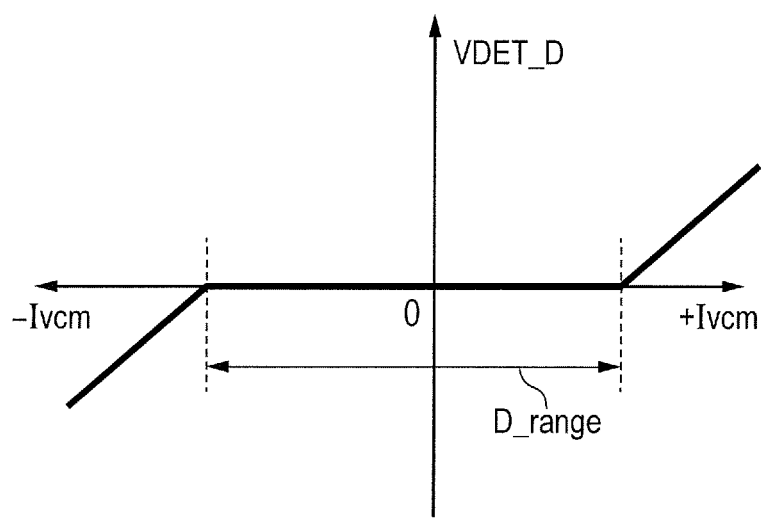
FIG. 24 is a drawing illustrating a manner in which the digital correcting is performed by the software processing of the external CPU to the dependence Kdet and the offset voltage Vdet_off, in the calibration operation which has been examined by the present inventors prior to the present invention illustrated in FIG. 23.

In a preferred embodiment, in order to improve the accuracy of the comparison reference value VCMP_REF for the gain compensation condition calculated by the relation defined by Equation 9, the first detection calibration signal VDET_CAL1 and the second detection calibration signal VDET_CAL2 are set up within the output range OUT_RANGE explained in FIG. 23 and FIG. 24. That is, as illustrated in FIG. 5, the first detection calibration signal VDET_CAL1 and the second detection calibration signal VDET_CAL2 are set within the output range OUT_RANGE in which the linearity of the digital back EMF detection signal VDET_D is maintained. As illustrated in FIG. 5, the calculation unit 21212 calculates the comparison reference value VCMP_REF for the gain compensation condition by employing the first detection calibration signal VDET_CAL1 and the second detection calibration signal VDET_CAL2.

<<The Calibration Operation for the Unloading Operation>>

Figure 6:
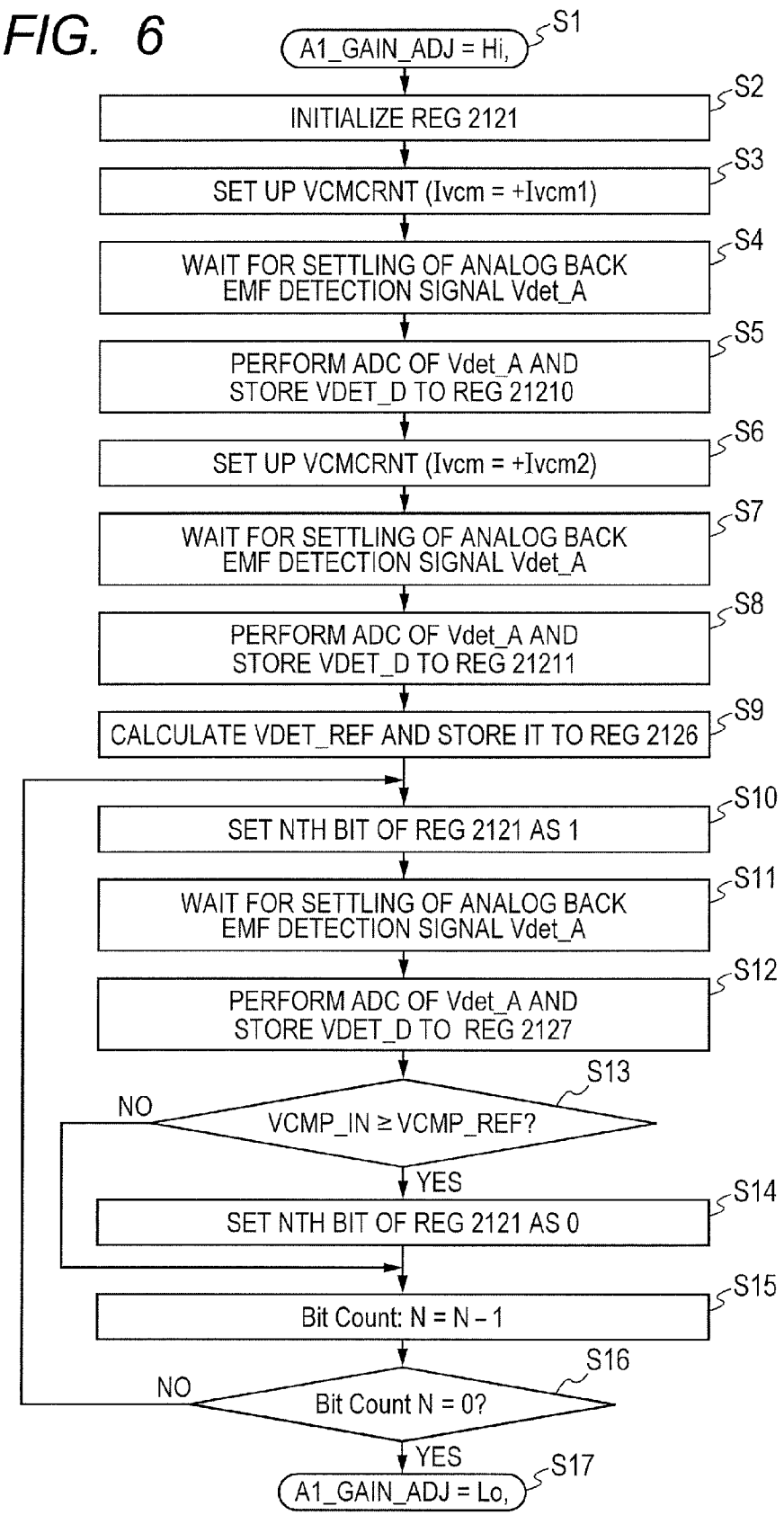
FIG. 6 is an explanatory drawing of the calibration operation for compensating an error involved in the detection value of the back EMF Vbemf of the VCM 35 for an unloading operation UNLOAD of the semiconductor integrated circuit 2 according to Embodiment 1 illustrated in FIG. 1.

FIG. 6 explains the calibration operation for compensating an error involved in the detection value of the back EMF Vbemf of the VCM 35 for an unloading operation UNLOAD of the semiconductor integrated circuit 2 according to Embodiment 1 illustrated in FIG. 1.

At the first step S1 of FIG. 6, the calibration operation is started when the inverting gain adjustment instruction signal A1_GAIN_ADJ supplied from the controller 1 changes from a low level Lo to a high level Hi.

At the second step S2, the first gain adjustment register 2121 is initialized by setting "0" to all the bits of the stored data of the first gain adjustment register 2121 in the adjustment logic circuit 212 of the logic circuit 21.

At the third step S3, in order to set the current value of the VCM current Ivcm flowing through the VCM 35 as the first current value +Ivcm1 described above, the numerical setup is performed for the digital VCM current indicating value VCMCRNT to be generated by the state control unit 2120. That is, in response to the selection instruction signal ST_SEL at a low level "0", the selector 21202 of the state control unit 2120 illustrated in FIG. 3 generates the digital VCM input current indicating value VCMCRNT_IN supplied to the other input terminal of the selector 21202, from the output terminal thereof as the digital VCM current indicating value VCMCRNT.

At the fourth step S4, in response to the digital VCM current indicating value VCMCRNT of which the numeric value has been set at the third step S3, the flow waits for settling of the voltage level of the analog back EMF detection signal Vdet_A as the first value generated from the output terminal of the low pass filter 253 of the back EMF detector circuit 25.

At the fifth step S5, the analog back EMF detection signal Vdet_A as the first value settled at the fourth step S4 is converted into the digital back EMF detection signal VDET_D by the analog-to-digital converter 23. This digital back EMF detection signal VDET_D is stored in the third detection register 21210 as the first detection calibration signal VDET_CAL1.

In the sixth step S6, in order to set the current value of the VCM current Ivcm flowing through the VCM 35 as the second current value +Ivcm2 described above, the numerical value of the digital VCM current indicating value VCMCRNT to be generated by the state control unit 2120 is set up. That is, in response to the selection instruction signal ST_SEL at a high level "1", the selector 21202 of the state control unit 2120 illustrated in FIG. 3 generates the multiplication result ADJ_RATIO·VCMCRNT_IN supplied to the one input terminal of the selector 21202, from the output terminal thereof as the digital VCM current indicating value VCMCRNT.

As described above, the VCM current Ivcm is set as the first current value +Ivcm1 at the third step S3, and the VCM current Ivcm is set as the second current value +Ivcm2 at the sixth step S6. In this way, since the VCM current Ivcm is a positive current value, the magnetic head 33 is pressed against the inner circumference stopper at the time of the calibration operation for the unloading operation UNLOAD. Therefore, the magnetic head 33 and the arm 34 are brought in a fixed state, without moving to the inward direction of the magnetic disk unit 31. Therefore, the back EMF Vbemf of the first term of the second line of the right-hand side of Equation 1 becomes zero substantially, and it becomes possible to prevent the occurrence of disturbances or errors in the calibration operation.

The inner circumference stopper is a mechanical member which forbids, in the calibration operation for the unloading operation UNLOAD, the magnetic head 33 and the arm 34 to excessively move inward beyond the most inner circumference of the storage sector region of the magnetic disk 31, by the positive-value VCM current Ivcm of the first current value +Ivcm1 or the second current value +Ivcm2.

At the seventh step S7, in response to the digital VCM current indicating value VCMCRNT of which the numeric value has been set at the sixth step S6, the flow waits for settling of the voltage level of the analog back EMF detection signal Vdet_A as the second value generated from the output terminal of the low pass filter 253 of the back EMF detector circuit 25.

At the eighth step S8, the analog back EMF detection signal Vdet_A as the second value settled at the seventh step S7 is converted into the digital back EMF detection signal VDET_D by the analog-to-digital converter 23, and the digital back EMF detection signal VDET_D is stored in the fourth detection register 21211 as the second detection calibration signal VDET_CAL2.

At the ninth step S9, by use of the first detection calibration signal VDET_CAL1 stored in the third detection register 21210 at the fifth step S5 and the second detection calibration signal VDET_CAL2 stored in the fourth detection register 21211 at the eighth step S8, the calculation unit 21212 calculates the comparison reference value VCMP_REF for the gain compensation condition. The calculated comparison reference value VCMP_REF for the gain compensation condition is stored in the first detection register 2126.

At the 10th step S10, in order to correct the gain (=R2/R1) of the inverting amplifier 251 of the back EMF detector circuit 25, a high level "1" is set to the Nth bit of the first gain adjustment register 2121 in the adjustment logic circuit 212 of the logic circuit 21. The Nth bit at the first-time 10th step S10 becomes the most significant bit (MSB), the Nth bit at the second-time 10th step S10 becomes the second higher-order bit, and the Nth bit at the last-time 10th step S10 becomes the least significant bit (LSB).

At the 11th step S11, in response to the digital VCM current indicating value VCMCRNT of which the numeric value has been set at the sixth step S6 and also to the gain of the inverting amplifier 251 which has been set at the 10th step S10, the flow waits for settling of the voltage level of the analog back EMF detection signal Vdet_A generated from the output terminal of the back EMF detector circuit 25.

At the 12th step S12, the analog back EMF detection signal Vdet_A settled at the 11th step S11 is converted into a digital back EMF detection signal VDET_D by the analog-to-digital converter 23, and the converted digital back EMF detection signal VDET_D is stored in the second detection register 2127 as a comparison input value corresponding to a temperature change. Accordingly, the comparison input value VCMP_IN as the output signal of the second detection register 2127 is supplied to the other input terminal of the comparator 2128.

At the 13th step S13, the comparator 2128 determines whether the comparison input value VCMP_IN stored in the second detection register 2127 at the 12th step S12 is equal to or greater than the comparison reference value VCMP_REF stored in the first detection register 2126 at the ninth step S9. When the determination result by the comparator 2128 at the 13th step S13 is "YES", it is shown that the gain (=R2/R1) of the inverting amplifier 251 of the back EMF detector circuit 25 is greater than the ideal gain of the above-described gain compensation condition. Therefore, in this case, at the following 14th step S14, the Nth bit of the first gain adjustment register 2121 set up at the 10th step S10 is changed from a high level "1" to a low level "0."

When the determination result by the comparator 2128 at the 13th step S13 is "NO", it is shown that the gain (=R2/R1) of the inverting amplifier 251 of the back EMF detector circuit 25 is smaller than the ideal gain of the above-described gain compensation condition. Therefore, in this case, the flow shifts to the 15th step S15.

At the 15th step S15, in order to move the Nth adjusting bit position of the first gain adjustment register 2121 in the adjustment logic circuit 212 of the logic circuit 21 to the lower direction by 1 bit, the adjustment sequencer 2125 performs the operation of bit count N=N−1, in response to the comparison output signal VCMP_OUT of the comparator 2128.

At the 16th step S16, in order to determine whether the Nth adjusting bit position of the first gain adjustment register 2121 shifted at the 15th step S15 is the least significant bit (LSB), the adjustment sequencer 2125 determines whether the bit count N is "0" or not. When the determination result at the 16th step S16 is "NO", the flow returns to the 10th step S10, and the Nth bit shifted to the lower direction by 1 bit in the first gain adjustment register 2121 is set as a high level "1."

When the determination result at the 16th step S16 is "YES", the flow shifts to the 17th step S17.

At the 17th step S17, the calibration operation is terminated when the inverting gain adjustment instruction signal A1_GAIN_ADJ supplied from the controller 1 changes from a high level Hi to a low level Lo.

By the completion of the present calibration operation, prior to the unloading operation UNLOAD, the gain (=R2/R1) of the inverting amplifier 251 of the back EMF detector circuit 25 is corrected to the ideal gain which satisfies the gain compensation condition of (RL−R2·Rs/R1)≈0 in the second term of the second line of the right-hand side of Equation 1.

After the completion of the calibration operation, in order to set the VCM current Ivcm to a negative current value (−Ivcm), the numeric value of the digital VCM current indicating value VCMCRNT to be generated from the controller 1 is set up, and it becomes possible to move the magnetic head 33 from the inner circumference of the magnetic disk 31 to the direction of the ramp mechanism 36 at the time of the unloading operation UNLOAD.

Figure 7:
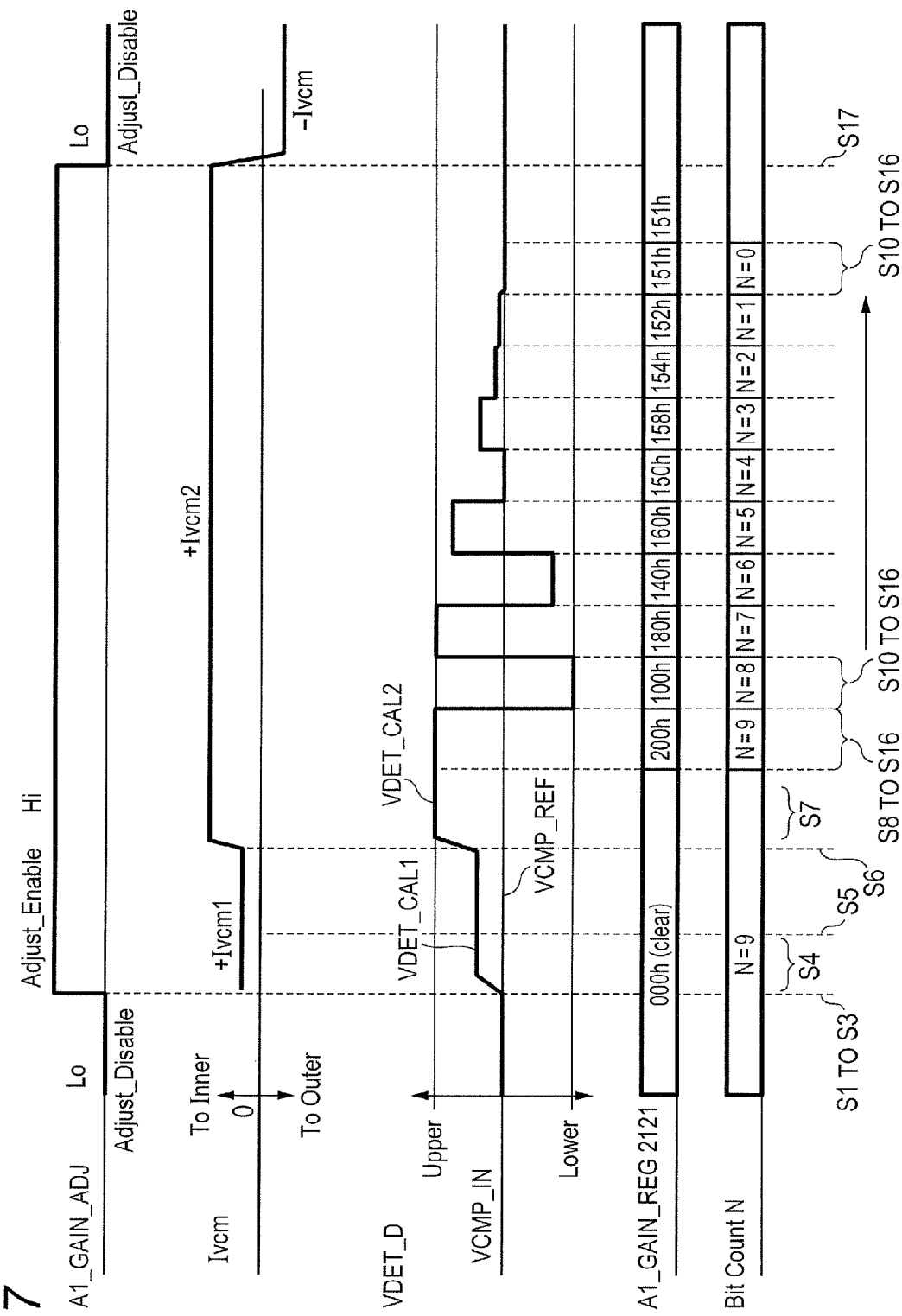
FIG. 7 is a drawing illustrating waveforms of signals of each part of the semiconductor integrated circuit 2, based on the operation flow of the calibration operation for an unloading operation UNLOAD of the semiconductor integrated circuit 2 according to Embodiment 1 illustrated in FIG. 6.

FIG. 7 illustrates waveforms of signals of each part of the semiconductor integrated circuit 2, based on the operation flow of the calibration operation for the unloading operation UNLOAD of the semiconductor integrated circuit 2 according to Embodiment 1 illustrated in FIG. 6.

As illustrated in FIG. 7, at the timing of the first step S1, the calibration operation is started when the inverting gain adjustment instruction signal A1_GAIN_ADJ supplied from the controller 1 changes from a low level Lo to a high level Hi.

In the period from the third step S3 to the fifth step S5, the current value of the VCM current Ivcm which flows through the VCM 35 is set as the first current value +Ivcm1, and the digital back EMF detection signal VDET_D generated from the output terminal of the analog-to-digital converter 23 is set as the first detection calibration signal VDET_CAL1. In particular, at the fifth step S5, the analog back EMF detection signal Vdet_A as the first value settled at the fourth step S4 is converted into the digital back EMF detection signal VDET_D by the analog-to-digital converter 23, and the digital back EMF detection signal VDET_D is stored in the third detection register 21210 as the first detection calibration signal VDET_CAL1.

In the period from the first step S1 to the sixth step S6, all the bits of the stored data of the first gain adjustment register 2121 in the adjustment logic circuit 212 of the logic circuit 21 are set to 0 and the first gain adjustment register 2121 is initialized. In this period, the bit count N of the first gain adjustment register 2121 in the adjustment logic circuit 212 of the logic circuit 21 is the most significant ninth bit. The hexadecimal 000 h corresponding to the decimal number 0 is stored in the first gain adjustment register 2121.

At the timing of the sixth step S6, the current value of the VCM current Ivcm is set as the second current value +Ivcm2.

At the seventh step S7, in response to the digital VCM current indicating value VCMCRNT of which the numeric value has been set at the sixth step S6, the flow waits for settling of the voltage level of the analog back EMF detection signal Vdet_A as the second value generated from the output terminal of the low pass filter 253 of the back EMF detector circuit 25.

In the period at the eighth step S8, the digital back EMF detection signal VDET_D generated from the output terminal of the analog-to-digital converter 23 in response to the second current value +Ivcm2 of the VCM current Ivcm serves as the second detection calibration signal VDET_CAL2. The digital back EMF detection signal VDET_D is stored in the fourth detection register 21211 as the second detection calibration signal VDET_CAL2.

At the ninth step S9, by use of the first detection calibration signal VDET_CAL1 stored in the third detection register 21210 at the fifth step S5 and the second detection calibration signal VDET_CAL2 stored in the fourth detection register 21211 at the eighth step S8, the calculation unit 21212 calculates the comparison reference value VCMP_REF for the gain compensation condition. The calculated comparison reference value VCMP_REF for the gain compensation condition is stored in the first detection register 2126.

At the timing of the first-time 10th step S10, the most significant ninth bit specified by the bit count N of the first gain adjustment register 2121 in the adjustment logic circuit 212 of the logic circuit 21 is set as a high level "1", therefore, the hexadecimal 200 h corresponding to the decimal number 512 (=$2^9$) is stored in the first gain adjustment register 2121. As a result, in response to the hexadecimal 200 h as the gain adjustment value of the first gain adjustment register 2121, the gain (=R2/R1) of the inverting amplifier 251 of the back EMF detector circuit 25 is set as the large value of the decimal number 512.

At the 11th step S11, in response to the digital VCM current indicating value VCMCRNT of which the numeric value has been set at the sixth step S6 and also to the gain of the inverting amplifier 251 set up at the 10th step S10, the flow waits for settling of the voltage level of the analog back EMF detection signal Vdet_A generated from the output terminal of the back EMF detector circuit 25.

At the 12th step S12, the analog back EMF detection signal Vdet_A settled at the 11th step S11 is converted into digital back EMF detection signal VDET_D by the analog-to-digital converter 23, and the converted digital back EMF detection signal VDET_D is stored in the second detection register 2127 as a comparison input value corresponding to a temperature change. Accordingly, the comparison input value VCMP_IN as the output signal of the second detection register 2127 is supplied to the other input terminal of the comparator 2128.

At the timing of the first-time 13th step S13, the digital back EMF detection signal VDET_D generated from the output terminal of the analog-to-digital converter 23 becomes as the comparison input value VCMP_IN responding to the second current value +Ivcm2 of the VCM current Ivcm and the gain (=R2/R1) of the inverting amplifier 251 of the back EMF detector circuit 25. In the example illustrated in FIG. 7, this gain (=R2/R1) is excessive; accordingly, the analog back EMF detection signal Vdet_A from the output terminal of the back EMF detector circuit 25 calculated by Equation 1 described above becomes as a high level. Therefore, at the timing of the first-time 13th step S13, the comparison input value VCMP_IN as the digital back EMF detection signal VDET_D generated from the output terminal of the analog-to-digital converter 23 becomes a higher level than the comparison reference value VCMP_REF for the gain compensation condition. As a result, by the first-time processing of the 14th step S14 through the 15th step S15, the most significant ninth bit of the first gain adjustment register 2121 is changed from a high level "1" to a low level "0", and the eighth bit specified by the new bit count N at the timing of the second-time 10th step S10 is set as a high level "1." Therefore, the hexadecimal 100 h corresponding to the decimal number 256 (=$2^8$) is stored in the first gain adjustment register 2121. As a result, in response to the hexadecimal 100 h as the gain adjustment value of the first gain adjustment register 2121, the gain (=R2/R1) of the inverting amplifier 251 of the back EMF detector circuit 25 is set as the comparatively small value of the decimal number 256.

At the timing of the second-time 12th step S12, the digital back EMF detection signal VDET_D generated from the output terminal of the analog-to-digital converter 23 serves as the comparison input value VCMP_IN responding to the second current value +Ivcm2 of the VCM current Ivcm and the reduced gain (=R2/R1) of the inverting amplifier 251 of the back EMF detector circuit 25. The gain (=R2/R1) of the inverting amplifier 251 of the back EMF detector circuit 25 is reduced by the processing from the first-time 14th step S14 to the second-time 10th step S10.

In the example illustrated in FIG. 7, this reduced gain (=R2/R1) is too little; accordingly, the analog back EMF detection signal Vdet_A from the output terminal of the back EMF detector circuit 25 calculated by Equation 1 becomes as a low level. Therefore, at the timing of the second-time 13th step S13, the comparison input value VCMP_IN as the digital back EMF detection signal VDET_D generated from the output terminal of the analog-to-digital converter 23 becomes a lower level than the comparison reference value VCMP_REF for the gain compensation condition. As a result, by the second-time processing of the 10th step S10 through the 16th step S16, the eighth bit of the first gain adjustment register 2121 is maintained at the high level "1", and the seventh bit specified by the new bit count N is set at a high level "1." Therefore, the hexadecimal 180 h corresponding to the decimal number 384 (=$2^8+2^7$) is stored in the first gain adjustment register 2121. As a result, in response to the hexadecimal 180 h as the gain adjustment value of the first gain adjustment register 2121, the gain (=R2/R1) of the inverting amplifier 251 of the back EMF detector circuit 25 is set as the comparatively large value of the decimal number 384.

In the same way hereinafter, by performing the processing of the 10th step S10 through the 16th step S16 up to the 10th time, the gain (=R2/R1) of the inverting amplifier 251 of the back EMF detector circuit 25 converges to the value of the decimal number 337 corresponding to the hexadecimal 151 h, according to the binary search algorithm. As the result, even if the resistance ratio of the parasitic resistance RL of the VCM 35 and the VCM current sensing resistor Rs varies due to a temperature change, the gain (=R2/R1) of the inverting amplifier 251 of the back EMF detector circuit 25 is varied correspondingly. Therefore, it is possible to fulfill the gain compensation condition of (RL −R2·Rs/R1)≈0 in the second term of the second line of the right-hand side of Equation 1. Therefore, since the second term of the second line of the right-hand side of Equation 1 is substantially maintained to zero, the analog back EMF detection signal Vdet_A of the back EMF detector circuit 25 does not depend on the current value of the VCM current Ivcm, and only depends on the back EMF Vbemf and the reference voltage Vref. By the calibration operation for the unloading operation UNLOAD of Embodiment 1 illustrated in FIG. 7, the gain of the inverting amplifier 251 of the back EMF detector circuit 25 converges to a prescribed value. According to this convergence, the difference of the comparison input value VCMP_IN and the comparison reference value VCMP_REF is reduced, and the comparison input value VCMP_IN and the comparison reference value VCMP_REF become equal approximately.

<<The Calibration Operation for the Loading Operation>>

Figure 8:
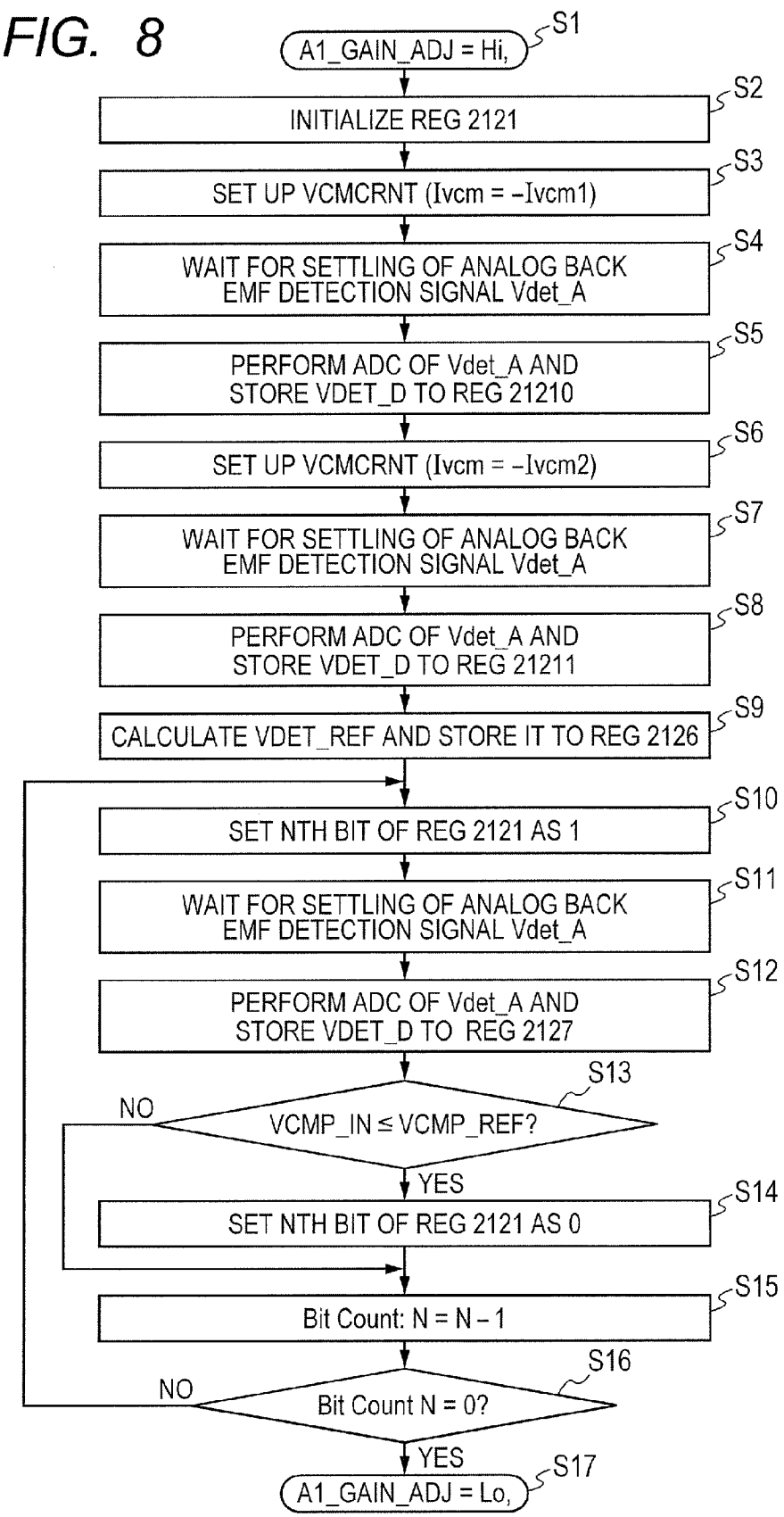
FIG. 8 is an explanatory drawing of the calibration operation for compensating an error involved in the detection value of the back EMF Vbemf of the VCM 35 for a loading operation LOAD of the semiconductor integrated circuit 2 according to Embodiment 1 illustrated in FIG. 1.

FIG. 8 explains the calibration operation for compensating an error involved in the detection value of the back EMF Vbemf of the VCM 35 for the loading operation LOAD of the semiconductor integrated circuit 2 according to Embodiment 1 illustrated in FIG. 1.

The calibration operation for the loading operation LOAD according to Embodiment 1 illustrated in FIG. 8 is extremely similar to the calibration operation for the unloading operation UNLOAD according to Embodiment 1 illustrated in FIG. 6. Therefore, the following explains the difference between the calibration operation illustrated in FIG. 8 and the calibration operation illustrated in FIG. 6.

At the third step S3 illustrated in FIG. 8, in order to set the current value of the VCM current Ivcm flowing through the VCM 35 as the first current value −Ivcm1 described above, the numerical value of the digital VCM current indicating value VCMCRNT to be generated by the state control unit 2120 is set up.

At the sixth step S6 illustrated in FIG. 8, in order to set the current value of the VCM current Ivcm flowing through the VCM 35 as the second current value −Ivcm2 described above, the numerical value of the digital VCM current indicating value VCMCRNT to be generated by the state control unit 2120 is set up.

In the calibration operation illustrated in FIG. 8, the VCM current Ivcm is set as the first current value −Ivcm1 at the third step S3, and the VCM current Ivcm is set as the second current value −Ivcm2 at the sixth step S6. In this way, since the VCM current Ivcm is a negative current value, the magnetic head 33 is pressed against an outer circumference stopper at the time of the calibration operation for the loading operation LOAD. Therefore, the magnetic head 33 and the arm 34 are brought in a fixed state, without moving to the outward direction of the magnetic disk unit 31. Therefore, the back EMF Vbemf of the first term of the second line of the right-hand side of Equation 1 becomes zero substantially, and it becomes possible to prevent the occurrence of disturbances or errors in the calibration operation.

The outer circumference stopper is a mechanical member which forbids, in the calibration operation for the loading operation LOAD, the magnetic head 33 and the arm 34 to excessively move outward beyond the most outer circumference of the storage sector region of the magnetic disk 31, by the negative-value VCM current Ivcm of the first current value −Ivcm1 or the second current value −Ivcm2.

At the 13th step S13 illustrated in FIG. 8, the comparator 2128 determines whether the comparison input value VCMP_IN stored in the second detection register 2127 at the 12th step S12 is equal to or smaller than the comparison reference value VCMP_REF stored in the first detection register 2126 at the ninth step S9. When the determination result by the comparator 2128 at the 13th step S13 is "YES", it is shown that the gain (=R2/R1) of the inverting amplifier 251 of the back EMF detector circuit 25 is greater than the ideal gain of the above-described gain compensation condition. Therefore, in this case, at the following 14th step S14, the Nth bit of the first gain adjustment register 2121 set up at the 10th step S10 is changed from a high level "1" to a low level "0."

Prior to the loading operation LOAD after completing the calibration operation illustrated in FIG. 8, the gain (=R2/R1) of the inverting amplifier 251 of the back EMF detector circuit 25 is corrected to the ideal gain which satisfies the gain compensation condition of (RL−R2·Rs/R1)≈0 in the second term of the second line of the right-hand side of Equation 2.

After the completion of the calibration operation, in order to make the VCM current Ivcm flowing through the VCM 35 a positive current value (+Ivcm), the numeric value of the digital VCM current indicating value VCMCRNT to be generated from the controller 1 is set up. Accordingly, it becomes possible to move the magnetic head 33 from the ramp mechanism 36 toward the inward direction of the magnetic disk unit 31 at the time of the loading operation LOAD.

Figure 9:
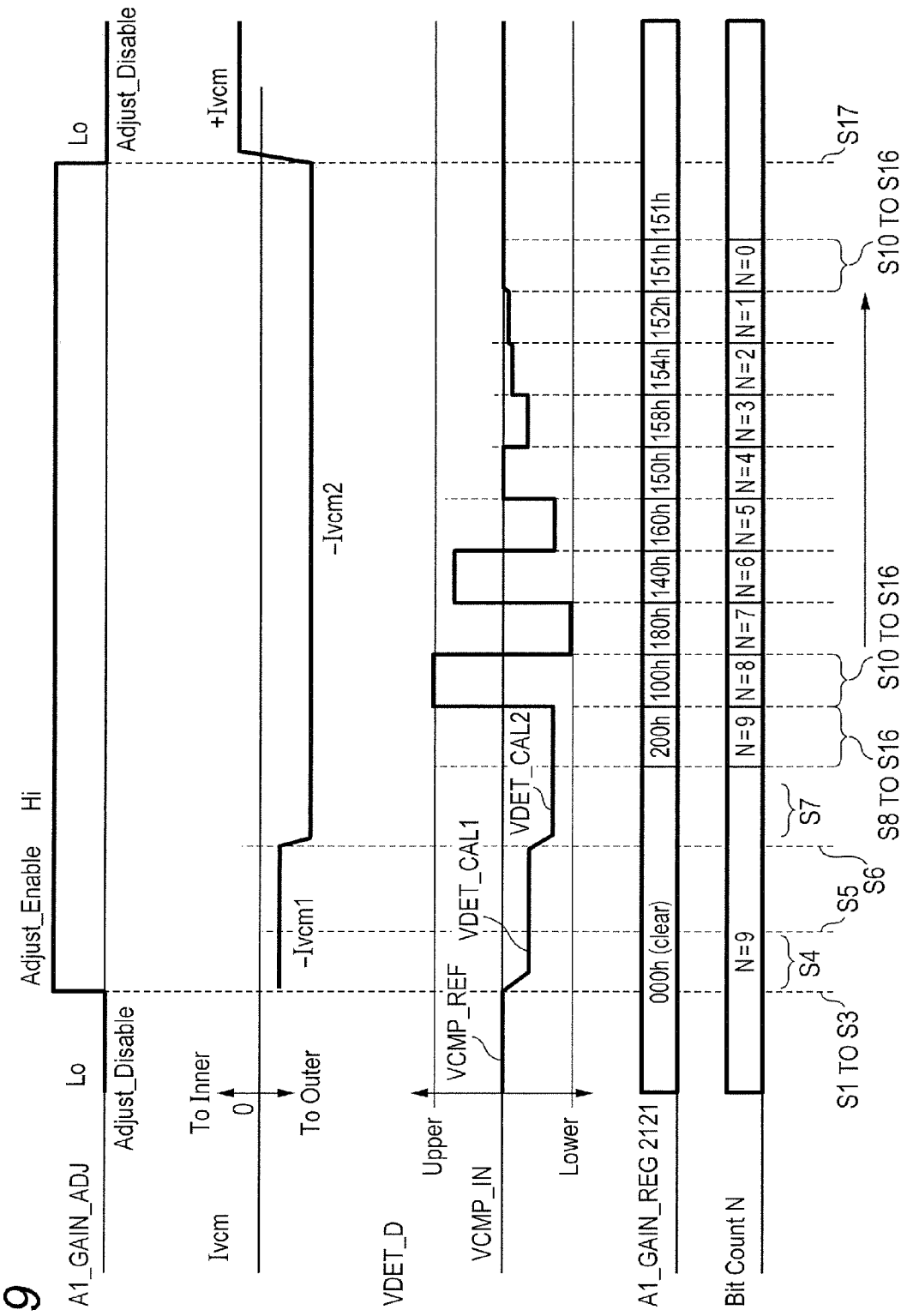
FIG. 9 is a drawing illustrating waveforms of signals of each part of the semiconductor integrated circuit 2 based on the operation flow of the calibration operation for a loading operation LOAD of the semiconductor integrated circuit 2 according to Embodiment 1 illustrated in FIG. 8.

FIG. 9 illustrates waveforms of signals of each part of the semiconductor integrated circuit 2 based on the operation flow of the calibration operation for the loading operation LOAD of the semiconductor integrated circuit 2 according to Embodiment 1 illustrated in FIG. 8.

The calibration operation for the loading operation LOAD according to Embodiment 1 illustrated in FIG. 9 is extremely similar to the calibration operation for the unloading operation UNLOAD according to Embodiment 1 illustrated in FIG. 7. Therefore, the following explains the difference between the calibration operation illustrated in FIG. 9 and the calibration operation illustrated in FIG. 7.

In the period from the third step S3 through the fifth step S5 of FIG. 9, the current value of the VCM current Ivcm flowing through the VCM 35 is set as the first current value −Ivcm1.

At the timing of the sixth step S6 of FIG. 9, the current value of the VCM current Ivcm is set as the second current value −Ivcm2.

At the timing of the first-time 13th step S13 illustrated in FIG. 9, the digital back EMF detection signal VDET_D generated from the output terminal of the analog-to-digital converter 23 becomes as the comparison input value VCMP_IN responding to the second current value −Ivcm2 of the VCM current Ivcm and the gain (=R2/R1) of the inverting amplifier 251 of the back EMF detector circuit 25. In the example illustrated in FIG. 9, this gain (=R2/R1) is excessive; accordingly, the analog back EMF detection signal Vdet_A from the output terminal of the back EMF detector circuit 25 calculated by Equation 2 described above becomes as a low level. Therefore, at the timing of the first-time 13th step S13 illustrated in FIG. 9, the comparison input value VCMP_IN as the digital back EMF detection signal VDET_D generated from the output terminal of the analog-to-digital converter 23 becomes a lower level than the comparison reference value VCMP_REF for the gain compensation condition. As a result, by the first-time processing of the 14th step S14 through the 15th step S15 illustrated in FIG. 9, the most significant ninth bit of the first gain adjustment register 2121 is changed from a high level "1" to a low level "0." Furthermore, at the second-time 10th step S10, a high level "1" is set to the eighth bit specified by a new bit count N at the first-time 15th step S15. Therefore, the hexadecimal 100 h corresponding to the decimal number 256 (=$2^8$) is stored in the first gain adjustment register 2121. As a result, in response to the hexadecimal 100 h as the gain adjustment value of the first gain adjustment register 2121, the gain (=R2/R1) of the inverting amplifier 251 of the back EMF detector circuit 25 is set as the comparatively small value of the decimal number 256.

At the timing of the second-time 12th step S12 illustrated in FIG. 9, the digital back EMF detection signal VDET_D generated from the output terminal of the analog-to-digital converter 23 serves as the comparison input value VCMP_IN responding to the second current value −Ivcm2 of the VCM current Ivcm and the reduced gain (=R2/R1) of the inverting amplifier 251 of the back EMF detector circuit 25. The gain (=R2/R1) of the inverting amplifier 251 of the back EMF detector circuit 25 is reduced by the processing from the first-time 14th step S14 to the second-time 10th step S10. In the example illustrated in FIG. 9, this reduced gain (=R2/R1) is too little; accordingly, the analog back EMF detection signal Vdet_A from the output terminal of the back EMF detector circuit 25 calculated by Equation 2 becomes as a high level. Therefore, at the timing of the second-time 13th step S13 illustrated in FIG. 9, the comparison input value VCMP_IN as the digital back EMF detection signal VDET_D generated from the output terminal of the analog-to-digital converter 23 becomes a higher level than the comparison reference value VCMP_REF for the gain compensation condition. As a result, by the processing of the second-time 10th step S10 through the third-time 10th step S10 illustrated in FIG. 9, the eighth bit of the first gain adjustment register 2121 is maintained at the high level "1", and the seventh bit specified by the new bit count N is set at a high level "1." Therefore, the hexadecimal 180 h corresponding to the decimal number 384 (=$2^8+2^7$) is stored in the first gain adjustment register 2121. As a result, in response to the hexadecimal 180 h as the gain adjustment value of the first gain adjustment register 2121, the gain (=R2/R1) of the inverting amplifier 251 of the back EMF detector circuit 25 is set as the comparatively large value of the decimal number 384.

In the same way hereinafter, by performing the processing of the 10th step S10 through the 16th step S16 up to the 10th time illustrated in FIG. 9, the gain (=R2/R1) of the inverting amplifier 251 of the back EMF detector circuit 25 converges to the value of the decimal number 337 corresponding to the hexadecimal 151 h, according to a binary search algorithm. As the result, even if the resistance ratio of the parasitic resistance RL of the VCM 35 and the VCM current sensing resistor Rs varies due to a temperature change, the gain (=R2/R1) of the inverting amplifier 251 of the back EMF detector circuit 25 is varied correspondingly. Therefore, it is possible to fulfill the gain compensation condition of (RL−R2·Rs/R1)≈0 in the second term of the second line of the right-hand side of Equation 2. Therefore, since the second term of the second line of the right-hand side of Equation 2 is substantially maintained to zero, the analog back EMF detection signal Vdet_A of the back EMF detector circuit 25 does not depend on the current value of the VCM current Ivcm, and only depends on the back EMF Vbemf and the reference voltage Vref.

Embodiment 2

A Configuration of a Semiconductor Integrated Circuit According to Embodiment 2

FIG. 10 illustrates a configuration in which a semiconductor integrated circuit 2 of a high integration density called a COMBO driver according to Embodiment 2 is mounted in the hard disk drive unit (HDD) illustrated in FIG. 18.

Just the same as the semiconductor integrated circuit 2 according to Embodiment 1 illustrated in FIG. 1, the semiconductor integrated circuit 2 according to Embodiment 2 illustrated in FIG. 10 sets an analog back EMF detection signal Vdet_A of a back EMF detector circuit 25 to a first value and a second value, during a calibration operation period which corrects an error involved in a detection value of the back EMF Vbemf of the voice coil motor (hereinafter referred to as the VCM) 35 for the unloading operation UNLOAD or the loading operation LOAD. The semiconductor integrated circuit 2 according to Embodiment 2 illustrated in FIG. 10 is the same as the semiconductor integrated circuit 2 according to Embodiment 1 illustrated in FIG. 1, with respect to what has been explained in the outline of the semiconductor integrated circuit according to Embodiment 1 described above. However, the semiconductor integrated circuit 2 according to Embodiment 2 illustrated in FIG. 10 is different from the semiconductor integrated circuit 2 according to Embodiment 1 illustrated in FIG. 1 in the following point.

The Point of Difference of the Semiconductor Integrated Circuit According to Embodiment 2

That is, in the semiconductor integrated circuit 2 according to Embodiment 1 illustrated in FIG. 1, in order to set the analog back EMF detection signal Vdet_A of the back EMF detector circuit 25 to the first value and the second value in the calibration operation period, the current value of the VCM current Ivcm flowing through the VCM 35 is set as the first current value +Ivcm1 and the second current value +Ivcm2. For this current setup, the state control unit 2120 in the semiconductor integrated circuit 2 according to Embodiment 1 illustrated in FIG. 1 performs the numerical setup of the digital VCM current indicating value VCMCRNT supplied to the input terminal of the digital-to-analog converter 22. That is, as explained in FIG. 3, in response to the selection instruction signal ST_SEL of a low level "0", the state control unit 2120 according to Embodiment 1 generates the digital VCM input current indicating value VCMCRNT_IN supplied to the other input terminal of the selector 21202 from the output terminal of the selector 21202 as the digital VCM current indicating value VCMCRNT. Furthermore, as explained in FIG. 3, in response to the selection instruction signal ST_SEL of a high level "1", the state control unit 2120 according to Embodiment 1 generates the multiplication result ADJ_RATIO·VCMCRNT_IN supplied to one input terminal of the selector 21202 from the output terminal of the selector 21202 as the digital VCM current indicating value VCMCRNT.

On the contrary, in the semiconductor integrated circuit 2 according to Embodiment 2 illustrated in FIG. 10, in order to set the analog back EMF detection signal Vdet_A of the back EMF detector circuit 25 to the first value and the second value in the calibration operation period, the subtraction gain value (=R4/R3) of the subtraction amplifier 252 of the back EMF detector circuit 25 is set as the first subtraction gain value A2_GAIN1 and the second subtraction gain value A2_GAIN2. In the period when the subtraction gain value of the subtraction amplifier 252 is set as the first subtraction gain value A2_GAIN1 and the second subtraction gain value A2_GAIN2 in this way, in the semiconductor integrated circuit 2 according to Embodiment 2 illustrated in FIG. 10, the numeric value of the digital VCM current indicating value VCMCRNT supplied to the input terminal of the digital-to-analog converter 22 is maintained constant.

Therefore, in the semiconductor integrated circuit 2 according to Embodiment 2 illustrated in FIG. 10, the ratio indicating value ADJ_RATIO and the subtraction gain input value A2_GAIN_IN are supplied from the serial interface 211 to the state control unit 2120 of the adjustment logic circuit 212. Furthermore, the selection instruction signal ST_SEL is supplied from the adjustment sequencer 2125 to the state control unit 2120. When the selection instruction signal ST_SEL is at a low level "0", the subtraction gain input value A2_GAIN_IN supplied from the serial interface 211 is stored in the second gain adjustment register 2123 from the state control unit 2120 as the first subtraction gain value A2_GAIN1. As a result, in response to the first subtraction gain value A2_GAIN1 stored in the second gain setting register 2123, the ratio of the resistance R3 of the third resistor and the resistance R4 of the fourth resistor and the ratio of the resistance R3 of the fifth resistor and the resistance R4 of the sixth resistor in the subtraction amplifier 252 of the back EMF detector circuit 25 are set up. That is, the subtraction amplification gain of the subtraction amplifier 252 of the back EMF detector circuit 25 is set as the first subtraction gain value A2_GAIN1 by the first subtraction gain value A2_GAIN1 stored in the second gain setting register 2123. When the selection instruction signal ST_SEL is at a high level "1", the multiplication result ADJ_RATIO·A2_GAIN_IN of the ratio indicating value ADJ_RATIO and the subtraction gain input value A2_GAIN_IN is stored in the second gain adjustment register 2123 from the state control unit 2120 as the second subtraction gain value A2_GAIN2. As a result, in response to the second subtraction gain value A2_GAIN2 stored in the second gain setting register 2123, the ratio of the resistance R3 of the third resistor and the resistance R4 of the fourth resistor and the ratio of the resistance R3 of the fifth resistor and the resistance R4 of the sixth resistor in the subtraction amplifier 252 of the back EMF detector circuit 25 are set up. That is, the subtraction amplification gain of the subtraction amplifier 252 of the back EMF detector circuit 25 is set as the second subtraction gain value A2_GAIN2 by the second subtraction gain value A2_GAIN2 stored in the second gain setting register 2123.

Accordingly, in the semiconductor integrated circuit 2 according to Embodiment 2 illustrated in FIG. 10, in response to the analog back EMF detection signal Vdet_A having the first value of the back EMF detector circuit 25 determined by the first subtraction gain value A2_GAIN1 of the subtraction amplifier 252 of the back EMF detector circuit 25, the analog-to-digital converter 23 generates the first detection calibration signal VDET_CAL1 as the digital back EMF detection signal VDET_D. Furthermore, in the semiconductor integrated circuit 2 according to Embodiment 2 illustrated in FIG. 10, in response to the analog back EMF detection signal Vdet_A as the second value of the back EMF detector circuit 25 determined by the second subtraction gain value A2_GAIN2 of the subtraction amplifier 252 of the back EMF detector circuit 25, the analog-to-digital converter 23 generates the second detection calibration signal VDET_CAL2 as the digital back EMF detection signal VDET_D.

Also in the semiconductor integrated circuit 2 according to Embodiment 2 illustrated in FIG. 10, the digital back EMF detection signal VDET_D, outputted from the analog-to-digital converter 23 in response to the analog back EMF detection signal Vdet_A set as the first value, is stored in the third detection register 21210 as the first detection calibration signal VDET_CAL1. Similarly, the digital back EMF detection signal VDET_D, outputted from the analog-to-digital converter 23 in response to the analog back EMF detection signal Vdet_A set as the second value, is stored in the fourth detection register 21211 as the second detection calibration signal VDET_CAL2.

Also in the semiconductor integrated circuit 2 according to Embodiment 2 illustrated in FIG. 10, the calculation unit 21212 calculates a comparison reference value VCMP_REF for a gain compensation condition in cases where the current value of the VCM current Ivcm is zero (≈0 mA), from the first detection calibration signal VDET_CAL1 stored in the third detection register 21210 and the second detection calibration signal VDET_CAL stored in the fourth detection register 21211. The comparison reference value VCMP_REF for the gain compensation condition calculated by the calculation unit 21212 is stored in the first detection register 2126. During the calibration operation period, the comparison reference value VCMP_REF for the gain compensation condition is supplied from the first detection register 2126 to one input terminal of the comparator 2128, and a comparison input value VCMP_IN responding to the digital back EMF detection signal VDET_D is supplied from the second detection register 2127 to the other input terminal of the comparator 2128.

As a result, in response to the comparison output signal VCMP_OUT of the comparator 2128, the adjustment sequencer 2125 converges the inverting gain (=R2/R1) of the inverting amplifier 251 of the back EMF detector circuit 25 to a prescribed value, with the use of a binary search algorithm, for example. That is, even if the resistance ratio of the parasitic resistance PI of the VCM 35 and the VCM current sensing resistor Rs varies due to a temperature change, the inverting gain (=R2/R1) of the inverting amplifier 251 of the back EMF detector circuit 25 is varied correspondingly. Therefore, it is possible to fulfill the gain compensation condition of (RL−R2·Rs/R1)≈0 in the second term of the second line of the right-hand side of Equation 1 and Equation 2.

<<A Configuration of the State Control Unit which Generates a Division Indicating Value and a Subtraction Gain Value>>

FIG. 11 illustrates a configuration of the state control unit 2120 which generates a division indicating value DIV_NUM and a subtraction gain value A2_GAIN, in the semiconductor integrated circuit 2 according to Embodiment 2 illustrated in FIG. 10.

As illustrated in FIG. 11, the state control unit 2120 is comprised of a multiplier 21200, a subtractor 21201, and a selector 21202.

A ratio indicating value ADJ_RATIO is supplied from the serial interface 211 of the logic circuit 21 to one input terminal of the multiplier 21200, and a subtraction gain input value A2_GAIN_IN is supplied from the serial interface 211 of the logic circuit 21 to the other input terminal of the multiplier 21200. As a result, a multiplication result ADJ_RATIO·A2_GAIN_IN is generated from the output terminal of the multiplier 21200.

The ratio indicating value ADJ_RATIO is supplied from the serial interface 211 of the logic circuit 21 to one input terminal of the subtractor 21201, and "1" is supplied to the other input terminal of the subtractor 21201. As a result, a division indicating value DIV_NUM as a subtraction result is generated from the output terminal of the subtractor 21201. The division indicating value DIV_NUM is equal to a value ADJ_RATIO−1 in which "1" is subtracted from the ratio indicating value ADJ_RATIO.

The multiplication result ADJ_RATIO·A2_GAIN_IN from the multiplier 21200 is supplied to one input terminal of the selector 21202, and the subtraction gain input value A2_GAIN_IN is supplied from the serial interface 211 of the logic circuit to the other input terminal of the selector 21202. Furthermore, a selection instruction signal ST_SEL is supplied from the adjustment sequencer 2125 to the selection control terminal of the selector 21202. When the selection instruction signal ST_SEL is at a high level "1", the multiplication result ADJ_RATIO·A2_GAIN_IN supplied from the multiplier 21200 to one input terminal of the selector 21202 is generated from the output terminal of the selector 21202 as the subtraction gain value A2_GAIN. Furthermore, when the selection instruction signal ST_SEL is at a low level "0", the subtraction gain input value A2_GAIN_IN supplied to the other input terminal of the selector 21202 is generated from the output terminal of the selector 21202 as the subtraction gain value A2_GAIN.

Figure 12:
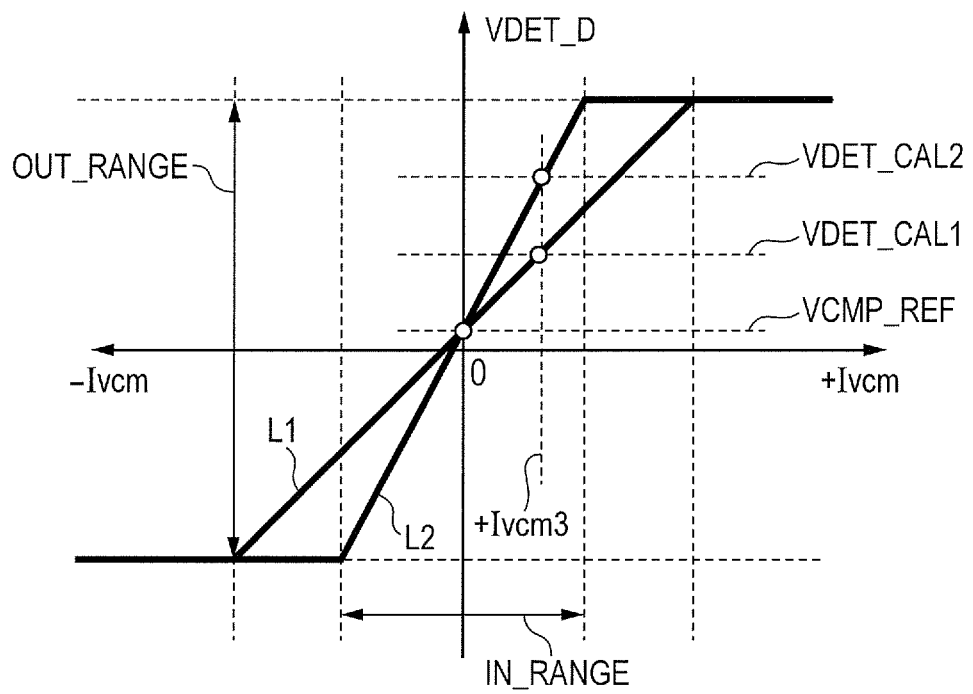
FIG. 12 is a drawing illustrating a manner that, when the semiconductor integrated circuit 2 according to Embodiment 2 illustrated in FIG. 10 performs a calibration operation to satisfy again the gain compensation condition to the temperature change, a comparison reference value VCM-P_REF is calculated for the gain compensation condition of the zero (≈0 mA) current value of the VCM current Ivcm from the first detection calibration signal VDET_CAL1 and the second detection calibration signal VDET_CAL2.

FIG. 12 illustrates a manner that, when the semiconductor integrated circuit 2 according to Embodiment 2 illustrated in FIG. 10 performs the calibration operation to satisfy again the gain compensation condition to the temperature change described above, the comparison reference value VCMP_REF is calculated for the gain compensation condition of the zero (≈0 mA) current value of the VCM current Ivcm from the first detection calibration signal VDET_CAL1 and the second detection calibration signal VDET_CAL2. The present comparison reference value VCMP_REF corresponds to the state of the zero (≈0 mA) current value of the VCM current Ivcm, and to the state in which the magnetic head 33 and the arm 34 are pressed against the inner circumference stopper or the outer circumference stopper, or retracted to the ramp mechanism 36.

Therefore, the comparison reference value VCMP_REF corresponds to the analog back EMF detection signal Vdet_A in the state where the back EMF Vbemf is zero substantially and the current value of the VCM current Ivcm is zero (≈0 mA), in Equation 1 and Equation 2. Therefore, the comparison reference value VCMP_REF for the gain compensation condition is derived as Equation 4 from Equation 1 and Equation 2.

As explained with reference to FIG. 11, in response to the selection instruction signal ST_SEL of a low level "0", the subtraction gain input value A2_GAIN_IN supplied to the other input terminal of the state control unit 2120 illustrated in FIG. 11 is generated from the output terminal of the selector 21202 as the subtraction gain value A2_GAIN. Furthermore, in response to the selection instruction signal ST_SEL of a high level "1", the multiplication result ADJ_RATIO·A2_GAIN_IN from the multiplier 21200 of the state control unit 2120 illustrated in FIG. 11 is generated from the output terminal of the selector 21202 as the subtraction gain value A2_GAIN. In this way, according to the semiconductor integrated circuit 2 according to Embodiment 2 illustrated in FIG. 10, in order to set the analog back EMF detection signal Vdet_A of the back EMF detector circuit 25 to the first value and the second value in the calibration operation period, the subtraction gain value (=R4/R3) of the subtraction amplifier 252 of the back EMF detector circuit 25 is set as the first subtraction gain value A2_GAIN1 and the second subtraction gain value A2_GAIN2. Here, the first subtraction gain value A2_GAIN1 is A2_GAIN_IN, and the second subtraction gain value A2_GAIN2 is ADJ_RATIO·A2_GAIN_IN.

The characteristic L1 of FIG. 12 illustrates the relation between the digital back EMF detection signal VDET_D of the analog-to-digital converter 23 and the VCM current Ivcm, in a case where, by the selection instruction signal ST_SEL of a low level "0", the subtraction amplifier 252 is set as the first subtraction gain value A2_GAIN1 (A2_GAIN_IN) and the analog back EMF detection signal Vdet_A is set as the first value. The characteristic L2 of FIG. 12 illustrates the relation between the digital back EMF detection signal VDET_D of the analog-to-digital converter 23 and the VCM current Ivcm, in a case where, by the selection instruction signal ST_SEL of a high level "1", the subtraction amplifier 252 is set as the second subtraction gain value A2_GAIN2 and the analog back EMF detection signal Vdet_A is set as the second value. The second subtraction gain value A2_GAIN2 of the subtraction amplifier 252 of the case is ADJ_RATIO·A2_GAIN_IN.

Furthermore, in the semiconductor integrated circuit 2 according to Embodiment 2 illustrated in FIG. 10, during the calibration operation period which corrects an error involved in the detection value of the back EMF Vbemf of the VCM 35 for the unloading operation UNLOAD or the loading operation LOAD, the numeric value of the digital VCM current indicating value VCMCRNT supplied to the input terminal of the digital-to-analog converter 22 is maintained constant. Therefore, the VCM current Ivcm generated by the digital-to-analog converter 22 and the VCM driver circuit 24 is maintained at the third current value +Ivcm3.

Therefore, as illustrated in the characteristic L1 of FIG. 12, when the analog back EMF detection signal Vdet_A is set as the first value by the selection instruction signal ST_SEL of a low level "0", in response to the VCM current having the constant third current value +Ivcm3, the back EMF detector circuit 25 and the analog-to-digital converter 23 generate the first detection calibration signal VDET_CAL1 as the digital back EMF detection signal VDET_D. As illustrated in the characteristic L2 of FIG. 12, when the analog back EMF detection signal Vdet_A is set as the second value by the selection instruction signal ST_SEL of a high level "1", in response to the VCM current having the constant third current value +Ivcm3, the back EMF detector circuit 25 and the analog-to-digital converter 23 generates the second detection calibration signal VDET_CAL2 as the digital back EMF detection signal VDET_D.

Furthermore, in the semiconductor integrated circuit 2 according to Embodiment 2 illustrated in FIG. 10, the following relation is satisfied between the first subtraction gain value A2_GAIN1 (A2_GAIN_IN) and the second subtraction gain value A2_GAIN2 (ADJ_RATIO·A2_GAIN_IN), as the subtraction gain value (=R4/R3) of the subtraction amplifier 252 of the back EMF detector circuit 25.

$$A_{2\_GAIN2} = ADJ\_RATIO \cdot A_{2\_GAIN1} \quad \text{(Equation 10)}$$

The first detection calibration signal VDET_CAL1 described above is stored in the third detection register 21210, and the second detection calibration signal VDET_CAL2 is stored in the fourth detection register 21211. The calculation unit 21212 calculates the comparison reference value VCMP_REF for the gain compensation condition in cases where the current value of the VCM current Ivcm is zero (≈0 mA), from the first detection calibration signal VDET_CAL1 of the third detection register 21210 and the second detection calibration signal VDET_CAL2 of the fourth detection register 21211. The comparison reference value VCMP_REF for the gain compensation condition calculated by the calculation unit 21212 is stored in the first detection register 2126. During the calibration operation period, the comparison reference value VCMP_REF for the gain compensation condition is supplied from the first detection register 2126 to one input terminal of the comparator 2128, and a comparison input value VCMP_IN responding to the digital back EMF detection signal VDET_D is supplied from the second detection register 2127 to the other input terminal of the comparator 2128.

As a result, in response to the comparison output signal VCMP_OUT of the comparator 2128, the adjustment sequencer 2125 converges the gain (=R2/R1) of the inverting amplifier 251 of the back EMF detector circuit 25 to a prescribed value, with the use of a binary search algorithm, for example. That is, even if the resistance ratio of the parasitic resistance RL of the VCM 35 and the VCM current sensing resistor Rs varies due to a temperature change, the gain (=R2/R1) of the inverting amplifier 251 of the back EMF detector circuit 25 is changed correspondingly. Therefore, it is possible to fulfill the gain compensation condition of (RL−R2·Rs/R1)≈0 in the second term of the second line of the right-hand side of Equation 1.

The calibration operation performed here is for the unloading operation UNLOAD and the magnetic head 33 is pressed against the inner circumference stopper 36 by the positive polarity of the VCM current Ivcm which has the third current value +Ivcm3. Therefore, in the state where the magnetic head 33 is pressed against the inner circumference stopper 36, the back EMF Vbemf of the first term of the second line of the right-hand side of Equation 1 becomes zero substantially.

Accordingly, the first detection calibration signal VDET_CAL1, which is the digital back EMF detection signal VDET_D responding to the VCM current Ivcm having the third current value +Ivcm3 and to the first subtraction gain value A2_GAIN1 as the subtraction gain values (=R4/R3) of the subtraction amplifier 252 of the back EMF detector circuit 25, is derived as the following equation from Equation 1, Equation 2, and Equation 4.

$$V_{DET\_CAL1} \equiv \frac{R_4}{R_3} \cdot \left(R_L - \frac{R_2}{R_1} \cdot R_S\right) \cdot (+I_{vcm3}) + V_{CMP\_REF} \quad \text{(Equation 11)}$$

$$\equiv (-A_{2\_GAIN1}) \cdot \left(R_L - \frac{R_2}{R_1} \cdot R_S\right) \cdot (+I_{vcm3}) +$$

$$V_{CMP\_REF}$$

Similarly, the second detection calibration signal VDET_CAL2, which is the digital back EMF detection signal VDET_D responding to the VCM current Ivcm having the third current value +Ivcm3 and to the second subtraction gain value A2_GAIN2 as the subtraction gain values (=R4/R3) of the subtraction amplifier 252 of the back EMF detector circuit 25, is derived as the following equation from Equation 1, Equation 2, and Equation 4.

$$V_{DET\_CAL2} \equiv -\frac{R_4}{R_3} \cdot \left(R_L - \frac{R_2}{R_1} \cdot R_S\right) \cdot (+I_{vcm3}) + V_{CMP\_REF} \quad \text{(Equation 12)}$$

$$\equiv (-ADJ\_RATIO \cdot A_{2\_GAIN1}) \cdot \left(R_L - \frac{R_2}{R_1} \cdot R_S\right) \cdot$$

$$(+I_{vcm3}) + V_{CMP\_REF}$$

Furthermore, the following relation is derived from Equation 10 and Equation 12.

$$V_{DET\_CAL2} \equiv -(ADJ\_RATIO \cdot A_{2\_GAIN1}) \cdot \left(R_L - \frac{R_2}{R_1} \cdot R_S\right) \cdot \quad \text{(Equation 13)}$$

$$(+I_{vcm3}) + V_{CMP\_REF}$$

$$\equiv (A_{2\_GAIN1}) \cdot \left\{\left(\frac{-R_L \cdot (+I_{vcm3}) \cdot}{ADJ\_RATIO}\right) - \right.$$

$$\left.\left(\frac{-\frac{R_2}{R_1} \cdot R_S \cdot I_{vcm3} \cdot}{ADJ\_RATIO}\right)\right\} +$$

$$V_{CMP\_REF}$$

$$\equiv ADJ\_RATIO \cdot V_{DET\_CAL1} + (1 - ADJ\_RATIO) \cdot V_{CMP\_REF}$$

As to the comparison reference value VCMP_REF for the gain compensation condition described above, the following relation defined by Equation 14 is obtained from Equation 13.

$$V_{CMP\_REF} \equiv \frac{V_{DET\_CAL2}}{1 - ADJ\_RATIO} - \frac{ADJ\_RATIO \cdot V_{DET\_CAL1}}{1 - ADJ\_RATIO} \quad \text{(Equation 14)}$$

$$\equiv \frac{ADJ\_RATIO}{ADJ\_RATIO - 1} \cdot V_{DET\_CAL1} -$$

$$\frac{V_{DET\_CAL2}}{ADJ\_RATIO - 1}$$

$$\equiv \frac{ADJ\_RATIO - 1}{ADJ\_RATIO - 1} \cdot V_{DET\_CAL1} +$$

$$\frac{V_{DET\_CAL1}}{ADJ\_RATIO - 1} - \frac{V_{DET\_CAL2}}{ADJ\_RATIO - 1}$$

$$\equiv V_{DET\_CAL1} + \frac{V_{DET\_CAL1} - V_{DET\_CAL2}}{ADJ\_RATIO - 1}$$

It is understood that the relation defined by Equation 14 is the same as the relation defined by Equation 3 and the relation defined by Equation 9.

According to a preferred embodiment, in order to improve the accuracy of the comparison reference value VCMP_REF for the gain compensation condition calculated by the relation defined by Equation 14, the first detection calibration signal VDET_CAL1 and the second detection calibration signal VDET_CAL2 are set up within the output range OUT_RANGE explained in FIG. 23 and FIG. 24. That is, as illustrated in FIG. 12, the first detection calibration signal VDET_CAL1 and the second detection calibration signal VDET_CAL2 are set within the output range OUT_RANGE in which the linearity of the digital back EMF detection signal VDET_D is maintained. As illustrated in FIG. 12, the calculation unit 21212 calculates the comparison reference value VCMP_REF for the gain compensation condition by employing the first detection calibration signal VDET_CAL1 and the second detection calibration signal VDET_CAL2.

<<The Calibration Operation for the Unloading Operation>>

Figure 13:
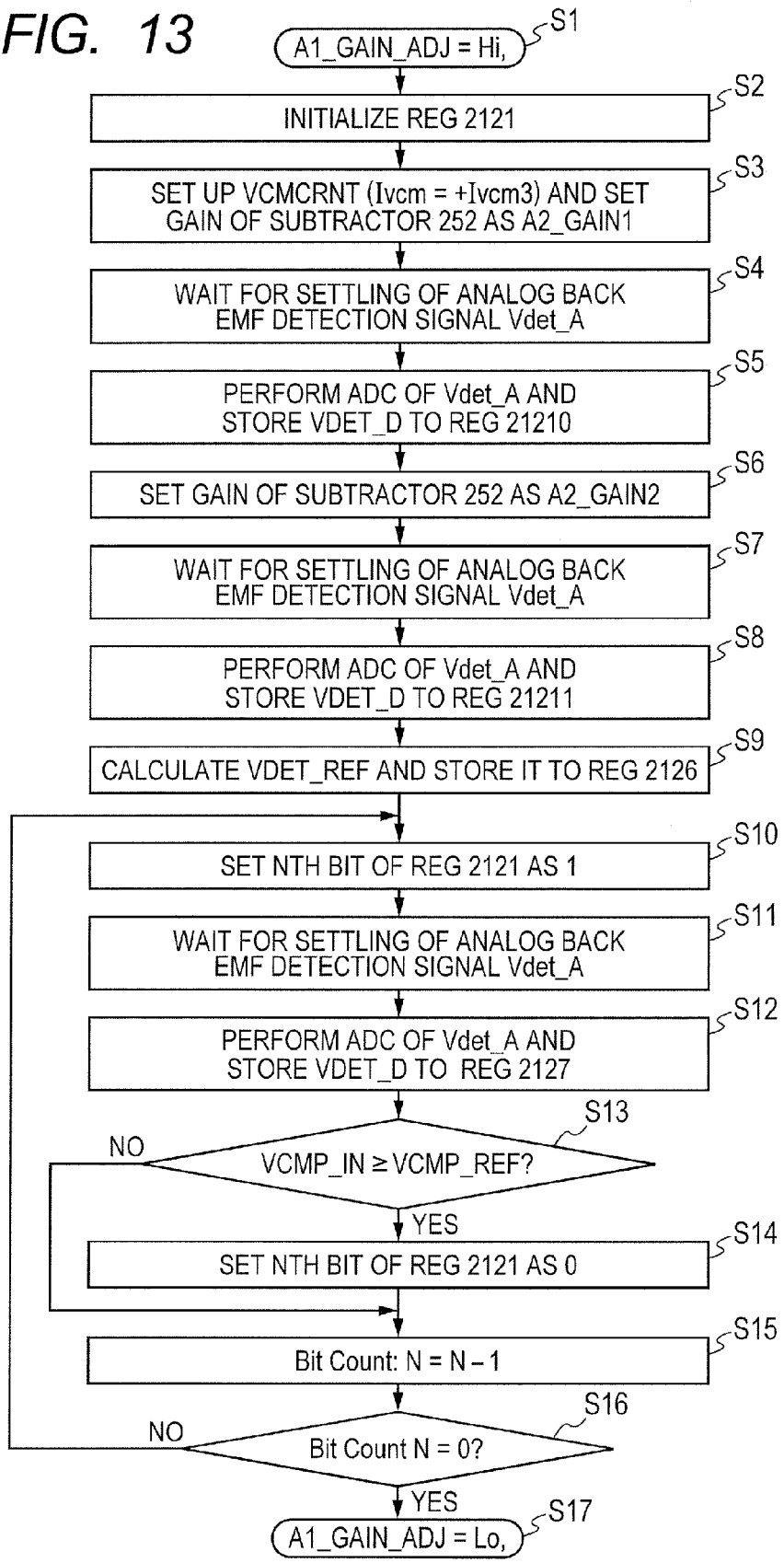
FIG. 13 is an explanatory drawing of the calibration operation for compensating an error involved in the detection value of the back EMF Vbemf of the VCM 35 for an unloading operation UNLOAD of the semiconductor integrated circuit 2 according to Embodiment 2 illustrated in FIG. 10.

FIG. 13 explains the calibration operation for compensating an error involved in the detection value of the back EMF Vbemf of the VCM 35 for the unloading operation UNLOAD of the semiconductor integrated circuit 2 according to Embodiment 2 illustrated in FIG. 10.

The calibration operation for the unloading operation UNLOAD according to Embodiment 2 illustrated in FIG. 13 is different from the calibration operation for the unloading operation UNLOAD according to Embodiment 1 illustrated in FIG. 6 in the following point.

That is, at the third step S3 of the calibration operation according to Embodiment 2 illustrated in FIG. 13, in order to set the current value of the VCM current Ivcm flowing through the VCM 35 as the third current value +Ivcm3, the numerical setup of the digital VCM current indicating value VCMCRNT to be generated by the state control unit 2120 is performed. Furthermore, at the third step S3 illustrated in FIG. 13, the gain of the subtraction amplifier 252 is set as the first subtraction gain value A2_GAIN1 (A2_GAIN_IN) by the selection instruction signal ST_SEL of a low level "0."

At the sixth step S6 of the calibration operation according to Embodiment 2 illustrated in FIG. 13, the gain of the subtraction amplifier 252 is set as the second subtraction gain value A2_GAIN2 (ADJ_RATIO·A2_GAIN_IN) by the selection instruction signal ST_SEL of a high level "1." With regard to the other processing, the calibration operation for the unloading operation UNLOAD according to Embodiment 2 illustrated in FIG. 13 is completely same as the calibration operation for the unloading operation UNLOAD according to Embodiment 1 illustrated in FIG. 8. Therefore, the explanation thereof is omitted.

<<The Calibration Operation for the Loading Operation>>

Figure 14:
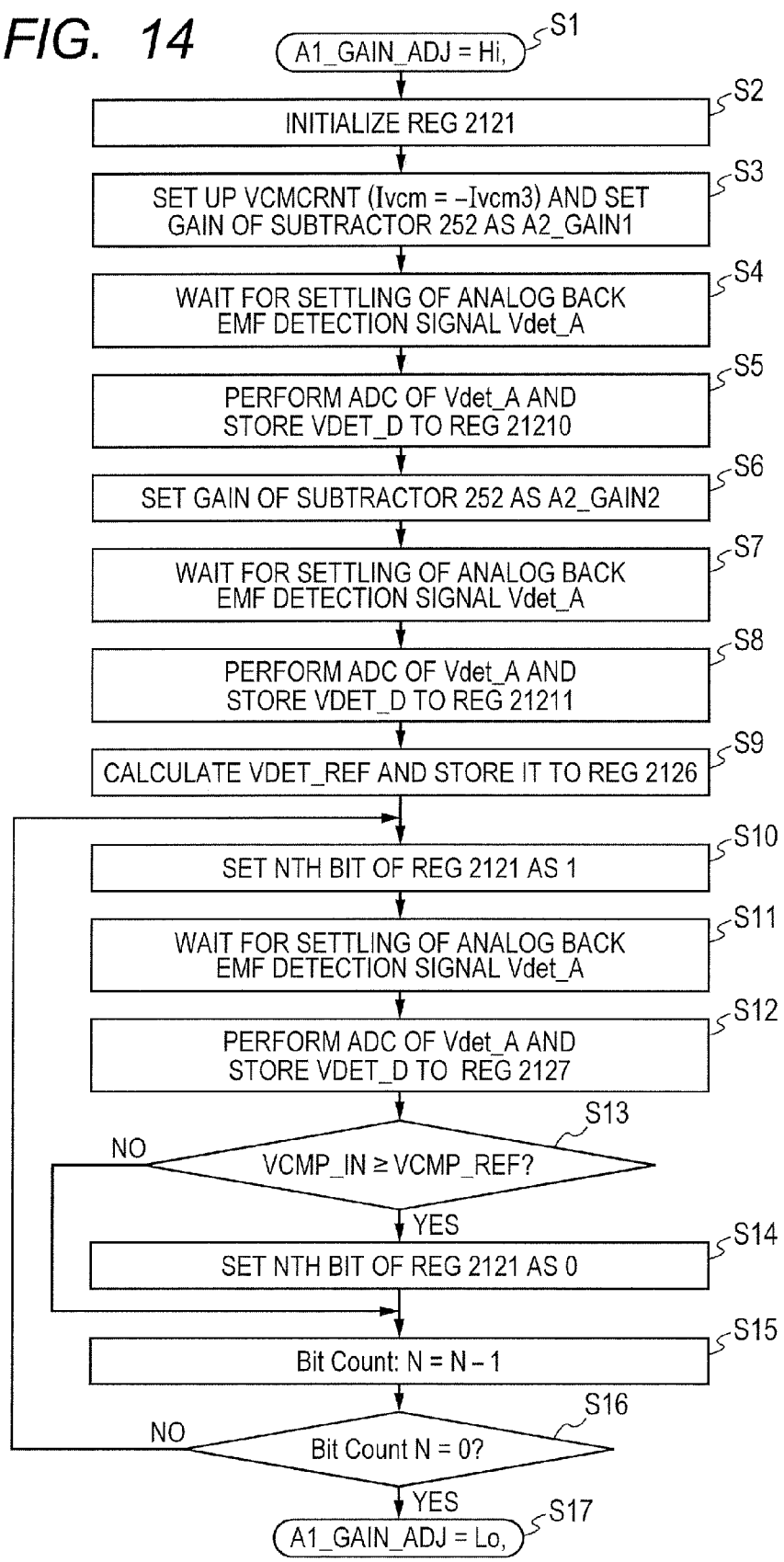
FIG. 14 is an explanatory drawing of the calibration operation for compensating an error involved in the detection value of the back EMF Vbemf of the VCM 35 for a loading operation LOAD of the semiconductor integrated circuit 2 according to Embodiment 2 illustrated in FIG. 10.

FIG. 14 explains the calibration operation for compensating an error involved in the detection value of the back EMF Vbemf of the VCM 35 for the loading operation LOAD of the semiconductor integrated circuit 2 according to Embodiment 2 illustrated in FIG. 10.

That is, at the third step S3 of the calibration operation according to Embodiment 2 illustrated in FIG. 14, in order to set the current value of the VCM current Ivcm flowing through the VCM 35 as the third current value −Ivcm3, the numerical setup of the digital VCM current indicating value VCMCRNT to be generated by the state control unit 2120 is performed. Furthermore, at the third step S3 illustrated in FIG. 14, the gain of the subtraction amplifier 252 is set at the first subtraction gain value A2_GAIN1 (A2_GAIN_IN) by the selection instruction signal ST_SEL of a low level "0."

At the sixth step S6 of the calibration operation according to Embodiment 2 illustrated in FIG. 14, the gain of the subtraction amplifier 252 is set at the second subtraction gain value A2_GAIN2 (ADJ_RATIO·A2_GAIN_IN) by the selection instruction signal ST_SEL of a high level "1." With regard to the other processing, the calibration operation for the loading operation LOAD according to Embodiment 2 illustrated in FIG. 14 is completely same as the calibration operation for the loading operation LOAD according to Embodiment 1 illustrated in FIG. 8. Therefore, the explanation thereof is omitted.

In Embodiment 1 explained with reference to FIG. 1 through FIG. 9, in order to set the analog back EMF detection signal Vdet_A as the first value and the second value, the current value of the VCM current Ivcm is set to the first current value (+Ivcm1, −Ivcm1) and the second current value (+Ivcm2, −Ivcm2). Therefore, in Embodiment 1, there may arise an issue that a difference occurs in the heat generation of the VCM 35 according to a difference of the current value of the VCM current Ivcm, and that this temperature change may change a little the resistance ratio of the parasitic resistance RL of the VCM 35 and the VCM current sensing resistor Rs. As a result, in Embodiment 1, an error may occur in the comparison reference value VCMP_REF calculated from the first detection calibration signal VDET_CAL1 and the second detection calibration signal VDET_CAL2.

On the contrary, in Embodiment 2 explained with reference to FIG. 10 through FIG. 14, in order to set the analog back EMF detection signal Vdet_A as the first value and the second value, the subtraction gain value (=R4/R3) of the subtraction amplifier 252 of the back EMF detector circuit 25 is set as the first gain A2_GAIN1 and the second gain A2_GAIN2, and the VCM current Ivcm is maintained as the third current value +Ivcm3 having a constant value. Therefore, in Embodiment 2, the possibility is reduced in varying the resistance ratio of the parasitic resistance RL of the VCM 35 and the VCM current sensing resistor Rs due to the temperature change. As a result, in Embodiment 2, the possibility is reduced in occurrence of an error involved in the comparison reference value VCMP_REF calculated from the first detection calibration signal VDET_CAL1 and the second detection calibration signal VDET_CAL2.

Furthermore, in Embodiment 1 explained with reference to FIG. 1 through FIG. 9, the VCM current varies because the VCM current Ivcm is set as the first current value and the second current value in the case of generation of the comparison reference value VCMP_REF. Therefore, at the time of the variation of the VCM current, it is required to secure some wait time during which the voltage level of the analog back EMF detection signal Vdet_A of the back EMF detector circuit 25 is settled after the influence of time constants, such as the coil L of the VCM 35.

On the contrary, in Embodiment 2 explained with reference to FIG. 10 through FIG. 14, the VCM current Ivcm is maintained as the constant value for generation of the comparison reference value VCMP_REF. Therefore, it becomes possible to reduce the wait time during which the voltage level of the analog back EMF detection signal Vdet_A of the back EMF detector circuit 25 is settled.

Embodiment 3

A Configuration of a Semiconductor Integrated Circuit According to Embodiment 3

FIG. 15 illustrates a configuration in which a semiconductor integrated circuit 2 of high integration density called a COMBO driver according to Embodiment 3 is mounted in the hard disk drive unit (HDD) illustrated in FIG. 18.

In the semiconductor integrated circuit 2 according to Embodiment 1 or Embodiment 2 described above, the nonlinearity of the analog back EMF detection signal Vdet_A generated from the back EMF detector circuit 25 occurs when the maximum value of the analog back EMF detection signal Vdet_A reaches the operation power voltage VDD or the minimum value reaches the ground voltage GND. The semiconductor integrated circuit 2 according to Embodiment 3 illustrated in FIG. 15 can prevent this nonlinearity of the analog back EMF detection signal Vdet_A. If the analog back EMF detection signal Vdet_A has nonlinearity, an error occurs in the first detection calibration signal VDET_CAL1 and the second detection calibration signal VDET_CAL2. An error occurs also in the comparison reference value VCMP_REF calculated from Equation 3 described above. Therefore, the semiconductor integrated circuit 2 according to Embodiment 3 illustrated in FIG. 15 prevents the occurrence of the nonlinearity in the analog back EMF detection signal Vdet_A, thereby reducing the error occurring in the first detection calibration signal VDET_CAL1 and the second detection calibration signal VDET_CAL2, and in the comparison reference value VCMP_REF.

What is described above is the point that the semiconductor integrated circuit 2 according to Embodiment 3 illustrated in FIG. 15 is different from the semiconductor integrated circuit 2 according to Embodiment 1 or Embodiment 2 described above.

A Detailed Configuration of the Semiconductor Integrated Circuit According to Embodiment 3

That is, the semiconductor integrated circuit 2 according to Embodiment 3 illustrated in FIG. 15 prevents the occurrence of nonlinearity of the analog back EMF detection signal Vdet_A which is the base of generation of the first detection calibration signal VDET_CAL1, the second detection calibration signal VDET_CAL2, and the comparison reference value VCMP_REF, in the semiconductor integrated circuit 2 according to Embodiment 1 illustrated in FIG. 1 as an example.

Therefore, in the semiconductor integrated circuit 2 according to Embodiment 3 illustrated in FIG. 15, the digital back EMF detection signal VDET_D generated from the analog-to-digital converter 23 is supplied to the state control unit 2120 in order to maintain the linearity of the analog back EMF detection signal Vdet_A. By monitoring the value of the digital back EMF detection signal VDET_D, the state control unit 2120 detects that the analog back EMF detection signal Vdet_A generated from the back EMF detector circuit 25 has reached an allowable maximum voltage a little lower than the operation power voltage VDD or has reached an allowable minimum voltage a little higher than the ground voltage GND. In response to the detection result that the analog back EMF detection signal Vdet_A has reached the allowable maximum voltage or the allowable minimum voltage, the state control unit 2120 decreases the current value of the VCM current Ivcm flowing through the VCM 35 by adjusting the digital VCM current indicating value VCMCRNT to be supplied to the input terminal of the digital-to-analog converter 22. Decreasing of the current value of the VCM current Ivcm is continued until it is no longer detected that the analog back EMF detection signal Vdet_A has reached the allowable maximum voltage or the allowable minimum voltage. Therefore, according to the semiconductor integrated circuit 2 of Embodiment 3 illustrated in FIG. 15, the first detection calibration signal VDET_CAL1 and the second detection calibration signal VDET_CAL2 can be kept in the output range OUT_RANGE in which the linearity of the digital back EMF detection signal VDET_D is maintained.

<<A Configuration of the State Control Unit to Generate the Division Indicating Value and the Digital VCM Current Indicating Value>>

FIG. 16 illustrates a configuration of the state control unit 2120 which generates the division indicating value DIV_NUM and a digital VCM current indicating value VCMCRNT, in the semiconductor integrated circuit 2 according to Embodiment 3 illustrated in FIG. 15.

As illustrated in FIG. 16, the state control unit 2120 is comprised of a multiplier 21200, a subtractor 21201, a selector 21202, a first comparator 21203, a second comparator 21204, an OR circuit 21205, and a limiter 21206.

The ratio indicating value ADJ_RATIO is supplied from the serial interface 211 of the logic circuit 21 to one input terminal of the limiter 21206, and an output signal VCMP_LMT generated from the OR circuit 21205 is supplied to the other input terminal of the limiter 21206. A digital back EMF detection signal VDET_D is supplied in common from the analog-to-digital converter 23 to one input terminal of the first comparator 21203 and to one input terminal of the second comparator 21204. An allowable maximum voltage VTH_H a little lower than the operation power voltage VDD is supplied to the other input terminal of the first comparator 21203, and an allowable minimum voltage VTH_L a little higher than the ground voltage GND is supplied to the other input terminal of the second comparator 21204.

It is assumed that, in the first comparator 21203, the digital back EMF detection signal VDET_D supplied to one input terminal is equal to or higher than the allowable maximum voltage VTH_H supplied to the other input terminal, or that, in the second comparator 21204, the digital back EMF detection signal VDET_D supplied to one input terminal is equal to or lower than the allowable minimum voltage VTH_L supplied to the other input terminal. In either case, an output signal VCMP_LMT of a high level "1" is generated from the OR circuit 21205. To the contrary it is assumed that, in the first comparator 21203, the digital back EMF detection signal VDET_D supplied to one input terminal is lower than the allowable maximum voltage VTH_H supplied to the other input terminal, or that, in the second comparator 21204, the digital back EMF detection signal VDET_D supplied to one input terminal is higher than the allowable minimum voltage VTH_L supplied to the other input terminal. In either case, an output signal VCMP_LMT of a low level "0" is generated from the OR circuit 21205.

A limit ratio indicating value RATIO_LMT is supplied from the limiter 21206 to one input terminal of the subtractor 21201 of the state control unit 2120 illustrated in FIG. 16, and "1" is supplied to the other input terminal of the subtractor 21201. As a result, a division indicating value DIV_NUM as a subtraction result is generated from the output terminal of the subtractor 21201. This division indicating value DIV_NUM is equal to the limit ratio indicating value RATIO_LMT subtracted by "1", or RATIO_LMT−1.

A multiplication result RATIO_LMT·VCMCRNT_IN is supplied from the multiplier 21200 to one input terminal of the selector 21202, and a digital VCM input current indicating value VCMCRNT_IN is supplied from the serial interface 211 of the logic circuit 21 to the other input terminal of the selector 21202. A selection instruction signal ST_SEL is supplied from the adjustment sequencer 2125 to the selection control terminal of the selector 21202. When the selection instruction signal ST_SEL is a high level "1", the multiplication result RATIO_LMT·VCMCRNT_IN supplied from the multiplier 21200 to one input terminal of the selector 21202 is generated from the output terminal of the selector 21202 as the digital VCM current indicating value VCMCRNT. When the selection instruction signal ST_SEL is at a low level "0", the digital VCM input current indicating value VCMCRNT_IN supplied to the other input terminal of the selector 21202 is generated from the output terminal of the selector 21202 as the digital VCM current indicating value VCMCRNT.

A selection instruction signal ST_SEL of a high level "1", which is supplied from the adjustment sequencer 2125 to the selection control terminal of the selector 21202 in order to set the analog back EMF detection signal Vdet_A of the back EMF detector circuit 25 as the second value, is supplied also to the control input terminal of the limiter 21206. The limiter 21206 operates responding to a ratio indicating value ADJ_RATIO supplied from the serial interface 211 of the logic circuit 21, an output signal VCMP_LMT supplied from the OR circuit 21205, and a selection instruction signal ST_SEL supplied from the adjustment sequencer 2125.

When the selection instruction signal ST_SEL is at a high level "1" in order to set the analog back EMF detection signal Vdet_A as the second value and the output signal VCMP_LMT supplied from the OR circuit 21205 is at a low level "0", the limiter 21206 generates a limit ratio indicating value RATIO_LMT having a value of the ratio indicating value ADJ_RATIO supplied to the one input terminal thereof. In this case, the limiter 21206 supplies, to the adjustment sequencer 2125, a state output signal ST_OK of a high level "1" which indicates that the analog back EMF detection signal Vdet_A is within the range of linearity.

When the selection instruction signal ST_SEL is at a high level "1" in order to set the analog back EMF detection signal Vdet_A as the second value and the output signal VCMP_LMT supplied from the OR circuit 21205 is at a high level "1", the limiter 21206 generates a limit ratio indicating value RATIO_LMT having a value smaller by a predetermined value than the ratio indicating value ADJ_RATIO supplied to one input terminal. In this case, the limiter 21206 supplies, to the adjustment sequencer 2125, a state output signal ST_OK of a low level "0" which indicates that the analog back EMF detection signal Vdet_A is not within the range of linearity. Then, in response to the state output signal ST_OK of a low level "0" from the limiter 21206, the adjustment sequencer 2125 generates a selection instruction signal ST_SEL of a high level "1", and supplies it to the control input terminal of the limiter 21206 again. When the output signal VCMP_LMT supplied from the OR circuit 21205 in this state is at a high level "1" again, the limiter 21206 generates the limit ratio indicating value RATIO_LMT having again a smaller value by the predetermined value than the ratio indicating value ADJ_RATIO supplied to one input terminal. By repeating such operation, the digital back EMF detection signal VDET_D becomes lower than the allowable maximum voltage VTH_H or becomes higher than the allowable minimum voltage VTH_L. As a result, the limiter 21206 supplies, to the adjustment sequencer 2125, the state output signal ST_OK of the high level "1" which indicates that the analog back EMF detection signal Vdet_A is within the range of linearity.

FIG. 17 illustrates the characteristics of the digital back EMF detection signal VDET_D generated from the analog-to-digital converter 23 of the semiconductor integrated circuit 2 according to Embodiment 3 illustrated in FIG. 15, provided with the state control unit 2120 to generate the digital VCM current indicating value VCMCRNT illustrated in FIG. 16.

In the example illustrated in FIG. 17, when the output signal VCMP_LMT supplied from the OR circuit 21205 to the other input terminal is at high level "1", the limiter 21206 generates the limit ratio indicating value RATIO_LMT in which "1" as the predetermined value has been subtracted from the ratio indicating value ADJ_RATIO supplied to the one input terminal.

In the first state ST1 of FIG. 17, the digital back EMF detection signal VDET_D, which is for generating the second detection calibration signal VDET_CAL2 in response to the analog back EMF detection signal Vdet_A as the second value generated by the selection instruction signal ST_SEL of a high level "1", is higher than the allowable maximum voltage VTH_H. In the first state ST1, a ratio indicating value ADJ_RATIO supplied from the serial interface 211 of the logic circuit 21 to one input terminal of the limiter 21206 is generated from the limiter 21206 as a limit ratio indicating value RATIO_LMT.

In the first state ST1 described above, the digital back EMF detection signal VDET_D, which is for generating the second detection calibration signal VDET_CAL2 in response to the analog back EMF detection signal Vdet_A as the second value generated by the selection instruction signal ST_SEL of a high level "1", is higher than the allowable maximum voltage VTH_H. As a result, the output signal VCMP_LMT of a high level "1" is generated from the OR circuit 21205 and supplied to the limiter 21206. Therefore, in response to the output signal VCMP_LMT of a high level "1" of the OR circuit 21205, the limiter 21206 generates, in the second state ST2 of FIG. 17, the limit ratio indicating value RATIO_LMT (=ADJ_RATIO-1) in which "1" as the predetermined value has been subtracted from the ratio indicating value ADJ_RATIO.

Also in the second state ST2 of FIG. 17, the digital back EMF detection signal VDET_D, which is for generating the second detection calibration signal VDET_CAL2 in response to the analog back EMF detection signal Vdet_A as the second value generated by the selection instruction signal ST_SEL of a high level "1", is higher than the allowable maximum voltage VTH_H. As a result, the output signal VCMP_LMT of a high level "1" is generated from the OR circuit 21205 and supplied to the limiter 21206. Therefore, in response to the output signal VCMP_LMT of a high level "1" of the OR circuit 21205, the limiter 21206 generates, in the third state ST3 of FIG. 17, the limit ratio indicating value RATIO_LMT (=ADJ_RATIO-2) in which "1" as the predetermined value has been further subtracted from the limit ratio indicating value RATIO_LMT (=ADJ_RATIO-1) generated in the second state ST2.

Also in the third state ST3 of FIG. 17, the digital back EMF detection signal VDET_D, which is for generating the second detection calibration signal VDET_CAL2 in response to the analog back EMF detection signal Vdet_A as the second value generated by the selection instruction signal ST_SEL of a high level "1", is higher than the allowable maximum voltage VTH_H. As a result, the output signal VCMP_LMT of a high level "1" is generated from the OR circuit 21205 and supplied to the limiter 21206. Therefore, in response to the output signal VCMP_LMT of a high level "1" of the OR circuit 21205, the limiter 21206 generates, in the fourth state ST4 of FIG. 17, the limit ratio indicating value RATIO_LMT (=ADJ_RATIO-3) in which "1" as the predetermined value has been further subtracted from the limit ratio indicating value RATIO_LMT (=ADJ_RATIO-2) generated in the third state ST3.

Also in the fourth state ST4 of FIG. 17, the digital back EMF detection signal VDET_D, which is for generating the second detection calibration signal VDET_CAL2 in response to the analog back EMF detection signal Vdet_A as the second value generated by the selection instruction signal ST_SEL of a high level "1", is higher than the allowable maximum voltage VTH_H. As a result, the output signal VCMP_LMT of a high level "1" is generated from the OR circuit 21205 and supplied to the limiter 21206. Therefore, in response to the output signal VCMP_LMT of a high level "1" of the OR circuit 21205, the limiter 21206 generates, in the fifth state ST5 of FIG. 17, the limit ratio indicating value RATIO_LMT (=ADJ_RATIO-4) in which "1" as the predetermined value has been further subtracted from the limit ratio indicating value RATIO_LMT (=ADJ_RATIO-3) generated in the fourth state ST4.

In the fifth state ST5 of FIG. 17, the digital back EMF detection signal VDET_D, which is for generating the second detection calibration signal VDET_CAL2 in response to the analog back EMF detection signal Vdet_A as the second value generated by the selection instruction signal ST_SEL of a high level "1", is lower than the allowable maximum voltage VTH_H.

As a result, according to the semiconductor integrated circuit 2 of Embodiment 3 illustrated in FIG. 15 through FIG. 17, the first detection calibration signal VDET_CAL1 and the second detection calibration signal VDET_CAL2 can be kept in the output range OUT_RANGE in which the linearity of the digital back EMF detection signal VDET_D is maintained.

Note that the semiconductor integrated circuit 2 according to Embodiment 3 as the other example is based on the semiconductor integrated circuit 2 according to Embodiment 2 illustrated in FIG. 10. Furthermore, in the other example, the state control unit 2120 is comprised of the first comparator 21203, the second comparator 21204, the OR circuit 21205, and the limiter 21206 which are illustrated in FIG. 16, in addition to the multiplier 21200, the subtractor 21201, and the selector 21202 which are illustrated in FIG. 11.

Accordingly, in the semiconductor integrated circuit 2 according to Embodiment 3 as the other example, the digital back EMF detection signal VDET_D generated from the analog-to-digital converter 23 is supplied to the state control unit 2120 in order to maintain the linearity of the analog back EMF detection signal Vdet_A. By monitoring the value of the digital back EMF detection signal VDET_D, the state control unit 2120 detects that the analog back EMF detection signal Vdet_A generated from the back EMF detector circuit 25 has reached an allowable maximum voltage a little lower than the operation power voltage VDD or has reached an allowable minimum voltage a little higher than the ground voltage GND. In response to the detection result that the analog back EMF detection signal Vdet_A has reached the allowable maximum voltage or the allowable minimum voltage, the state control unit 2120 decreases the second subtraction gain value A2_GAIN2 as the subtraction gain value (=R4/R3) of the subtraction amplifier 252 of the back EMF detector circuit 25. That is, also in the other example, in order to set the analog back EMF detection signal Vdet_A of the back EMF detector circuit 25 to the first value and the second value in the calibration operation period, the subtraction gain value (=R4/R3) of the subtraction amplifier 252 of the back EMF detector circuit 25 is set as the first subtraction gain value A2_GAIN1 and the second subtraction gain value A2_GAIN2. In response to the detection result that the analog back EMF detection signal Vdet_A has reached the allowable maximum voltage or the allowable minimum voltage, the state control unit 2120 decreases the analog back EMF detection signal Vdet_A as the second value, by decreasing the second subtraction gain value A2_GAIN2. Decreasing of the second subtraction gain value A2_GAIN2 in the subtraction amplifier 252 of the back EMF detector circuit 25 is continued until it is no longer detected that the analog back EMF detection signal Vdet_A has reached the allowable maximum voltage or the allowable minimum voltage. Therefore, according to the semiconductor integrated circuit 2 according to Embodiment 3 as the other example, the first detection calibration signal VDET_CAL1 and the second detection calibration signal VDET_CAL2 can be kept in the output range OUT_RANGE in which the linearity of the digital back EMF detection signal VDET_D is maintained.

As described above, the invention accomplished by the present inventors has been concretely explained based on the various embodiments. However, it cannot be overemphasized that the present invention is not restricted to the embodiments, and it can be changed variously in the range which does not deviate from the gist.

For example, it is possible to integrate the semiconductor integrated circuit 2 according to one of Embodiment 1 through Embodiment 3 into a resin sealed package with the built-in semiconductor chip of the controller 1 which is formed by employing the system on a chip (SoC) as illustrated in FIG. 18. As the integration technology, it is possible to integrate the semiconductor integrated circuit 2 according to one of Embodiment 1 through Embodiment 3 in the form of a monolithic semiconductor integrated circuit, into the semiconductor chip of the controller 1 which is formed by employing the system on a chip (SoC) as illustrated in FIG. 18. As another integration technology, it is possible to integrate the semiconductor integrated circuit 2 according to one of Embodiment 1 through Embodiment 3 in the form of a multichip semiconductor integrated circuit, into a resin sealed package with the built-in semiconductor chip of the controller 1. That is, the semiconductor chip of the semiconductor integrated circuit 2 and the semiconductor chip of the controller 1 are integrated into one resin sealed package in the form of a multichip module (MCP) or a system in package (SiP).

Furthermore, in the semiconductor integrated circuit 2 according to one of Embodiment 1 through Embodiment 3, the search algorithm for converging the gain (=R2/R1) of the inverting amplifier 251 of the back EMF detector circuit 25 to the prescribed value is not restricted only to the binary search algorithm described above. For example, it is also possible to employ other search algorithms, such as a linear search algorithm.

Yet furthermore, in one of Embodiment 1 through Embodiment 3, the outer circumference stopper, which is a mechanical member for forbidding the magnetic head 33 and the arm 34 to excessively move outward beyond the most outer circumference of the storage sector region of the magnetic disk 31 by the VCM current Ivcm of a negative current value in the calibration operation for the loading operation LOAD, can be shared with the ramp mechanism 36 which is arranged at the outer circumference of the magnetic disk 31.

What is claimed is:

1. A semiconductor integrated circuit to be mounted in a motor drive controller for driving a motor to move a magnetic head of a hard disk drive unit, the semiconductor integrated circuit being operable to make flow a non-zero current which is substantially not a zero current through the motor, in a calibration operation for a loading operation which moves the magnetic head from a ramp mechanism to a surface of a disk medium or an unloading operation which moves the magnetic head from the surface of the disk medium to the ramp mechanism,
wherein the non-zero current presses an arm mounting the magnetic head against an outer circumference stopper at the time of the calibration operation for the loading operation or presses the arm mounting the magnetic head against an inner circumference stopper at the time of the calibration operation for the unloading operation, so as to bring the arm into a fixed state,
wherein the semiconductor integrated circuit comprises:
a motor driver circuit operable to drive the motor;
a back EMF (electromotive force) detector circuit operable to detect a back electromotive force generated in the motor; and
an adjustment unit operable to adjust the gain of an internal amplifier of the back EMF detector circuit,
wherein, at the time of the calibration operation, a back EMF (electromotive force) detection signal is generated from the back EMF detector circuit, in response to the motor driver circuit making the non-zero current flow through the motor,
wherein the semiconductor integrated circuit generates a comparison reference value corresponding to the back EMF detection signal generated from the back EMF detector circuit, in the fixed state of the arm and the state where a zero current substantially with a zero current value flows through the motor by the calibration operation,
wherein, at the time of the calibration operation, the semiconductor integrated circuit sets the back EMF detection signal generated from the back EMF detector circuit as a first value and a second value, in response to the non-zero current flowing through the motor,
wherein, at the time of the calibration operation, the semiconductor integrated circuit calculates the comparison reference value from the back EMF detection signal as the first value and the back EMF detection signal as the second value,
wherein the adjustment unit of the semiconductor integrated circuit adjusts the gain of the internal amplifier of the back EMF detector circuit by the calibration operation, and the back EMF detector circuit to which the adjusted gain is reflected generates the back EMF detection signal as a comparison input value, and
wherein the adjustment unit of the semiconductor integrated circuit adjusts the gain of the internal amplifier of the back EMF detector circuit so as to reduce the difference of the comparison input value and the comparison reference value by the calibration operation.

2. The semiconductor integrated circuit according to claim 1,
wherein, at the time of the calibration operation, the semiconductor integrated circuit sets the back EMF detection signal generated from the back EMF detector circuit as the first value and the second value, respectively, by setting the non-zero current flowing through the motor as a first current value and a second current value, respectively.

3. The semiconductor integrated circuit according to claim 1,
wherein the back EMF detector circuit comprises as the internal amplifier:
an inverting amplifier in a preceding stage; and
a subtraction amplifier in a subsequent stage,
wherein the inverting amplifier in the preceding stage of the back EMF detector circuit and the subtraction amplifier in the subsequent stage amplify an inter-terminal voltage of the motor and an inter-terminal voltage of a current sensing resistor coupled in series with the motor, and the back EMF detection signal is generated from the back EMF detector circuit, and
wherein, at the time of the calibration operation, the semiconductor integrated circuit sets a subtraction gain value of the subtraction amplifier in the subsequent stage as a first subtraction gain value and a second subtraction gain value, respectively, and sets the back EMF detection signal generated from the back EMF detector circuit as the first value and the second value, respectively.

4. The semiconductor integrated circuit according to claim 3 further comprising:
a state control unit operable to set the back EMF detection signal generated from the back EMF detector circuit as the first value and the second value, in response to the non-zero current flowing through the motor, at the time of the calibration operation,
wherein the state control unit comprises at least:
a multiplier; and
a selector,
wherein a ratio indicating value is supplied to one input terminal of the multiplier, a gain indicating value is supplied to the other input terminal of the multiplier, and a multiplication result is generated from an output terminal of the multiplier, wherein the multiplication result of the multiplier is supplied to one input terminal of the selector, the gain indicating value is supplied to the other input terminal of the selector, and a selection instruction signal is supplied to a selection control terminal of the selector, wherein, when the selection instruction signal supplied to the selection control terminal of the selector is in a first state, the gain indicating value supplied to the other input terminal of the selector is generated from an output terminal of the selector as the subtraction gain value of the subtraction amplifier, wherein, when the selection instruction signal supplied to the selection control terminal of the selector is in a second state, the multiplication result of the multiplier supplied to the one input terminal of the selector is generated from the output terminal of the selector as the subtraction gain value of the subtraction amplifier, wherein the subtraction gain value of the subtraction amplifier generated from the output terminal of the selector in response to the selection instruction signal as the first state sets the back EMF detection signal as the first value, wherein the subtraction gain value of the subtraction amplifier generated from the output terminal of the selector in response to the selection instruction signal as the second state sets the back EMF detection signal as the second value, wherein the state control unit generates the division indicating value depending on the ratio indicating value supplied to the one input terminal of the multiplier, and wherein the division indicating value generated from the state control unit is supplied to the other input terminal of the divider of the calculation unit.

5. The semiconductor integrated circuit according to claim 4, wherein the state control unit further comprises:
a subtractor, wherein the ratio indicating value is supplied to one input terminal of the subtractor, "1" is supplied to the other input terminal of the subtractor, and the division indicating value as the subtraction result is generated from an output terminal of the subtractor, wherein the division indicating value generated from the output terminal of the subtractor of the state control unit is the subtraction result in which "1" has been subtracted from the ratio indicating value, and wherein the ratio indicating value satisfies the conditions of ADJ_RATIO=$2^n$+1 (n is an integer), and the divider of the calculation unit is comprised of a shift register which shifts the bit data of the ratio indicating value rightward in response to the division indicating value.

6. The semiconductor integrated circuit according to claim 1, wherein the back EMF detection signal as an analog back EMF detection signal is generated from the back EMF detector circuit, and wherein a maximum value of the analog back EMF detection signal is controlled to an allowable maximum voltage lower than an operation power voltage of the semiconductor integrated circuit, and a minimum value of the analog back EMF detection signal is controlled to an allowable minimum voltage higher than a ground voltage of the semiconductor integrated circuit.

7. The semiconductor integrated circuit according to claim 6, wherein the state control unit controls the maximum value and the minimum value of the analog back EMF detection signal to the allowable maximum voltage and the allowable minimum voltage, respectively, wherein the state control unit further comprises:
a first comparator;
a second comparator;
an OR circuit; and
a limiter, wherein the digital back EMF detection signal of the analog-to-digital converter is supplied in common to one input terminal of the first comparator and one input terminal of the second comparator, wherein the allowable maximum voltage is supplied to the other input terminal of the first comparator, and the allowable minimum voltage is supplied to the other input terminal of the second comparator, wherein a comparison output signal of the first comparator and a comparison output signal of the second comparator are supplied respectively to one input terminal and the other input terminal of the OR circuit, wherein the ratio indicating value and an output signal generated from the OR circuit are supplied to the limiter, wherein, when the digital back EMF detection signal supplied in common to the one input terminal of the first comparator and the one input terminal of the second comparator is higher than the allowable maximum voltage or lower than the allowable minimum voltage, the limiter generates a limit ratio indicating value, and wherein the limit ratio indicating value generated by the limiter is set as a value smaller than the ratio indicating value, and supplied to the one input terminal of the subtractor of the state control unit.

8. The semiconductor integrated circuit according to claim 1 further comprising:
a digital-to-analog converter; and
an analog-to-digital converter, wherein an output terminal of the digital-to-analog converter is coupled to an input terminal of the motor driver circuit, and wherein the analog back EMF detection signal as the back EMF detection signal generated by the back EMF detector circuit is supplied to an input terminal of the analog-to-digital converter, and a digital back EMF detection signal is generated from an output terminal of the analog-to-digital converter.

9. The semiconductor integrated circuit according to claim 5 further comprising:
a first detection register;
a second detection register;
a third detection register;
a fourth detection register;
a calculation unit; and
a comparator, wherein, at the time of the calibration operation, the digital back EMF detection signal of the analog-to-digital converter, corresponding to the first value of the back EMF detection signal generated from the back EMF detector circuit in response to the non-zero current flowing through the motor, is stored in the third detection register, wherein, at the time of the calibration operation, the digital back EMF detection signal of the analog-to-digital converter, corresponding to the second value of the back EMF detection signal generated from the back EMF detector circuit in response to the non-zero current flowing through the motor, is stored in the fourth detection register, wherein the calculation unit calculates the comparison reference value from the first information stored in the third detection register and the second information stored in the fourth detection register, and stores the calculated comparison reference value in the first detection register, wherein the digital back EMF detection signal of the analog-to-digital converter, corresponding to the comparison input value generated in response to the gain adjusted by the calibration operation, is stored in the second detection register, wherein the comparator compares the comparison reference value stored in the first detection register with the digital back EMF detection signal of the analog-to-digital converter stored in the second detection register corresponding to the comparison input value, and wherein the adjustment unit adjusts the gain of the internal amplifier of the back EMF detector circuit by the calibration operation in response to the comparison result of the comparator.

10. The semiconductor integrated circuit according to claim 9, wherein the calculation unit comprises a subtractor;

a divider; and an adder, wherein the first information stored in the third detection register is supplied to one input terminal of the subtractor, the second information stored in the fourth detection register is supplied to the other input terminal of the subtractor, and a subtraction result is generated from an output terminal of the subtractor, wherein the subtraction result of the subtractor is supplied to one input terminal of the divider, a division indicating value is supplied to the other input terminal of the divider, and a division result is generated from an output terminal of the divider, and wherein the first information stored in the third detection register is supplied to one input terminal of the adder, the division result of the divider is supplied to the other input terminal of the adder, and the comparison reference value as the addition result is generated from an output terminal of the adder.

11. The semiconductor integrated circuit according to claim 10 further comprising:

a state control unit operable to set the back EMF detection signal, generated from the back EMF detector circuit in response to the non-zero current flowing through the motor at the time of the calibration operation, as the first value and the second value, wherein the state control unit comprises at least:

a multiplier; and a selector, wherein a ratio indicating value is supplied to one input terminal of the multiplier, a motor input current indicating value is supplied to the other input terminal of the multiplier, and a multiplication result is generated from an output terminal of the multiplier, wherein the multiplication result of the multiplier is supplied to one input terminal of the selector, the motor input current indicating value is supplied to the other input terminal of the selector, and a selection instruction signal is supplied to a selection control terminal of the selector, wherein, when a selection instruction signal supplied to a selection control terminal of the selector is in a first state, the motor input current indicating value supplied to the other input terminal of the selector is generated from an output terminal of the selector as a motor current indicating value, wherein, when the selection instruction signal supplied to the selection control terminal of the selector is in a second state, the multiplication result of the multiplier supplied to the one input terminal of the selector is generated from the output terminal of the selector as the motor current indicating value, wherein the motor current indicating value generated from the output terminal of the selector in response to the selection instruction signal as the first state sets the back EMF detection signal as the first value, wherein the motor current indicating value generated from the output terminal of the selector in response to the selection instruction signal as the second state sets the back EMF detection signal as the second value, wherein the state control unit generates the division indicating value depending on the ratio indicating value supplied to the one input terminal of the multiplier, and wherein the division indicating value generated from the state control unit is supplied to the other input terminal of the divider of the calculation unit.

12. The semiconductor integrated circuit according to claim 11, wherein the state control unit further comprises:

a subtractor, wherein the ratio indicating value is supplied to one input terminal of the subtractor, "1" is supplied to the other input terminal of the subtractor, and the division indicating value as a subtraction result is generated from the output terminal of the subtractor, wherein the division indicating value generated from the output terminal of the subtractor of the state control unit is the subtraction result in which "1" has been subtracted from the ratio indicating value, and wherein the ratio indicating value ADJ_RATIO satisfies the conditions of ADJ_RATIO=$2^n$+1 (n is an integer), and the divider of the calculation unit is comprised of a shift register which shifts the bit data of the ratio indicating value rightward in response to the division indicating value.

13. The semiconductor integrated circuit according to claim 1, wherein the motor driver circuit drives a voice coil motor as the motor to move the magnetic head of the hard disk drive unit.

14. The semiconductor integrated circuit according to claim 13, wherein the semiconductor integrated circuit integrates a voice coil motor driver for driving the voice coil motor and a spindle motor driver for driving the spindle motor to turn the disk medium.

15. An operating method of a semiconductor integrated circuit to be mounted in a motor drive controller for driving a motor to move a magnetic head of a hard disk drive unit, wherein the semiconductor integrated circuit is operable to make flow a non-zero current which is substantially not a zero current through the motor, in a calibration operation for a loading operation which moves the magnetic head from a ramp mechanism to a surface of a disk medium or an unloading operation which moves the magnetic head from the surface of the disk medium to the ramp mechanism, wherein the non-zero current presses an arm mounting the magnetic head against an outer circumference stopper at the time of the calibration operation for the loading operation or presses the arm mounting the magnetic head against an inner circumference stopper at the time of the calibration operation for the unloading operation, so as to bring the arm into a fixed state, wherein the semiconductor integrated circuit comprises a motor driver circuit operable to drive the motor;

a back EMF (electromotive force) detector circuit operable to detect a back electromotive force generated in the motor; and an adjustment unit operable to adjust the gain of an internal amplifier of the back EMF detector circuit, wherein, at the time of the calibration operation, a back EMF (electromotive force) detection signal is generated from the back EMF detector circuit, in response to the motor driver circuit making the non-zero current flow through the motor, wherein the semiconductor integrated circuit generates a comparison reference value corresponding to the back EMF detection signal generated from the back EMF detector circuit, in the fixed state of the arm and the state where a zero current substantially with a zero current value flows through the motor by the calibration operation, wherein, at the time of the calibration operation, the semiconductor integrated circuit sets the back EMF detection signal generated from the back EMF detector circuit as a first value and a second value, in response to the non-zero current flowing through the motor, wherein, at the time of the calibration operation, the semiconductor integrated circuit calculates the comparison reference value from the back EMF detection signal as the first value and the back EMF detection signal as the second value, wherein the adjustment unit of the semiconductor integrated circuit adjusts the gain of the internal amplifier of the back EMF detector circuit by the calibration operation, and the back EMF detector circuit to which the adjusted gain is reflected generates the back EMF detection signal as a comparison input value, and wherein the adjustment unit of the semiconductor integrated circuit adjusts the gain of the internal amplifier of the back EMF detector circuit so as to reduce the difference of the comparison input value and the comparison reference value by the calibration operation.

16. The operating method of the semiconductor integrated circuit according to claim 15, wherein, at the time of the calibration operation, the semiconductor integrated circuit sets the back EMF detection signal generated from the back EMF detector circuit as the first value and the second value, respectively, by setting the non-zero current flowing through the motor as a first current value and a second current value, respectively.

17. The operating method of the semiconductor integrated circuit according to claim 15, wherein the back EMF detector circuit comprises as the internal amplifier an inverting amplifier in a preceding stage; and a subtraction amplifier in a subsequent stage, wherein the inverting amplifier in the preceding stage of the back EMF detector circuit and the subtraction amplifier in the subsequent stage amplify an inter-terminal voltage of the motor and an inter-terminal voltage of a current sensing resistor coupled in series with the motor, and the back EMF detection signal is generated from the back EMF detector circuit, and wherein, at the time of the calibration operation, the semiconductor integrated circuit sets a subtraction gain value of the subtraction amplifier in the subsequent stage as a first subtraction gain value and a second subtraction gain value, respectively, and sets the back EMF detection signal generated from the back EMF detector circuit as the first value and the second value, respectively.

18. The operating method of the semiconductor integrated circuit according to claim 15, wherein the back EMF detection signal as an analog back EMF detection signal is generated from the back EMF detector circuit, and wherein a maximum value of the analog back EMF detection signal is controlled to an allowable maximum voltage lower than an operation power voltage of the semiconductor integrated circuit, and a minimum value of the analog back EMF detection signal is controlled to an allowable minimum voltage higher than a ground voltage of the semiconductor integrated circuit.

19. The operating method of the semiconductor integrated circuit according to claim 15, wherein the semiconductor integrated circuit comprises a digital-to-analog converter; and an analog-to-digital converter, wherein an output terminal of the digital-to-analog converter is coupled to an input terminal of the motor driver circuit, and wherein the analog back EMF detection signal as the back EMF detection signal generated by the back EMF detector circuit is supplied to an input terminal of the analog-to-digital converter, and a digital back EMF detection signal is generated from an output terminal of the analog-to-digital converter.

20. The operating method of the semiconductor integrated circuit according to claim 19, wherein the semiconductor integrated circuit further comprises a first detection register;

a second detection register;

a third detection register;

a fourth detection register;

a calculation unit; and a comparator, wherein, at the time of the calibration operation, the digital back EMF detection signal of the analog-to-digital converter, corresponding to the first value of the back EMF detection signal generated from the back EMF detector circuit in response to the non-zero current flowing through the motor, is stored in the third detection register, wherein, at the time of the calibration operation, the digital back EMF detection signal of the analog-to-digital converter, corresponding to the second value of the back EMF detection signal generated from the back EMF detector circuit in response to the non-zero current flowing through the motor, is stored in the fourth detection register, wherein the calculation unit calculates the comparison reference value from the first information stored in the third detection register and the second information stored in the fourth detection register, and stores the calculated comparison reference value in the first detection register, wherein the digital back EMF detection signal of the analog-to-digital converter, corresponding to the comparison input value generated in response to the gain adjusted by the calibration operation, is stored in the second detection register, wherein the comparator compares the comparison reference value stored in the first detection register with the digital back EMF detection signal of the analog-to-digital converter stored in the second detection register corresponding to the comparison input value, and wherein the adjustment unit adjusts the gain of the internal amplifier of the back EMF detector circuit by the calibration operation in response to the comparison result of the comparator.

\* \* \* \* \*